US007720947B2

(12) United States Patent
Kanemaki et al.

(10) Patent No.: US 7,720,947 B2
(45) Date of Patent: May 18, 2010

(54) METHOD AND DEVICE FOR RESERVING TRANSMISSION BAND ON INTERNET

(75) Inventors: Hideyasu Kanemaki, Kawasaki (JP); Takeshi Okamoto, Kawasaki (JP); Ikuo Taoka, Kawasaki (JP); Yoko Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1264 days.

(21) Appl. No.: 10/005,988

(22) Filed: Oct. 29, 2001

(65) Prior Publication Data
US 2002/0174228 A1 Nov. 21, 2002

(30) Foreign Application Priority Data
May 18, 2001 (JP) ............................. 2001-149473

(51) Int. Cl.
G06F 15/16 (2006.01)
(52) U.S. Cl. ...................................... 709/223; 709/224
(58) Field of Classification Search .................. 709/226, 709/201, 223, 224
See application file for complete search history.

(56) References Cited

U.S. PATENT DOCUMENTS

| 6,101,549 | A  | * | 8/2000  | Baugher et al. ............. 709/238 |
| 6,118,785 | A  | * | 9/2000  | Araujo et al. ............... 370/401 |
| 6,278,712 | B1 | * | 8/2001  | Takihiro et al. ............. 370/400 |
| 6,336,129 | B1 | * | 1/2002  | Ise et al. .................... 709/201 |
| 6,341,127 | B1 | * | 1/2002  | Katsube et al. ............. 370/352 |
| 6,519,254 | B1 | * | 2/2003  | Chuah et al. ................ 370/389 |
| 6,577,628 | B1 | * | 6/2003  | Hejza ......................... 370/392 |
| 6,708,209 | B1 | * | 3/2004  | Ebata et al. ................. 709/223 |
| 6,721,272 | B1 | * | 4/2004  | Parnafes et al. ............ 370/235 |
| 6,765,872 | B1 | * | 7/2004  | Tazaki ........................ 370/235 |
| 6,771,661 | B1 | * | 8/2004  | Chawla et al. .............. 370/468 |
| 6,779,031 | B1 | * | 8/2004  | Picher-Dempsey .......... 709/224 |
| 6,801,944 | B2 |   | 10/2004 | Motoyama et al. |
| 2002/0099848 | A1 | * | 7/2002  | Lee ............................ 709/241 |
| 2004/0202158 | A1 | * | 10/2004 | Takeno et al. ............... 370/389 |

FOREIGN PATENT DOCUMENTS

| JP | 10-257050   | 9/1998  |
| JP | 11055252    | 2/1999  |
| JP | 11275141    | 10/1999 |
| JP | 2000-312226 | 11/2000 |
| WO | 00/69129    | 11/2000 |

OTHER PUBLICATIONS

Japanese Office Action dated Dec. 4, 2007, from the corresponding Japanese Application.

* cited by examiner

*Primary Examiner*—John Follansbee
*Assistant Examiner*—Nghi V Tran
(74) *Attorney, Agent, or Firm*—Katten Muchin Rosenman LLP

(57) ABSTRACT

A method of reserving a transmission band of a transmission line for transmitting data via a plurality of Internet service providers on the Internet between first and second communication devices includes the steps of (a) the first communication device requesting an intermediary server to reserve the transmission band and (b) the intermediary server reserving the transmission band for the first and second communication devices.

20 Claims, 113 Drawing Sheets

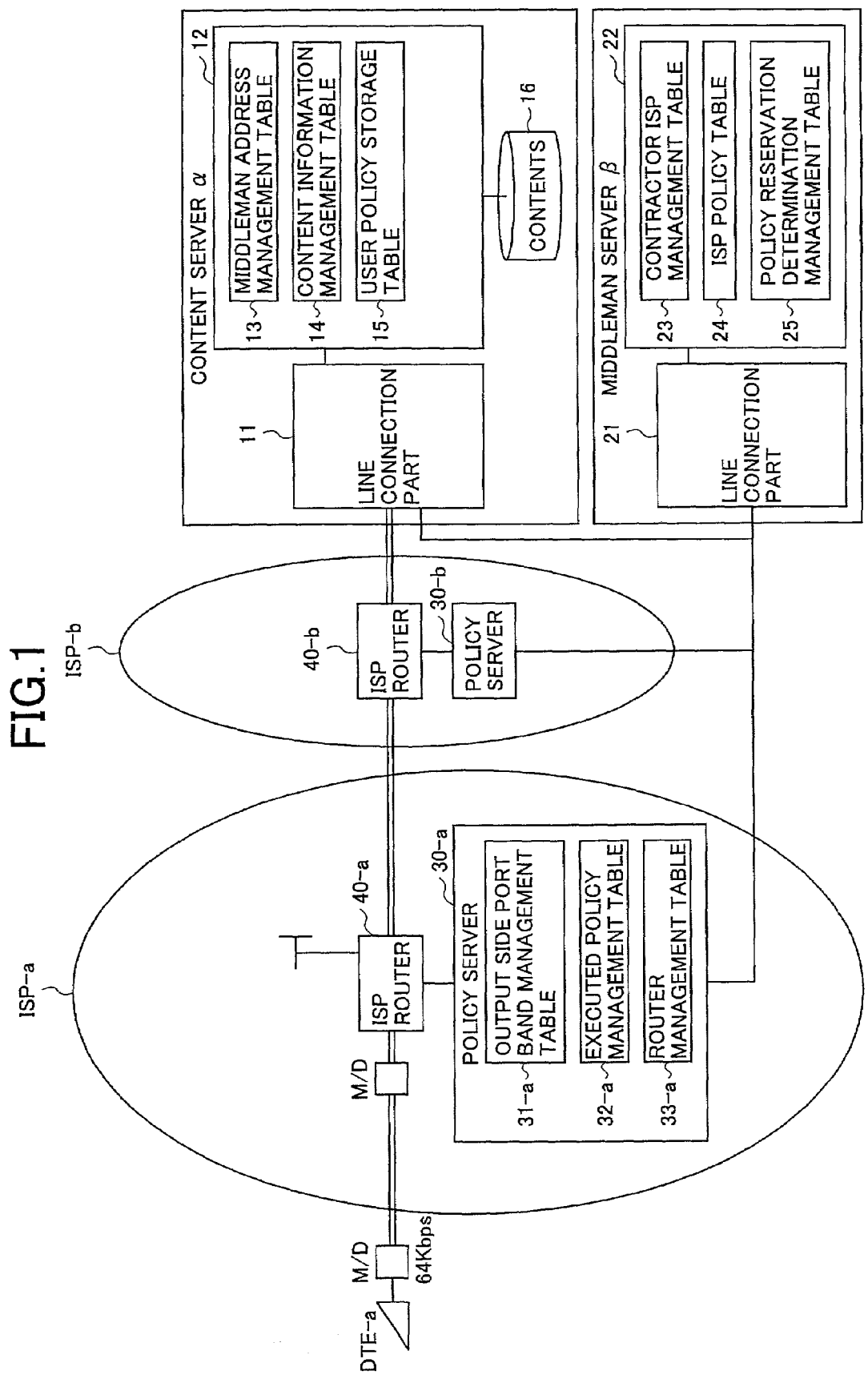

FIG.2A

| MIDDLEMAN SERVER IP ADDRESS |
|---|
| 138.10.0.1 |

FIG.2B

| CONTENT NAME | CAPACITY |
|---|---|
| CONTENT A | 57.6Mbyte |
| CONTENT B | 28.8Mbyte |

FIG.2C

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α 1 | 138.10.0.1 | CONTENT A | 130.10.0.2 | 64K | 2001/9/1 10:00 | 2001/9/1 12:00 | 134.30.0.1 |

FIG.3A

| NETWORK ADDRESS | POLICY SERVER IP ADDRESS | CLIENT MANAGEMENT SERVER IP ADDRESS |
|---|---|---|
| 130.0.0.0/9 | 130.40.0.3 | 130.40.0.4 |
| 132.0.0.0/9 | 132.50.0.3 | 132.50.0.4 |
| 132.0.0.0/9 | 132.40.0.3 | 134.40.0.4 |

FIG.3B

| ORDER RECEPTION NO. | POLICY SERVER IP ADDRESS | USER IP ADDRESS | CONTENT SERVER IP ADDRESS | REQUESTED BAND (bps) | RESERVATION START DATE AND TIME | RESERVATION END DATE AND TIME | ROUTER PORT IP ADDRESS |
|---|---|---|---|---|---|---|---|
| β1 | 134.40.0.3 | 130.10.0.2 | 136.10.0.1 | 64K | 2001/9/1 10:00 | 2001/9/1 12:00 | 134.30.0.1 |
| β2 | 132.50.0.3 | 130.10.0.2 | 136.10.0.1 | 64K | 2001/9/1 10:00 | 2001/9/1 12:00 | 132.40.0.1 |
| β3 | 130.40.0.3 | 130.10.0.2 | 136.10.0.1 | 64K | 2001/9/1 10:00 | 2001/9/1 12:00 | 130.30.0.1 |

FIG.3C

| CONTENT SERVER IP ADDRESS | ORDER-ING NO. | ORDER RECEPTION NUMBER | POLICY SERVER IP ADDRESS | RESERVATION RESULT |
|---|---|---|---|---|
| 136.10.0.1 | α1 | β1 | 134.40.0.3 | |
| | | β2 | 132.50.0.3 | |
| | | β3 | 130.40.0.3 | |

FIG.4A

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Rc | P10 | 1M | 1M | 1M | 1M | 1M | 1M | 1M | 1M | 1M | 1M | 1M | 1M | 1M |
| Rc | P11 | 1M | 1M | 1M | 1M | 1M | 1M | 1M | 1M | 1M | 1M | 1M | 1M | 1M |
| Rd | P14 | 1.5M | 1.5M | 1.5M | 1.5M | 1.5M | 1.5M | 1.5M | 1.5M | 1.5M | 1.5M | 1.5M | 1.5M | 1.5M |
| Rd | P16 | 1M | 1M | 1M | 1M | 1M | 1M | 1M | 1M | 1M | 1M | 1M | 1M | 1M |

FIG.4B

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.10.0.2 | 136.10.0.1 | 64K | 2001/9/1 10:00 | 2001/9/1 12:00 | 138.10.0.1 | β1 | 134.10.0.5 | P10 |

FIG.4C

| ROUTER PORT IP ADDRESS | ROUTER VIRTUAL IP ADDRESS |
|---|---|
| 134.10.0.1 | 134.10.0.5 |
| 134.20.0.1 | |
| 134.30.0.1 | |
| 134.40.0.1 | |
| 134.50.0.1 | 134.50.0.5 |
| 134.60.0.1 | |
| 134.20.0.2 | |

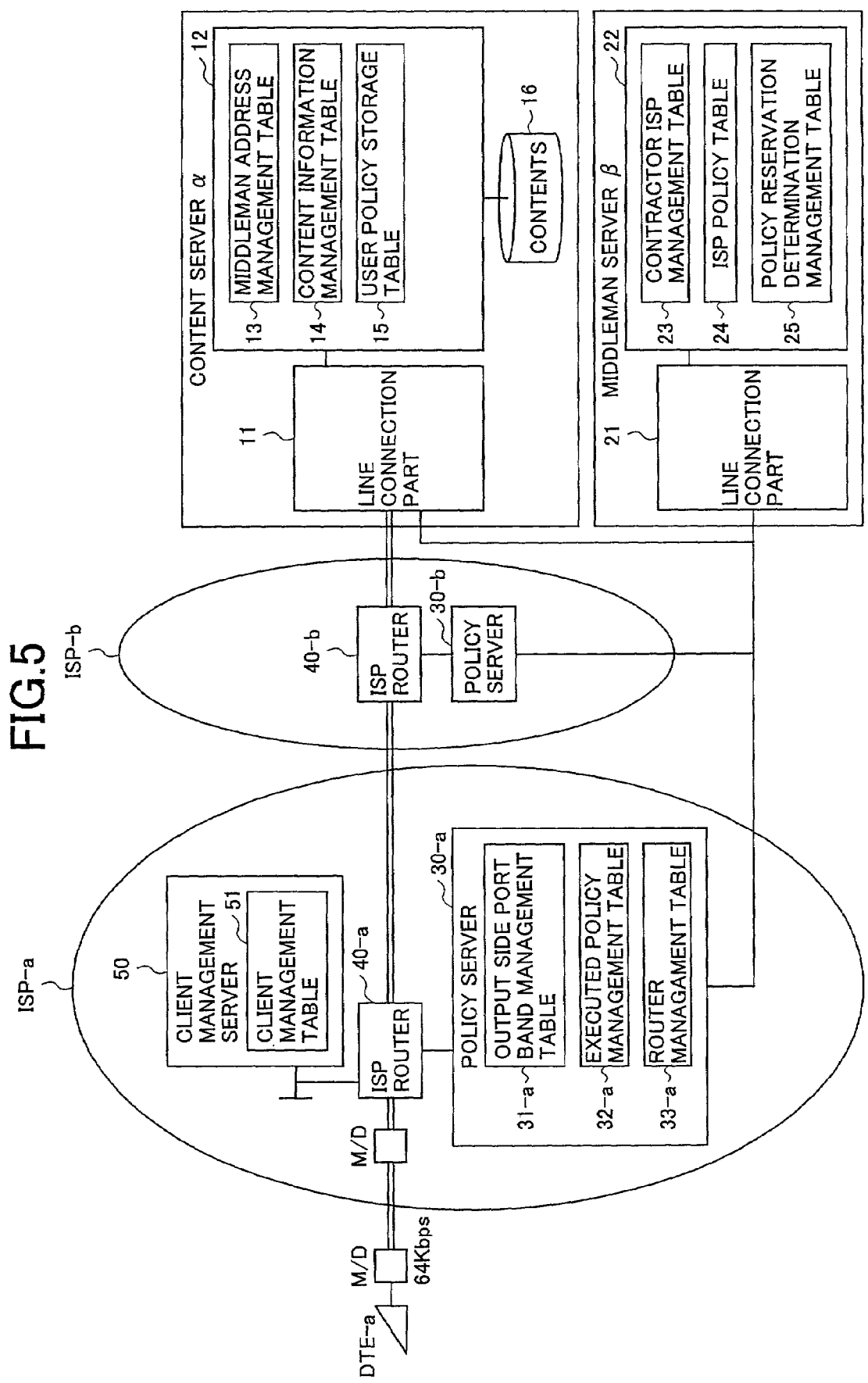

FIG.6

| USER IP ADDRESS | CONNECTION BAND (bps) |
|---|---|
| 130.10.0.2 | 64K |
| 130.20.0.2 | 128K |
| 130.10.0.3 | |

FIG.8A

| NETWORK ADDRESS | COPY SERVER IP ADDRESS |
| --- | --- |
| 130.0.0.0/9 | 130.40.0.2 |
| 132.0.0.0/9 | 132.50.0.2 |
| 134.0.0.0/9 | 134.40.0.2 |

FIG.8B

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
| --- | --- | --- | --- | --- | --- | --- | --- |
| α1 | 138.10.0.1 | CONTENT A | 130.10.0.2 | 64K | 2001/9/1 10:00 | 2001/9/1 12:00 | |

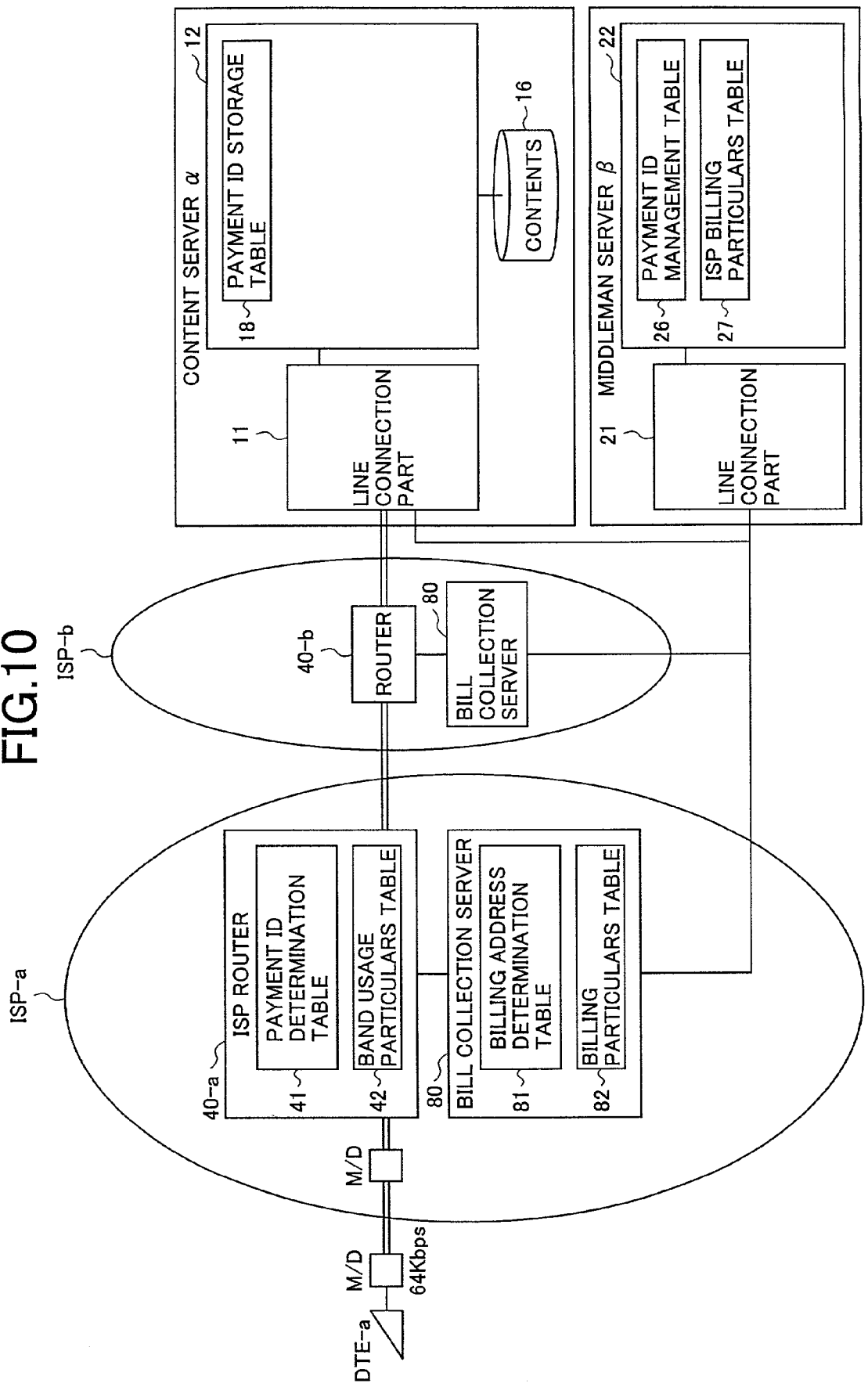

FIG.11A

| PAYMENT ID |
|---|
| β1 |

FIG.11B

| PAYMENT ID | CONTENT SERVER IP ADDRESS |
|---|---|
| β1 | 136.10.0.1 |
| β2 | 140.10.0.1 |

FIG.11C

| AMOUNT BILLED (YEN) | PAYMENT ID | DESTINA-TION IP ADDRESS | DESTINA-TION PORT NO. | RESERVED BAND (bps) | USAGE START DATE AND TIME | USAGE END DATE AND TIME | ISP SERVER IP ADDRESS |
|---|---|---|---|---|---|---|---|
| aaa | β1 | 130.20.0.2 | 10 | 64K | 2001/9/1 9:00 | 2001/9/1 11:00 | 134.40.0.2 |
| ccc | β1 | 130.10.0.2 | 30 | 64K | 2001/9/1 10:00 | 2001/9/1 12:00 | 134.40.0.2 |

FIG.12A

| PAYMENT ID | MIDDLEMAN SERVER IP ADDRESS |
|---|---|
| β1 | 138.10.0.1 |
| β2 | 138.10.0.1 |

FIG.12B

| AMOUNT BILLED (YEN) | PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|---|
| aaa | β1 | 130.20.0.2 | 10 | 64K | 2001/9/1 9:00 | 2001/9/1 11:00 |
| bbb | β1 | 130.10.0.2 | 30 | 64K | 2001/9/1 10:00 | 2001/9/1 12:00 |
| ccc | β1 | 132.20.0.2 | 20 | 64K | 2001/9/1 9:00 | 2001/9/1 12:00 |

FIG.12C

| PAYMENT ID |
|---|
| β1 |
| β2 |

FIG.12D

| PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|
| β | 130.20.0.2 | 10 | 64K | 2001/9/1 9:00 | 2001/9/1 11:00 |
| β | 130.10.0.2 | 30 | 64K | 2001/9/1 10:00 | 2001/9/1 12:00 |

FIG.13B

| TERMINAL/SERVER | IP ADDRESS | ISP-a | PORT | IP ADDRESS | ISP-b | PORT | IP ADDRESS | ISP-c | PORT | IP ADDRESS |
|---|---|---|---|---|---|---|---|---|---|---|
| DTE-a | 130.10.0.2 | ROUTER Ra | P1 | 130.10.0.1 | ROUTER Rb | P5 | 132.10.0.1 | ROUTER Rc | P10 | 134.10.0.1 |
| DTE-b | 130.20.0.2 |  | P2 | 130.20.0.1 |  | P6 | 132.20.0.1 |  | P11 | 134.20.0.1 |
| DTE-c | 132.30.0.2 |  | P3 | 130.30.0.1 |  | P7 | 132.30.0.1 |  | P12 | 134.30.0.1 |
| SERVER α | 136.10.0.1 |  | P4 | 130.40.0.1 |  | P8 | 132.40.0.1 |  | P13 | 134.40.0.1 |
| SERVER β | 138.10.0.1 | VIRTUAL IP ADDRESS (Ra) | – | 130.10.0.5 |  | P9 | 132.10.0.1 | ROUTER Rd | P14 | 134.50.0.1 |
|  |  | SERVER Pa | – | 130.40.0.3 | VIRTUAL IP ADDRESS (Rb) | – | 132.10.0.5 |  | P15 | 134.60.0.1 |
|  |  | SERVER Ka | – | 130.40.0.4 | SERVER Pb | – | 132.50.0.3 |  | P16 | 134.20.0.2 |
|  |  | SERVER Sa | – | 130.40.0.2 | SERVER Kb | – | 132.50.0.4 | VIRTUAL IP ADDRESS (Rc) | – | 134.10.0.5 |
|  |  |  |  |  | SERVER Sb | – | 132.50.0.2 | VIRTUAL IP ADDRESS (Rd) | – | 134.50.0.5 |
|  |  |  |  |  |  |  |  | SERVER Pc | – | 134.40.0.3 |
|  |  |  |  |  |  |  |  | SERVER Kc | – | 134.40.0.4 |
|  |  |  |  |  |  |  |  | SERVER Sc | – | 134.40.0.2 |

FIG.14A

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| | | | | | | | |

FIG.14B

| MIDDLEMAN SERVER IP ADDRESS |
|---|
| 138.10.0.1 |

FIG.14C

| CONTENT NAME | CAPACITY |
|---|---|
| CONTENT A | 57.6M |
| CONTENT B | 28.8M |

FIG.15A

| NETWORK ADDRESS | POLICY SERVER IP ADDRESS | CLIENT MANAGEMENT SERVER IP ADDRESS |
|---|---|---|
| 130.0.0.0/9 | 130.40.0.3 | 130.40.0.4 |
| 132.0.0.0/9 | 132.50.0.3 | 132.50.0.4 |
| 134.0.0.0/9 | 134.40.0.3 | 134.40.0.4 |

FIG.15B

| ORDER RECEPTION NO. | POLICY SERVER IP ADDRESS | USER IP ADDRESS | CONTENT SERVER IP ADDRESS | REQUESTED BAND (bps) | RESERVATION START DATE AND TIME | RESERVATION END DATE AND TIME | ROUTER PORT IP ADDRESS |
|---|---|---|---|---|---|---|---|
|  |  |  |  |  |  |  |  |

FIG.15C

| CONTENT SERVER IP ADDRESS | ORDER -ING NO. | ORDER RECEPTION NUMBER | POLICY SERVER IP ADDRESS | RESERVATION RESULT |
|---|---|---|---|---|
|  |  |  |  |  |

FIG.16A

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Ra | P1 | 1.5M | — | — | — | — | — | — | — | — | — | — | — | — |
| Ra | P2 | — | — | — | — | — | — | — | — | — | — | — | — | — |

FIG.16B

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Rb | P5 | 1.5M | 1.5M | 1.5M | 1.5M | 1.5M | 1.5M | 1.372M | 1.5M | 1.5M | 1.5M | 1.5M | 1.5M | 1.5M |
| Rb | P6 | — | — | — | — | — | — | — | — | — | — | — | — | — |

FIG.16C

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Rc | P10 | 1M | 1M | 1M | 1M | 1M | 1M | 1M | 1M | 1M | 1M | 1M | 1M | 1M |
| Rc | P11 | 1M | 1M | 1M | 1M | 1M | 1M | 1M | 1M | 1M | 1M | 1M | 1M | 1M |
| Rd | P14 | 1.5M | 1.5M | 1.5M | 1.5M | 1.5M | 1.5M | 1.5M | 1.5M | 1.5M | 1.5M | 1.5M | 1.5M | 1.5M |
| Rd | P16 | 1M | 1M | 1M | 1M | 1M | 1M | 1M | 1M | 1M | 1M | 1M | 1M | 1M |

FIG.17A

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.20.0.2 | 132.30.0.2 | 128K | 2001/9/1 10:00 | 2001/9/1 12:00 | | | | |

FIG.17B

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 132.30.0.2 | 130.20.0.2 | 128K | 2001/9/1 10:00 | 2001/9/1 12:00 | | | | |

FIG.17C

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| | | | | | | | | | |

FIG.18A

| ROUTER PORT IP ADDRESS | ROUTER VIRTUAL IP ADDRESS |
|---|---|
| 130.10.0.1 | 130.10.0.5 |
| 130.20.0.1 | |
| 130.30.0.1 | |
| 130.40.0.1 | |

FIG.18B

| ROUTER PORT IP ADDRESS | ROUTER VIRTUAL IP ADDRESS |
|---|---|
| 132.10.0.1 | 132.10.0.5 |
| 132.20.0.1 | |
| 132.30.0.1 | |
| 132.40.0.1 | |
| 132.50.0.1 | |

FIG.18C

| ROUTER PORT IP ADDRESS | ROUTER VIRTUAL IP ADDRESS |
|---|---|
| 134.10.0.1 | 134.10.0.5 |
| 134.20.0.1 | |
| 134.30.0.1 | |
| 134.40.0.1 | |
| 134.50.0.1 | 134.50.0.5 |
| 134.60.0.1 | |
| 134.20.0.2 | |

FIG.27A

| DESTINATION IP ADDRESS | TRANSMITTER IP ADDRESS | DATA |
|---|---|---|
| 136.10.0.1 | 130.10.0.2 | (REQUESTED CONDITIONS) |

FIG.27B

| MIDDLEMAN SERVER IP ADDRESS |
|---|
| 138.10.0.1 |

FIG.27C

| CONTENT NAME | CAPACITY |
|---|---|
| CONTENT A | 57.6M |
| CONTENT B | 28.8M |

FIG.27D (a) 57.6 (Mbyte) × $\frac{8 \text{(bit)}}{64 \text{(Kbps)}}$ =7,200 (sec)

(b) "2001/9/1 10:00"+"7,200 (sec)"

| ORDERING NO. | MIDDLEMAN SERVER IP ADDRESS | DESTINATION IP ADDRESS | TRANSMITTER IP ADDRESS | DATA |
|---|---|---|---|---|
| α1 | 138.10.0.1 | 136.10.0.1 | 134.30.0.1 | |

FIG.28B

| ORDERING NO. | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|
| α1 | CONTENT A | 130.10.0.2 | 64K | 2001/9/1 10:00 | 2001/9/1 12:00 | 134.30.0.1 |

FIG.28C

| DESTINATION IP ADDRESS | TRANSMITTER IP ADDRESS | DATA |
|---|---|---|
| 136.10.0.1 | 132.40.0.1 | |

FIG.28D

| DESTINATION IP ADDRESS | TRANSMITTER IP ADDRESS | DATA |
|---|---|---|
| 136.10.0.1 | 130.30.0.1 | |

FIG.29A

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | 64K | 2001/9/1 10:00 | 2001/9/1 12:00 | 134.30.0.1 |
|  |  |  |  |  |  |  | 132.40.0.1 |
|  |  |  |  |  |  |  | 130.30.0.1 |

FIG.29B

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | 64K | 2001/9/1 10:00 | 2001/9/1 12:00 | 134.30.0.1 |
|  |  |  |  |  |  |  | 132.40.0.1 |
|  |  |  |  |  |  |  | 130.30.0.1 |

FIG.29C

| DESTINATION IP ADDRESS | TRANSMITTER IP ADDRESS | DATA |
|---|---|---|
| 138.10.0.1 | 136.10.0.1 | (α1 POLICY) |

FIG.30A 134.30.0.1
132.40.0.1
130.30.0.1

| NETWORK ADDRESS | POLICY SERVER IP ADDRESS | CLIENT MANAGEMENT SERVER IP ADDRESS |
|---|---|---|
| 130.0.0.0/9 | 130.40.0.3 | 130.40.0.4 |
| 132.0.0.0/9 | 132.50.0.3 | 132.50.0.4 |
| 134.0.0.0/9 | 134.40.0.3 | 134.40.0.4 |

FIG.30B

| ORDER RECEPTION NO. | POLICY SERVER IP ADDRESS | USER IP ADDRESS | CONTENT SERVER IP ADDRESS | REQUESTED BAND (bps) | RESERVATION START DATE AND TIME | RESERVATION END DATE AND TIME | ROUTER PORT IP ADDRESS |
|---|---|---|---|---|---|---|---|
| β1 | 134.40.0.3 | 130.10.0.2 | 136.10.0.1 | 64K | 2001/9/1 10:00 | 2001/9/1 12:00 | 134.30.0.1 |
| β2 | 132.50.0.3 | 130.10.0.2 | 136.10.0.1 | 64K | 2001/9/1 10:00 | 2001/9/1 12:00 | 132.40.0.1 |
| β3 | 130.40.0.3 | 130.10.0.2 | 136.10.0.1 | 64K | 2001/9/1 10:00 | 2001/9/1 12:00 | 130.30.0.1 |

FIG.31A

| CONTENT SERVER IP ADDRESS | ORDER-ING NO. | ORDER RECEPTION NUMBER | POLICY SERVER IP ADDRESS | RESERVATION RESULT |
|---|---|---|---|---|
| 136.10.0.1 | α1 | β1 | 134.40.0.3 | |
| | | β2 | 132.50.0.3 | |
| | | β3 | 130.40.0.3 | |

FIG.31B

| ORDER RECEPTION NO. | POLICY SERVER IP ADDRESS | USER IP ADDRESS | CONTENT SERVER IP ADDRESS | REQUESTED BAND (bps) | RESERVATION START DATE AND TIME | RESERVATION END DATE AND TIME | ROUTER PORT IP ADDRESS |
|---|---|---|---|---|---|---|---|
| β1 | 134.40.0.3 | 130.10.0.2 | 136.10.0.1 | 64K | 2001/9/1 10:00 | 2001/9/1 12:00 | 134.30.0.1 |
| β2 | 132.50.0.3 | 130.10.0.2 | 136.10.0.1 | 64K | 2001/9/1 10:00 | 2001/9/1 12:00 | 132.40.0.1 |
| β3 | 130.40.0.3 | 130.10.0.2 | 136.10.0.1 | 64K | 2001/9/1 10:00 | 2001/9/1 12:00 | 130.30.0.1 |

FIG.31C

| DESTINATION IP ADDRESS | TRANSMITTER IP ADDRESS | DATA |
|---|---|---|
| 134.40.0.3 | 138.10.0.1 | (β1 POLICY FOR POLICY SERVER Pc) |

FIG.31D

| DESTINATION IP ADDRESS | TRANSMITTER IP ADDRESS | DATA |
|---|---|---|
| 132.50.0.3 | 138.10.0.1 | (β2 POLICY FOR POLICY SERVER Pb) |

FIG.31E

| DESTINATION IP ADDRESS | TRANSMITTER IP ADDRESS | DATA |
|---|---|---|
| 130.40.0.3 | 138.10.0.1 | (β3 POLICY FOR POLICY SERVER Pa) |

FIG.32A

| ROUTER PORT IP ADDRESS | ROUTER VIRTUAL IP ADDRESS |
|---|---|
| 134.10.0.1 | 134.10.0.5 |
| 134.20.0.1 | |
| 134.30.0.1 | |
| 134.40.0.1 | |
| 134.50.0.1 | 134.50.0.5 |
| 134.60.0.1 | |
| 134.20.0.2 | |

FIG.32B

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.10.0.2 | 136.10.0.1 | 64K | 2001/9/1 10:00 | 2001/9/1 12:00 | 138.10.0.1 | β1 | 134.10.0.5 | |

FIG.32C

| DESTINATION IP ADDRESS | TRANSMITTER IP ADDRESS | DATA |
|---|---|---|
| 134.10.0.5 | 134.40.0.3 | (INQUIRY ABOUT ROUTER OUTPUT PORT TO USER IP ADDRESS OF NO.1 POLICY) |

FIG.33A

| DESTINATION IP ADDRESS | TRANSMITTER IP ADDRESS | DATA |
|---|---|---|
| 134.40.0.3 | 134.10.0.5 | (OUTPUT PORT P10 TO USER IP ADDRESS OF NO.1 POLICY) |

FIG.33B

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.10.0.2 | 136.10.0.1 | 64K | 2001/9/1 10:00 | 2001/9/1 12:00 | 138.10.0.1 | β1 | 134.10.0.5 | P10 |

FIG.33C

RESIDUAL LINE BAND = 1Mbps − 64Kbps
= 0.936Mbps > 0

FIG.33D

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Rc | P10 | 1M | 1M | 1M | 1M | 1M | 1M | 0.936M | 1M | 1M | 1M | 1M | 1M | 1M |
| Rc | P11 | 1M | 1M | 1M | 1M | 1M | 1M | 1M | 1M | 1M | 1M | 1M | 1M | 1M |
| Rd | P14 | 1.5M | 1.5M | 1.5M | 1.5M | 1.5M | 1.5M | 1.5M | 1.5M | 1.5M | 1.5M | 1.5M | 1.5M | 1.5M |
| Rd | P16 | 1M | 1M | 1M | 1M | 1M | 1M | 1M | 1M | 1M | 1M | 1M | 1M | 1M |

FIG.33E

| DESTINATION IP ADDRESS | TRANSMITTER IP ADDRESS | DATA |
|---|---|---|
| 138.10.0.1 | 134.40.0.3 | (RESERVATION RESULT OF β1 POLICY "O") |

FIG.34A

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.10.0.2 | 136.10.0.1 | 64K | 2001/9/1 10:00 | 2001/9/1 12:00 | 138.10.0.1 | β1 | 134.10.0.5 | P10 |

FIG.34B

| DESTINATION IP ADDRESS 134.10.0.5 | TRANSMITTER IP ADDRESS 134.40.0.3 | DATA (INSTRUCTION TO SET NO.1 POLICY) |
|---|---|---|

FIG.34C

| DESTINATION IP ADDRESS 134.40.0.3 | TRANSMITTER IP ADDRESS 134.10.0.5 | DATA (COMPLETION OF SETTING OF NO.1 POLICY) |
|---|---|---|

FIG.34D

| DESTINATION IP ADDRESS 138.10.0.1 | TRANSMITTER IP ADDRESS 132.50.0.3 | DATA (RESERVATION RESULT OF β2 POLICY "○") |
|---|---|---|

FIG.34E

| DESTINATION IP ADDRESS 138.10.0.1 | TRANSMITTER IP ADDRESS 130.40.0.3 | DATA (RESERVATION RESULT OF β3 POLICY "○") |
|---|---|---|

FIG.35A

| CONTENT SERVER IP ADDRESS | ORDER-ING NO. | ORDER RECEPTION NUMBER | POLICY SERVER IP ADDRESS | RESERVATION RESULT |
|---|---|---|---|---|
| 136.10.0.1 | α1 | β1 | 134.40.0.3 | ○ |
| | | β2 | 132.50.0.3 | ○ |
| | | β3 | 130.40.0.3 | ○ |

FIG.35B

| DESTINATION IP ADDRESS | TRANSMITTER IP ADDRESS | DATA |
|---|---|---|
| 136.10.0.1 | 138.10.0.1 | (GENERAL DETERMINATION RESULT OF α1 POLICY "○") |

FIG.35C

| DESTINATION IP ADDRESS | TRANSMITTER IP ADDRESS | DATA |
|---|---|---|
| 130.10.0.2 | 136.10.0.1 | (COMPLETION OF RESERVATION) |

FIG.41A

| USER IP ADDRESS | CONNECTION BAND (bps) |
|---|---|
| 130.10.0.2 | 64K |
| 130.20.0.2 | 128K |
| 130.10.0.3 | |

FIG.41B

| USER IP ADDRESS | CONNECTION BAND (bps) |
|---|---|
| 132.30.0.2 | 128K |

FIG.41C

| USER IP ADDRESS | CONNECTION BAND (bps) |
|---|---|
| | |

FIG.42A

| DESTINATION IP ADDRESS | TRANSMITTER IP ADDRESS | DATA |
|---|---|---|
| 136.10.0.1 | 130.10.0.2 | (REQUESTED CONDITIONS) |

FIG.42B

| MIDDLEMAN SERVER IP ADDRESS |  |
|---|---|
| 138.10.0.1 |  |

FIG.42C

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 |  | 2001/9/1 10:00 |  |  |

FIG.42D

| DESTINATION IP ADDRESS | TRANSMITTER IP ADDRESS | DATA |
|---|---|---|
| 130.10.0.2 | 136.10.0.1 |  |

FIG.43A

| ORDERING NO. | MIDDLEMAN SERVER IP ADDRESS | DESTINATION IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|---|
| α1 | 138.10.0.1 | 136.10.0.1 | CONTENT A | 130.10.0.2 | | 2001/9/1 10:00 | | 134.30.0.1 |

FIG.43B

| DESTINATION IP ADDRESS 136.10.0.1 | TRANSMITTER IP ADDRESS 134.30.0.1 | DATA |
|---|---|---|

FIG.43C

| DESTINATION IP ADDRESS 136.10.0.1 | TRANSMITTER IP ADDRESS 132.40.0.1 | DATA |
|---|---|---|

FIG.43D

| DESTINATION IP ADDRESS 136.10.0.1 | TRANSMITTER IP ADDRESS 130.30.0.1 | DATA |
|---|---|---|

FIG.44A

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | | 2000/9/1 10:00 | | 134.30.0.1 |
| | | | | | | | 132.40.0.1 |
| | | | | | | | 130.30.0.1 |

FIG.44B

| CONTENT NAME | CAPACITY (byte) |
|---|---|
| CONTENT A | 57.6M |
| CONTENT B | 28.8M |

FIG.44C

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | | 2000/9/1 10:00 | | 134.30.0.1 |
| | | | | | | | 132.40.0.1 |
| | | | | | | | 130.30.0.1 |

FIG.44D

| DESTINATION IP ADDRESS 138.10.0.1 | TRANSMITTER IP ADDRESS 136.10.0.1 | DATA (CONTENT CAPACITY, α1 POLICY) |
|---|---|---|

FIG.45A

| NETWORK ADDRESS | POLICY SERVER IP ADDRESS | CLIENT MANAGEMENT SERVER IP ADDRESS |
|---|---|---|
| 130.0.0.0/9 | 130.40.0.3 | 130.40.0.4 |
| 132.0.0.0/9 | 132.50.0.3 | 132.50.0.4 |
| 134.0.0.0/9 | 134.40.0.3 | 134.40.0.4 |

| ORDER RECEPTION NO. | POLICY SERVER IP ADDRESS | USER IP ADDRESS | CONTENT SERVER IP ADDRESS | REQUESTED BAND (bps) | RESERVATION START DATE AND TIME | RESERVATION END DATE AND TIME | ROUTER PORT IP ADDRESS |
|---|---|---|---|---|---|---|---|
| β1 | 134.40.0.3 | 130.10.0.2 | 136.10.0.1 | | 2000/9/1 10:00 | | 134.30.0.1 |
| β2 | 132.50.0.3 | 130.10.0.2 | 136.10.0.1 | | 2000/9/1 10:00 | | 132.40.0.1 |
| β3 | 130.40.0.3 | 130.10.0.2 | 136.10.0.1 | | 2000/9/1 10:00 | | 130.30.0.1 |

FIG.45C

| CONTENT SERVER IP ADDRESS | ORDERING NO. | ORDER RECEPTION NUMBER | POLICY SERVER IP ADDRESS | RESERVATION RESULT |
|---|---|---|---|---|
| 136.10.0.1 | α1 | β1 | 134.40.0.3 | |
| | | β2 | 132.50.0.3 | |
| | | β3 | 130.40.0.3 | |

FIG.45D

| NETWORK ADDRESS | POLICY SERVER IP ADDRESS | CLIENT MANAGEMENT SERVER IP ADDRESS |
|---|---|---|
| 130.0.0.0/9 | 130.40.0.3 | 130.40.0.4 |
| 132.0.0.0/9 | 132.50.0.3 | 132.50.0.4 |
| 134.0.0.0/9 | 134.40.0.3 | 134.40.0.4 |

FIG.45E

| DESTINATION IP ADDRESS 130.40.0.4 | TRANSMITTER IP ADDRESS 138.10.0.1 | DATA (ORDERING NO., USER IP ADDRESS, INQUIRY ABOUT CONNECTION BAND) |
|---|---|---|

FIG.46A

| USER IP ADDRESS | CONNECITON BAND (bps) |
|---|---|
| 130.10.0.2 | 64K |
| 130.20.0.2 | 128K |
| 130.10.0.3 | |

FIG.46B

| DESTINATION IP ADDRESS 138.10.0.1 | TRANSMITTER IP ADDRESS 130.40.0.4 | DATA (ORDERING NO., CONNECTION BAND "64Kbps") |
|---|---|---|

FIG.46C (a) $57.6 \text{(Mbyte)} \times \dfrac{8 \text{ (bit)}}{64 \text{(Kbps)}} = 7,200 \text{ (sec)}$ (b) "2001/9/1 10:00" + "7,200(sec)"

| ORDER RECEPTION NO. | POLICY SERVER IP ADDRESS | USER IP ADDRESS | CONTENT SERVER IP ADDRESS | REQUESTED BAND (bps) | RESERVATION START DATE AND TIME | RESERVATION END DATE AND TIME | ROUTER PORT IP ADDRESS |
|---|---|---|---|---|---|---|---|
| β1 | 134.40.0.3 | 130.10.0.2 | 136.10.0.1 | 64K | 2000/9/1 10:00 | 2000/9/1 12:00 | 134.30.0.1 |
| β2 | 132.50.0.3 | 130.10.0.2 | 136.10.0.1 | 64K | 2000/9/1 10:00 | 2000/9/1 12:00 | 132.40.0.1 |
| β3 | 130.40.0.3 | 130.10.0.2 | 136.10.0.1 | 64K | 2000/9/1 10:00 | 2000/9/1 12:00 | 130.30.0.1 |

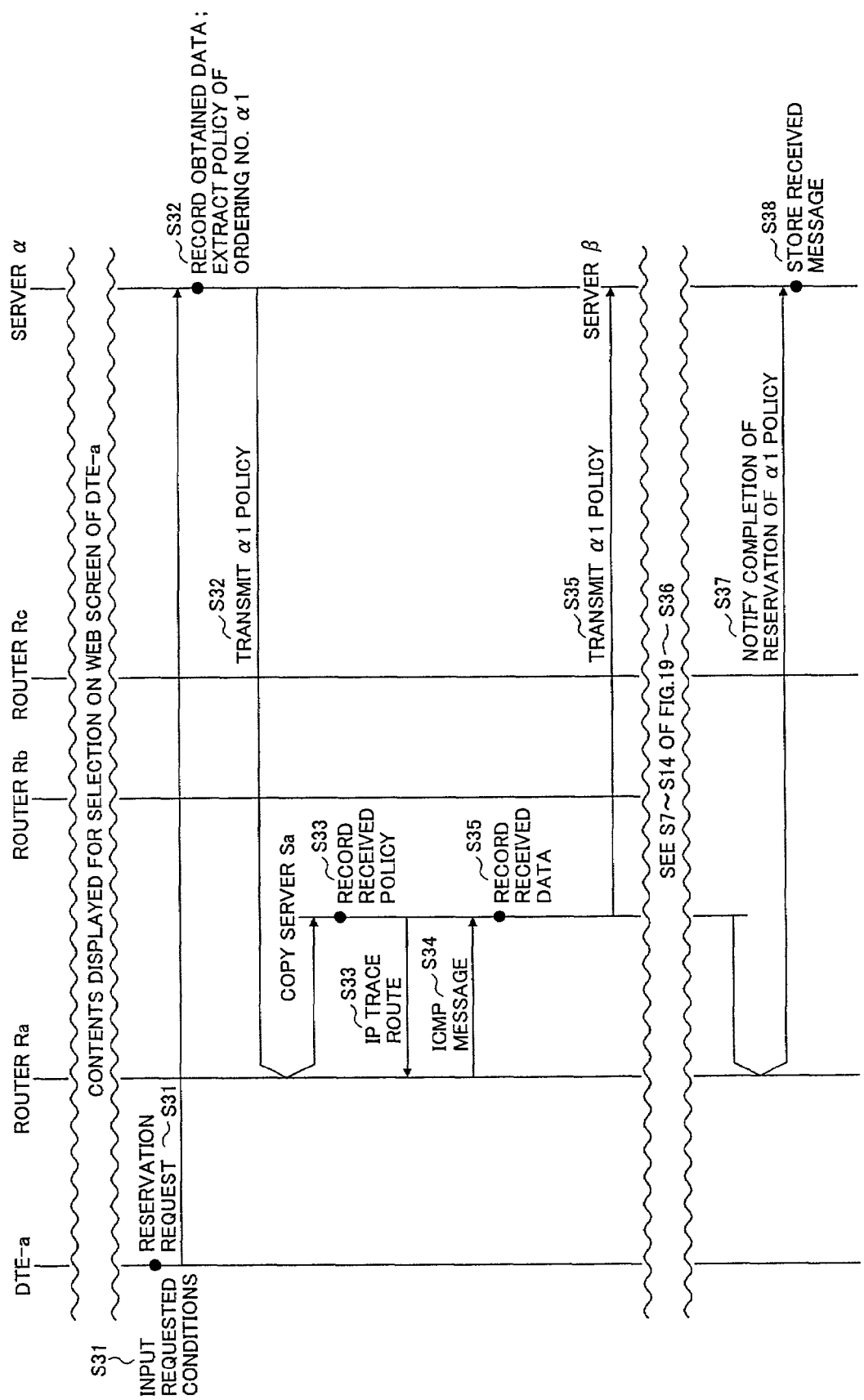

FIG.51A

| NETWORK ADDRESS | COPY SERVER IP ADDRESS |
|---|---|
| 130.0.0.0/9 | 130.40.0.2 |
| 132.0.0.0/9 | 132.50.0.2 |
| 134.0.0.0/9 | 134.40.0.2 |

FIG.51B

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| | | | | | | | |

FIG.52

| DESTINATION IP ADDRESS 136.10.0.1 | TRANSMITTER IP ADDRESS 130.10.0.2 | DATA (REQUESTED CONDITIONS) |
|---|---|---|

FIG.53A

| MIDDLEMAN SERVER IP ADDRESS |
|---|
| 138.10.0.1 |

FIG.53B

| CONTENT NAME | CAPACITY (byte) |
|---|---|
| CONTENT A | 57.6M |
| CONTENT B | 28.8M |

FIG.53C (a) 57.6(Mbyte) × $\dfrac{8 \text{ (bit)}}{64 \text{(Kbps)}}$ = 7,200 (sec)

(b) "2001/9/1 10:00" + "7,200(sec)"

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | 64K | 2001/9/1 10:00 | 2001/9/1 12:00 | |

FIG.53E

| NETWORK ADDRESS | COPY SERVER IP ADDRESS |
|---|---|
| 130.0.0.0/9 | 130.40.0.2 |
| 132.0.0.0/9 | 132.50.0.2 |
| 134.0.0.0/9 | 134.40.0.2 |

FIG.53F

| DESTINATION IP ADDRESS | TRANSMITTER IP ADDRESS | DATA (α1 POLICY) |
|---|---|---|
| 130.40.0.2 | 136.10.0.1 | |

FIG.54A

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | 64K | 2001/9/1 10:00 | 2001/9/1 12:00 | |

FIG.54B

| DESTINATION IP ADDRESS 130.10.0.2 | TRANSMITTER IP ADDRESS 130.40.0.2 | DATA |
|---|---|---|

FIG.54C

| DESTINATION IP ADDRESS 130.40.0.2 | TRANSMITTER IP ADDRESS 130.40.0.1 | DATA |
|---|---|---|

FIG.54D

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | 64K | 2001/9/1 10:00 | 2001/9/1 12:00 | 130.40.0.1 |

FIG.54E

| DESTINATION IP ADDRESS | TRANSMITTER IP ADDRESS | DATA |
|---|---|---|
| 136.10.0.1 | 130.40.0.4 | (COMPLETION OF α1 POLICY RESERVATION) |

FIG.62A

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Ra | P1 | — | — | — | — | — | — | — | — | — | — | — | — | — |
| Ra | P2 | — | — | — | — | — | — | — | — | — | — | — | — | — |

FIG.62B

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Rb | P5 | 1.5M | 1.5M | 1.5M | 1.5M | 1.5M | 1.5M | 1.308M | 1.5M | 1.5M | 1.5M | 1.5M | 1.5M | 1.5M |
| Rb | P6 | — | — | — | — | — | — | — | — | — | — | — | — | — |

FIG.62C

| ROUTER | PORT NO. | LINE BAND FOR USE (bps) | LINE BAND LEFT FOR EACH RESERVATION PERIOD (bps) | | | | | | | | | | | |
|---|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Rc | P10 | 1M | 1M | 1M | 1M | 1M | 1M | 0.936M | 1M | 1M | 1M | 1M | 1M | 1M |
| Rc | P11 | 1M | 1M | 1M | 1M | 1M | 1M | 1M | 1M | 1M | 1M | 1M | 1M | 1M |
| Rd | P14 | 1.5M | 1.5M | 1.5M | 1.5M | 1.5M | 1.5M | 1.5M | 1.5M | 1.5M | 1.5M | 1.5M | 1.5M | 1.5M |
| Rd | P16 | 1M | 1M | 1M | 1M | 1M | 1M | 1M | 1M | 1M | 1M | 1M | 1M | 1M |

FIG.63A

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.20.0.2 | 132.30.0.2 | 128K | 2001/9/1 10:00 | 2001/9/1 12:00 | | | 130.10.0.5 | P2 |
| 2 | 130.10.0.2 | 136.10.0.1 | 64K | 2001/9/1 10:00 | 2001/9/1 12:00 | 138.10.0.1 | β3 | 130.10.0.5 | P1 |

FIG.63B

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 132.30.0.2 | 130.20.0.2 | 128K | 2001/9/1 10:00 | 2001/9/1 12:00 | | | 132.10.0.5 | P6 |
| 2 | 130.10.0.2 | 136.10.0.1 | 64K | 2001/9/1 10:00 | 2001/9/1 12:00 | 138.10.0.1 | β2 | 132.10.0.5 | P5 |

FIG.63C

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.10.0.2 | 136.10.0.1 | 64K | 2001/9/1 10:00 | 2001/9/1 12:00 | 138.10.0.1 | β1 | 134.10.0.5 | P10 |

FIG.64A

| DESTINATION IP ADDRESS 136.10.0.1 | TRANSMITTER IP ADDRESS 130.10.0.2 | DATA (CANCELLATION OF α1 POLICY) |
|---|---|---|

FIG.64B

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α1 | 138.10.0.1 | CONTENT A | 130.10.0.2 | 64K | 2000/9/1 10:00 | 2001/9/1 12:00 | 134.30.0.1 |
| | | | | | | | 132.40.0.1 |
| | | | | | | | 130.30.0.1 |

FIG.64C

| DESTINATION IP ADDRESS 138.10.0.1 | TRANSMITTER IP ADDRESS 136.10.0.1 | DATA (CANCELLATION OF α1 POLICY) |
|---|---|---|

FIG.65A

| CONTENT SERVER IP ADDRESS | ORDERING NO. | ORDER RECEPTION NUMBER | POLICY SERVER IP ADDRESS | RESERVATION RESULT |
|---|---|---|---|---|
| 136.10.0.1 | α1 | β1 | 134.40.0.3 | ○ |
| | | β2 | 132.50.0.3 | ○ |
| | | β3 | 130.40.0.3 | ○ |

FIG.65B

| DESTINATION IP ADDRESS 134.40.0.3 | TRANSMITTER IP ADDRESS 138.10.0.1 | DATA (INSTRUCTION TO CANCEL β1 POLICY FOR POLICY SERVER Pc) |
|---|---|---|

FIG.65C

| DESTINATION IP ADDRESS 132.50.0.3 | TRANSMITTER IP ADDRESS 138.10.0.1 | DATA (INSTRUCTION TO CANCEL β2 POLICY FOR POLICY SERVER Pb) |

FIG.65D

| DESTINATION IP ADDRESS 130.40.0.3 | TRANSMITTER IP ADDRESS 138.10.0.1 | DATA (INSTRUCTION TO CANCEL β3 POLICY FOR POLICY SERVER Pa) |

FIG.66A

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.10.0.2 | 136.10.0.1 | 64K | 2001/9/1 10:00 | 2001/9/1 12:00 | 138.10.0.1 | β1 | 134.10.0.5 | P10 |

FIG.66B

| DESTINATION IP ADDRESS | TRANSMITTER IP ADDRESS | DATA |
|---|---|---|
| 134.10.0.5 | 134.40.0.3 | (INSTRUCTION TO CANCEL NO.1 POLICY) |

FIG.66C

| DESTINATION IP ADDRESS | TRANSMITTER IP ADDRESS | DATA |
|---|---|---|
| 134.40.0.3 | 134.10.0.5 | (COMPLETION OF NO.1 POLICY CANCELLATION) |

FIG.67A

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 130.10.0.2 | 136.10.0.1 | 64K | 2001/9/1 10:00 | 2001/9/1 12:00 | 138.10.0.1 | β1 | 134.10.0.5 | P10 |

FIG.67B

RESIDUAL LINE BAND = 0.936Mbps + 64Kbps = 1Mbps

FIG.67C

| ROUTER | PORT NO. | LINE BAND FOR USE (bps) | LINE BAND LEFT FOR EACH RESERVATION PERIOD (bps) | | | | | | | | | | |
|---|---|---|---|---|---|---|---|---|---|---|---|---|---|
| | | | 0-2 | 2-4 | 4-6 | 6-8 | 8-10 | 10-12 | 12-14 | 14-16 | 16-18 | 18-20 | 20-22 | 22-24 |
| Rc | P10 | 1M | 1M | 1M | 1M | 1M | 1M | 1M | 1M | 1M | 1M | 1M | 1M | 1M |
| Rc | P11 | 1M | 1M | 1M | 1M | 1M | 1M | 1M | 1M | 1M | 1M | 1M | 1M | 1M |
| Rd | P14 | 1.5M | 1.5M | 1.5M | 1.5M | 1.5M | 1.5M | 1.5M | 1.5M | 1.5M | 1.5M | 1.5M | 1.5M | 1.5M |
| Rd | P16 | 1M | 1M | 1M | 1M | 1M | 1M | 1M | 1M | 1M | 1M | 1M | 1M | 1M |

FIG.67D

| DESTINATION IP ADDRESS | TRANSMITTER IP ADDRESS | DATA |
|---|---|---|
| 138.10.0.1 | 134.40.0.3 | (COMPLETION OF β1 POLICY RESERVATION CANCELLATION) |

FIG.67E

| POLICY NO. | DESTINATION IP ADDRESS | TRANSMITTER IP ADDRESS | REQUESTED BAND (bps) | RESERVATION START DATE AND TIME | RESERVATION END DATE AND TIME | MIDDLEMAN SERVER IP ADDRESS | ORDER RECEPTION NO. | ROUTER VIRTUAL IP ADDRESS | OUTPUT PORT NO. |
|---|---|---|---|---|---|---|---|---|---|
| 1 | 138.10.0.2 | 138.10.0.1 | 64K | 2001/9/1 10:00 | 2001/9/1 12:00 | 138.10.0.1 | β1 | 134.10.0.5 | P10 |

FIG.68D

| DESTINATION IP ADDRESS 136.10.0.1 | TRANSMITTER IP ADDRESS 138.10.0.1 | DATA (COMPLETION OF α1 POLICY RESERVATION CANCELLATION) |
|---|---|---|

FIG.68E

| ORDERING NO. | CONTENT SERVER IP ADDRESS | ORDER RECEPTION NUMBER | POLICY SERVER IP ADDRESS | RESERVATION RESULT |
|---|---|---|---|---|
| α1 | 136.10.0.1 | β1 | 134.40.0.3 | |
| | | β2 | 132.50.0.3 | |
| | | β3 | 130.40.0.3 | |

FIG.69A

| DESTINATION IP ADDRESS | TRANSMITTER IP ADDRESS | DATA |
|---|---|---|
| 130.10.0.2 | 136.10.0.1 | (COMPLETION OF α1 POLICY CANCELLATION) |

FIG.69B

| ORDERING NO. | MIDDLEMAN SERVER IP ADDRESS | CONTENT NAME | USER IP ADDRESS | REQUESTED BAND (bps) | RESERVATION START DATE AND TIME | RESERVATION END DATE AND TIME | ROUTER PORT IP ADDRESS (TRACE ROUTE INPUT SIDE) |
|---|---|---|---|---|---|---|---|
| α-1 | 138.10.0.1 | CONTENT A | 130.10.0.2 | 64K | | | 134.30.0.1 |
| | | | | | | | 132.40.0.1 |
| | | | | | | | 130.30.0.1 |

FIG.70B

| TERMINAL/SERVER | IP ADDRESS | ISP-a | PORT | IP ADDRESS | ISP-b | PORT | IP ADDRESS | ISP-c | PORT | IP ADDRESS |
|---|---|---|---|---|---|---|---|---|---|---|
| DTE-a | 130.10.0.2 | ROUTER Ra | P1 | 130.10.0.1 | ROUTER Rb | P5 | 132.10.0.1 | ROUTER Rc | P10 | 134.10.0.1 |
| DTE-b | 130.20.0.2 | | P2 | 130.20.0.1 | | P6 | 132.20.0.1 | | P11 | 134.20.0.1 |
| DTE-c | 132.20.0.2 | | P3 | 130.30.0.1 | | P7 | 132.30.0.1 | | P12 | 134.30.0.1 |
| SERVER α | 136.10.0.1 | | P4 | 130.40.0.1 | | P8 | 132.40.0.1 | | P13 | 134.40.0.1 |
| SERVER β | 138.10.0.1 | SERVER Ca | - | 130.40.0.2 | | P9 | 132.50.0.1 | ROUTER Rd | P14 | 134.50.0.1 |
| SERVER γ | 140.10.0.1 | | | | SERVER Cb | - | 132.50.0.2 | | P15 | 134.60.0.1 |
| | | | | | | | | | P16 | 134.20.0.2 |
| | | | | | | | | | P17 | 134.70.0.2 |
| | | | | | | | | SERVER Cc | - | 134.40.0.2 |

FIG.80A

| PAYMENT ID |
|---|
| β 1 |

FIG.80B

| PAYMENT ID |
|---|
| β 2 |

FIG.81A

| PAYMENT ID | CONTENT SERVER IP ADDRESS |
|---|---|
| β 1 | 136.10.0.1 |
| β 2 | 140.10.0.1 |

FIG.81B

| AMOUNT BILLED (YEN) | PAYMENT ID | DESTINATION IP ADDRESS | DESTINATION PORT NO. | RESERVED BAND (bps) | USAGE START DATE AND TIME | USAGE END DATE AND TIME | ISP SERVER IP ADDRESS |
|---|---|---|---|---|---|---|---|
|  |  |  |  |  |  |  |  |

FIG.82A

| PAYMENT ID | MIDDLEMAN SERVER IP ADDRESS |
|---|---|
| β1 | 138.10.0.1 |
| β2 | 138.10.0.1 |

FIG.82B

| AMOUNT BILLED (YEN) | PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|---|
|  |  |  |  |  |  |  |

FIG.83A

| PAYMENT ID |
|---|
| β1 |
| β2 |

FIG.83B

| PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|
| β1 | 130.20.0.2 | P2 | 64K | 2001/9/1 9:00 | 2001/9/1 11:00 |

FIG.83C

| PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|
| β1 | 130.20.0.2 | P2 | 64K | 2001/9/1 9:00 | 2001/9/1 11:00 |
| β2 | 132.20.0.2 | P6 | 64K | 2001/9/1 9:00 | 2001/9/1 12:00 |

FIG.83D

| PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|
| β1 | 130.20.0.2 | P2 | 64K | 2001/9/1 9:00 | 2001/9/1 11:00 |

FIG.83E

| PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|
| β2 | 132.20.0.2 | P6 | 64K | 2001/9/1 9:00 | 2001/9/1 12:00 |

FIG.84A

| DESTINATION IP ADDRESS 136.10.0.1 | TRANSMITTER IP ADDRESS 130.10.0.2 | DATA (REQUESTED CONDITION) |

FIG.84B

| DESTINATION IP ADDRESS 130.10.0.2 | TRANSMITTER IP ADDRESS 136.10.0.1 | DATA (CONTENT A) |

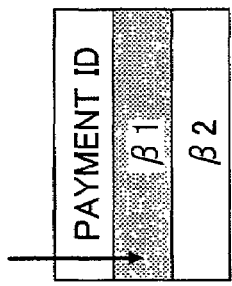
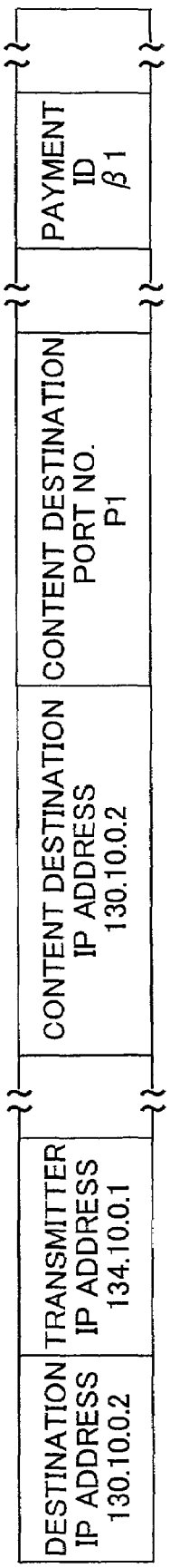
FIG.85A, FIG.85B, FIG.85C

FIG.86A

| DESTINATION IP ADDRESS 130.10.0.2 | TRANSMITTER IP ADDRESS 132.10.0.1 | ~ | CONTENT DESTINATION IP ADDRESS 130.10.0.2 | CONTENT DESTINATION PORT NO. P1 | ~ | PAYMENT ID β1 | ~ |

FIG.86B

| DESTINATION IP ADDRESS 130.10.0.2 | TRANSMITTER IP ADDRESS 130.10.0.1 | ~ | CONTENT DESTINATION IP ADDRESS 130.10.0.2 | CONTENT DESTINATION PORT NO. P1 | ~ | PAYMENT ID β1 | ~ |

FIG.87

| DESTINATION IP ADDRESS 136.10.0.1 | TRANSMITTER IP ADDRESS 130.10.0.2 | ~~ | CONTENT DESTINATION IP ADDRESS 130.10.0.2 | CONTENT DESTINATION PORT NO. P1 | ~~ | FLOW SPEC REQUESTED BAND | ~~ | PAYMENT ID β1 |

FIG.88A

| PAYMENT ID |
|---|
| β1 |
| β2 |

FIG.88B

| PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|
| β1 | 130.20.0.2 | P2 | 64K | 2001/9/1 9:00 | 2001/9/1 11:00 |
| β1 | 130.10.0.2 | P1 | 64K | 2001/9/1 10:00 | |

FIG.88C

| DESTINATION IP ADDRESS 136.10.0.1 | TRANSMITTER IP ADDRESS 130.30.0.1 | ⋯ | CONTENT DESTINATION IP ADDRESS 130.10.0.2 | CONTENT DESTINATION PORT NO. P1 | ⋯ | FLOW SPEC REQUESTED BAND | ⋯ | PAYMENT ID β1 | ⋯ |

FIG.89A

| DESTINATION IP ADDRESS 136.10.0.1 | TRANSMITTER IP ADDRESS 132.40.0.1 | ~ | CONTENT DESTINATION IP ADDRESS 130.10.0.2 | CONTENT DESTINATION PORT NO. P1 | ~ | FLOW SPEC REQUESTED BAND | ~ | PAYMENT ID β1 |

FIG.89B

| DESTINATION IP ADDRESS 136.10.0.1 | TRANSMITTER IP ADDRESS 134.30.0.1 | ~ | CONTENT DESTINATION IP ADDRESS 130.10.0.2 | CONTENT DESTINATION PORT NO. P1 | ~ | FLOW SPEC REQUESTED BAND | ~ | PAYMENT ID β1 |

FIG.89C

| DESTINATION IP ADDRESS 136.10.0.1 | TRANSMITTER IP ADDRESS 130.10.0.2 | ~ | CONTENT DESTINATION IP ADDRESS 130.10.0.2 | CONTENT DESTINATION PORT NO. P1 | ~ | PAYMENT ID β1 |

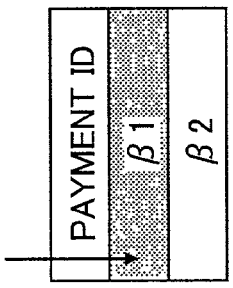

FIG.91A

| DESTINATION IP ADDRESS 136.10.0.1 | TRANSMITTER IP ADDRESS 132.40.0.1 | ~ | CONTENT DESTINATION IP ADDRESS 130.10.0.2 | CONTENT DESTINATION PORT NO. P1 | ~ | PAYMENT ID β1 |

FIG.91B

| DESTINATION IP ADDRESS 136.10.0.1 | TRANSMITTER IP ADDRESS 134.30.0.1 | ~ | CONTENT DESTINATION IP ADDRESS 130.10.0.2 | CONTENT DESTINATION PORT NO. P1 | ~ | PAYMENT ID β1 |

FIG.91C

| DESTINATION IP ADDRESS 136.10.0.1 | TRANSMITTER IP ADDRESS 136.10.0.1 | ~ | CONTENT DESTINATION IP ADDRESS 130.10.0.2 | CONTENT DESTINATION PORT NO. P1 | ~ | PAYMENT ID β1 |

FIG.92C

| DESTINATION IP ADDRESS 130.10.0.2 | TRANSMITTER IP ADDRESS 132.10.0.1 | ~ | CONTENT DESTINATION IP ADDRESS 130.10.0.2 | CONTENT DESTINATION PORT NO. P1 | ~ | PAYMENT ID $\beta 1$ |

FIG.92D

| DESTINATION IP ADDRESS 130.10.0.2 | TRANSMITTER IP ADDRESS 130.10.0.1 | ~ | CONTENT DESTINATION IP ADDRESS 130.10.0.2 | CONTENT DESTINATION PORT NO. P1 | ~ | PAYMENT ID $\beta 1$ |

FIG.93A

| DESTINATION IP ADDRESS 134.40.0.1 | TRANSMITTER IP ADDRESS 134.40.0.2 | DATA (REQUEST FOR LOG OF BAND USAGE PARTICULARS TABLE) |
|---|---|---|

FIG.93B

| DESTINATION IP ADDRESS 134.20.0.2 | TRANSMITTER IP ADDRESS 134.40.0.2 | DATA (REQUEST FOR LOG OF BAND USAGE PARTICULARS TABLE) |
|---|---|---|

FIG.93C

| DESTINATION IP ADDRESS 134.40.0.2 | TRANSMITTER IP ADDRESS 134.40.0.1 | DATA (LOG OF BAND USAGE PARTICULARS TABLE) |

FIG.93D

| DESTINATION IP ADDRESS 134.40.0.2 | TRANSMITTER IP ADDRESS 134.20.0.2 | DATA (LOG OF BAND USAGE PARTICULARS TABLE) |

FIG.94A

| AMOUNT BILLED (YEN) | PAYMENT ID | DESTINATION IP ADDRESS | DESTINATION PORT NO. | RESERVED BAND (bps) | USAGE START DATE AND TIME | USAGE END DATE AND TIME |
|---|---|---|---|---|---|---|
| aaa | β1 | 130.20.0.2 | P2 | 64K | 2001/9/1 9:00 | 2001/9/1 11:00 |
| bbb | β1 | 130.10.0.2 | P1 | 64K | 2001/9/1 10:00 | 2001/9/1 12:00 |
| ccc | β2 | 132.20.0.2 | P6 | 64K | 2001/9/1 9:00 | 2001/9/1 12:00 |

FIG.94B

| PAYMENT ID | MIDDLEMEN SERVER IP ADDRESS |
|---|---|
| β1 | 138.10.0.1 |
| β2 | 138.10.0.1 |

FIG.94C

| DESTINATION IP ADDRESS 138.10.0.1 | TRANSMITTER IP ADDRESS 134.40.0.2 | DATA (BILLING PARTICULARS) |
|---|---|---|

FIG.94D

| DESTINATION IP ADDRESS 138.10.0.1 | TRANSMITTER IP ADDRESS 132.50.0.2 | DATA (BILLING PARTICULARS) |
|---|---|---|

FIG.94E

| DESTINATION IP ADDRESS 138.10.0.1 | TRANSMITTER IP ADDRESS 130.40.0.2 | DATA (BILLING PARTICULARS) |
|---|---|---|

FIG.95A

| AMOUNT BILLED (YEN) | PAYMENT ID | DESTINATION IP ADDRESS | DESTINATION PORT NO. | RESERVED BAND (bps) | USAGE START DATE AND TIME | USAGE END DATE AND TIME | ISP SERVER IP ADDRESS |
|---|---|---|---|---|---|---|---|
| aaa | β1 | 130.20.0.2 | P2 | 64K | 2001/9/1 9:00 | 2001/9/1 11:00 | 134.40.0.2 |
| bbb | β1 | 130.10.0.2 | P1 | 64K | 2001/9/1 10:00 | 2001/9/1 12:00 | 134.40.0.2 |
| ccc | β2 | 132.20.0.2 | P6 | 64K | 2001/9/1 9:00 | 2001/9/1 12:00 | 134.40.0.2 |
| ddd | β1 | 130.20.0.2 | P2 | 64K | 2001/9/1 9:00 | 2001/9/1 11:00 | 132.50.0.2 |
| eee | β2 | 132.20.0.2 | P6 | 64K | 2001/9/1 10:00 | 2001/9/1 12:00 | 132.50.0.2 |
| fff | β1 | 130.10.0.2 | P1 | 64K | 2001/9/1 10:00 | 2001/9/1 12:00 | 132.50.0.2 |
| ggg | β1 | 130.20.0.2 | P2 | 64K | 2001/9/1 9:00 | 2001/9/1 11:00 | 130.40.0.2 |
| hhh | β1 | 130.10.0.2 | P1 | 64K | 2001/9/1 10:00 | 2001/9/1 12:00 | 130.40.0.2 |

FIG.95B

| PAYMENT ID | CONTENT SERVER IP ADDRESS |
|---|---|
| β1 | 136.10.0.1 |
| β2 | 140.10.0.1 |

FIG.95C

| DESTINATION IP ADDRESS 136.10.0.1 | TRANSMITTER IP ADDRESS 138.10.0.1 | DATA (BILLING PARTICULARS) |
|---|---|---|

FIG.95D

| DESTINATION IP ADDRESS 140.10.0.1 | TRANSMITTER IP ADDRESS 138.10.0.1 | DATA (BILLING PARTICULARS) |
|---|---|---|

FIG.96A

| DESTINATION IP ADDRESS 130.10.0.2 | TRANSMITTER IP ADDRESS 136.10.0.1 | DATA (BILLING PARTICULARS) |
|---|---|---|

FIG.96B

| DESTINATION IP ADDRESS 130.20.0.2 | TRANSMITTER IP ADDRESS 136.10.0.1 | DATA (BILLING PARTICULARS) |
|---|---|---|

FIG.96C

| DESTINATION IP ADDRESS 132.20.0.2 | TRANSMITTER IP ADDRESS 140.10.0.1 | DATA (BILLING PARTICULARS) |
|---|---|---|

METHOD AND DEVICE FOR RESERVING TRANSMISSION BAND ON INTERNET

BACKGROUND OF THE INVENTION

1. Field of the Invention

The present invention relates to a method and device for reserving a transmission band on the Internet.

2. Description of the Related Art

As applications or contents are diversified on the Internet, multimedia applications requiring broadband, such as video, have been launched. Such multimedia applications require high quality of required bands or timing. As a quality assurance mechanism for satisfying such a request, such band allocation mechanisms as the resource reservation setup protocol (RSVP) provided by RFC2205 and bandwidth brokering provided by RFC2638 have been studied as replacements for the conventional best effort service that provides no quality assurance, and have even been applied to some apparatuses and devices.

However, practically, it is difficult to apply the conventional band allocation mechanism to communication via a plurality of Internet service providers (ISP) for the following reasons:

(1) A mechanism should operate according to the same method from one end to another end of a network.

(2) Basically, a receiver and/or a transmitter of information should pay each ISP for the quality assurance. However, there is no knowing via which ISP communication is performed in the Internet Protocol (IP) routing. Therefore, each ISP is prevented from determining whom to charge.

(3) The ISP, when receiving a request for band allocation, has to accept the request without assurance of being paid for the band allocation.

(4) In the case of controlling band allocation in conformity to the RSVP, a receiving terminal is required to have a RSVP function. However, only a limited number of receiving terminals have the RSVP function at present.

(5) A band required for the communication depends on the capacity of a receiving terminal and a bandwidth between the receiving terminal and the nearest router. However, in the case of the bandwidth brokering, a band allocation setting is only performable from the transmitter side.

(6) The band required for the communication depends on the capacity of the receiving terminal and the bandwidth between the receiving terminal and the nearest router. However, an actual receiver of a content cannot inform the band allocation mechanism of the band requirements of the receiver without explicitly determining a special communication element of the transmission band although the receiver has no special knowledge of parameters for communication.

As a result, band-controlled data communication via a plurality of ISPs on the Internet using the conventional band allocation mechanism has not yet been realized at present.

SUMMARY OF THE INVENTION

It is a general object of the present invention to provide a method and device for reserving a transmission band on the Internet in which the above-described disadvantages are eliminated.

A more specific object of the present invention is to provide a method and device for reserving a transmission band on the Internet which method and device realizes band-controlled data transmission in communication via a plurality of ISPs.

The above objects of the present invention are achieved by a method of reserving a transmission band of a transmission line for transmitting data via a plurality of Internet service providers on the Internet between first and second communication devices, the method including the steps of (a) the first communication device requesting an intermediary server to reserve the transmission band and (b) the intermediary server reserving the transmission band for the first and second communication devices.

According to the above-described method, even in communication via a plurality of ISPs, band-controlled data transmission is realized with an intermediary server reserving a transmission band of a transmission line between first and second communication devices.

The above objects of the present invention are also achieved by a method of reserving a transmission band of a transmission line for transmitting data via a plurality of Internet service providers on the Internet between first and second communication devices in compliance with an RSVP protocol, the method including the steps of (a) the first communication device transmitting data including an ID of the first communication device to the second communication device through routers on the transmission line, (b) the second communication device transmitting to the routers an instruction with the ID to reserve the transmission band, and (c) the routers reserving the transmission band.

According to the above-described method, even in communication under the RSVP protocol, a transmission band is reliably reservable with routers reserving the transmission band based on an instruction with an ID issued by an intermediary server contracting Internet service providers having the routers.

The above objects of the present invention are also achieved by a device for reserving a transmission band of a transmission line for transmitting data via a plurality of Internet service providers on the Internet between first and second communication devices, wherein the transmission band is reserved at a request of the first communication device to reserve the transmission band.

The above objects of the present invention are further achieved by a device for reserving a transmission band of a transmission line for transmitting data via a plurality of Internet service providers on the Internet between first and second communication devices, the device including a first part storing IP addresses of servers of the Internet service providers, the servers reserving the transmission band, a second part storing a request of the first communication device to reserve the transmission band, and a third part storing results of reservations of the transmission band, the results being returned from the servers, wherein the device, upon receiving the request of the first communication device, refers to the first and second parts to instruct the servers to reserve the transmission band, recording the results of the reservations returned from the servers, and informing the first communication device whether a reservation of the transmission band is confirmed.

According to the above-described devices, even in communication via a plurality of ISPs, band-controlled data transmission is realized with the device reserving a transmission band of a transmission line between first and second communication devices.

BRIEF DESCRIPTION OF THE DRAWINGS

Other objects, features and advantages of the present invention will become more apparent from the following detailed description when read in conjunction with the accompanying drawings, in which:

FIG. 1 is a diagram showing a system configuration of a first method according to the present invention;

FIGS. 2A through 2C are diagrams showing a middleman address management table, a content information management table, and a user policy storage table of a content server of the first embodiment, respectively;

FIGS. 3A through 3C are diagrams showing a contractor ISP management table, an ISP policy table, and a policy reservation determination management table of a middleman server of the first method, respectively;

FIGS. 4A through 4C are diagrams showing an output side port band management table, an executed policy management table, and a router management table of a policy server of the first method, respectively;

FIG. 5 is a diagram showing a system configuration of a second method according to the present invention;

FIG. 6 is a diagram showing a client management table of a client management server of the second method;

FIGS. 8A and 8B are diagrams showing a copy content management table of the content server and a user policy management table of a copy server of the third method;

FIG. 10 is a diagram showing a system configuration of a fifth method according to the present invention;

FIGS. 11A through 11C are diagrams showing a payment ID storage table of the content server, a payment ID management table of the middleman server, and an ISP billing particulars table of the middleman server of the fifth method, respectively;

FIGS. 12A through 12D are diagrams showing a billing address determination table of a bill collection server, a billing particulars table of the bill collection server, a payment ID determination table of an ISP router, and a band usage particulars table of the ISP router of the fifth method, respectively;

FIG. 13B is a diagram showing IP addresses of network components of the first embodiment;

FIGS. 14A through 14C are diagrams showing the user policy storage table, the middleman address management table, and the content information management table of the content server of the first embodiment, respectively;

FIGS. 15A through 15C are diagrams showing the contractor ISP management table, the ISP policy table, and the policy reservation determination management table of the middleman server of the first embodiment, respectively;

FIGS. 16A through 16C are diagrams showing the output side port band management tables of the policy servers of the first embodiment;

FIGS. 17A through 17C are diagrams showing the executed policy management tables of the policy servers of the first embodiment;

FIGS. 18A through 18C are diagrams showing the router management tables of the policy servers of the first embodiment;

FIGS. 27A through 27F are diagrams for illustrating steps S1 and S2 of the system operation of FIG. 19;

FIGS. 28A through 28D are diagrams for illustrating steps S3 through S5 of the system operation of FIG. 19;

FIGS. 29A through 29C are diagrams for illustrating step S6 of the system operation of FIG. 19;

FIGS. 30A and 30B are diagrams for illustrating step S7 of the system operation of FIG. 19;

FIGS. 31A through 31E are diagrams for illustrating step S7 of the system operation of FIG. 19;

FIGS. 32A through 32C are diagrams for illustrating step S8 of the system operation of FIG. 19;

FIGS. 33A through 33E are diagrams for illustrating steps S9 and S10 of the system operation of FIGS. 19 and 20;

FIGS. 34A through 34E are diagrams for illustrating steps S11 through S13 of the system operation of FIG. 20;

FIGS. 35A through 35C are diagrams for illustrating steps S14 and S15 of the system operation of FIG. 20;

FIGS. 41A through 41C are diagrams showing the client management tables according to the second embodiment;

FIGS. 42A through 42D are diagrams for illustrating steps S21 and S22 of the system operation of FIG. 36;

FIGS. 43A through 43D are diagrams for illustrating steps S23 through S25 of the system operation of FIG. 36;

FIGS. 44A through 44D are diagrams for illustrating step S26 of the system operation of FIG. 36;

FIGS. 45A through 45E are diagrams for illustrating step S27 of the system operation of FIG. 36;

FIGS. 46A through 46D are diagrams for illustrating steps S28 and S29 of the system operation of FIG. 36;

FIG. 47 is a diagram showing a sequence of steps of a system operation according to a third embodiment of the present invention;

FIGS. 51A and 51B are diagrams showing the copy content management table of the content server and the user policy storage table of the copy server according to the third embodiment, respectively;

FIG. 52 is a diagram for illustrating step S31 of the system operation of FIG. 47;

FIGS. 53A through 53F are diagrams for illustrating step S32 of the system operation of FIG. 47;

FIGS. 54A through 54E are diagrams for illustrating steps S33 through S38 of the system operation of FIG. 47;

FIGS. 62A through 62C are diagram showing the output side port band management tables of the policy servers according to the fourth embodiment;

FIGS. 63A through 63C are diagrams showing the executed policy management tables of the policy servers according to the fourth embodiment;

FIGS. 64A through 64C are diagrams for illustrating steps S41 and S42 of the system operation of FIG. 55;

FIGS. 65A through 65D are diagrams for illustrating step S43 of the system operation of FIG. 55;

FIGS. 66A through 66C are diagrams for illustrating steps S44 and S45 of the system operation of FIG. 55;

FIGS. 67A through 67E are diagrams for illustrating step S46 of the system operation of FIG. 55;

FIGS. 68A through 68E are diagrams for illustrating steps S47 and S48 of the system operation of FIGS. 55 and 56;

FIGS. 69A and 69B are diagrams for illustrating step S49 of the system operation of FIG. 56;

FIG. 70B is a diagram showing IP addresses of network components of the fifth embodiment;

FIGS. 80A and 80B are diagrams showing the payment ID storage tables of the content servers according to the fifth embodiment;

FIGS. 81A and 81B are diagrams showing the payment ID management table and the ISP billing particulars table of the middleman server according to the fifth embodiment, respectively;

FIGS. 82A and 82B are diagrams showing the billing address determination table and the billing particulars table of each bill collection server, respectively;

FIG. 83A is a diagram showing the payment ID determination table of each ISP router according to the fifth embodiment, and FIGS. 83B through 83E are diagrams showing the band usage particulars tables of the ISP routers according to the fifth embodiment;

FIGS. 84A through 84D are diagrams for illustrating steps S51 and S52 of the system operation of FIG. 71;

FIGS. 85A through 85C are diagrams for illustrating step S53 of the system operation of FIG. 71;

FIGS. 86A and 86B are diagrams for illustrating step S54 of the system operation of FIG. 71;

FIG. 87 is a diagram for illustrating step S55 of the system operation of FIG. 71;

FIGS. 88A through 88C are diagrams for illustrating step S56 of the system operation of FIG. 71;

FIGS. 89A through 89C are diagrams for illustrating steps S57 through S59 of the system operation of FIG. 71;

FIGS. 90A through 90C are diagrams for illustrating step S60 of the system operation of FIG. 71;

FIGS. 91A through 91C are diagrams for illustrating steps S61 and S62 of the system operation of FIG. 71;

FIGS. 92A through 92D are diagrams for illustrating steps S63 and S64 of the system operation of FIG. 71;

FIGS. 93A through 93D are diagrams for illustrating steps S66 and S67 of the system operation of FIG. 72;

FIGS. 94A through 94E are diagrams for illustrating steps S68 and S69 of the system operation of FIG. 72;

FIGS. 95A through 95D are diagrams for illustrating step S70 of the system operation of FIG. 72; and FIGS. 96A through 96C are diagrams for illustrating step S71 of the system operation of FIG. 72.

DETAILED DESCRIPTION OF THE PREFERRED EMBODIMENTS

Figure 7:
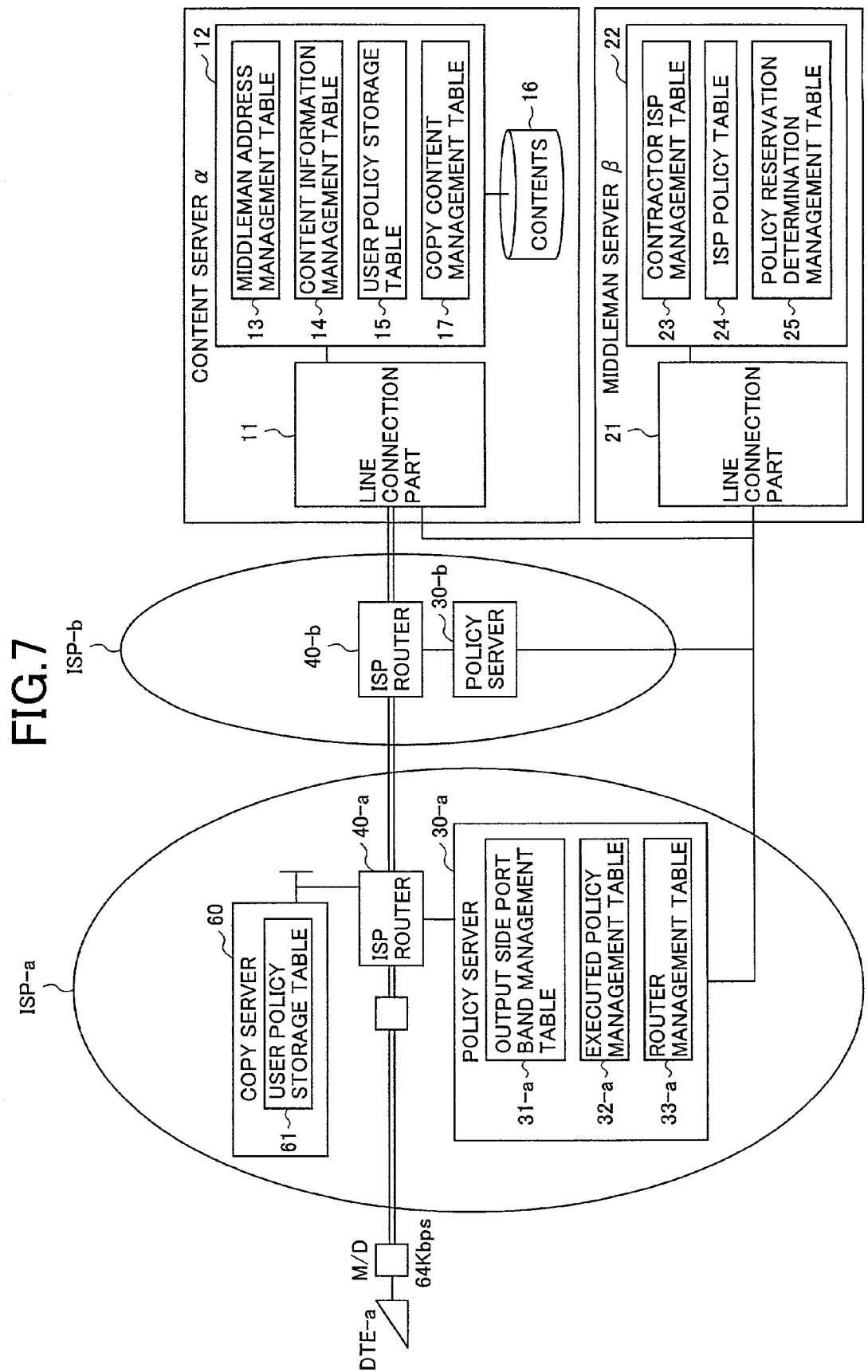
FIG. 7 is a diagram showing a system configuration of a third method according to the present invention.

A description will now be given, with reference to the accompanying drawings, of embodiments of the present invention.

[First Method]

A description will be given of a first method by which a middleman is allowed to reserve a certain transmission band (frequency band) on a transmission line between two parties (for instance, between a user and a content provider) in the case of transferring data between the two parties via a plurality of ISPs on the Internet. Here, the description will be given of a case where a server of the middleman (intermediary server) (hereinafter referred to as a middleman server $\beta$) commands the reservation of a transmission band (a band reservation) for devices such as routers on the transmission line between the two parties based on a policy (a desired band value to be reserved, a reservation start date and time, etc.) of a user terminal (hereinafter referred to as a DTE-a) between the DTE-a and a server of the content (service) provider (hereinafter referred to as a content server $\alpha$).

(1) System Configuration

The description of the first method will be given with reference to FIG. 1 that is a diagram showing a system configuration of the first method. The system of FIG. 1 includes the DTE-a, ISPs (ISP-a and ISP-b), the content server $\alpha$, and the middleman server $\beta$.

A description will be given of configurations and operations of the content server $\alpha$, the middleman server $\beta$, and the ISPs.

(2) Configuration of the Content Server $\alpha$

As shown in FIG. 1, the content server $\alpha$ includes a line connection part 11, a control part 12, and contents 16.

The line connection part 11 provides an interface with a network such as the Internet, and inputs and outputs data. The line connection part 11 receives data and transfers the data to the control part 12 for processing. The line connection part 11 also outputs data that the control part 12 requests to be transmitted.

The control part 12 includes a middleman address data management table 13, a content information management table 14, and a user policy storage table 15, and processes the data received from the line connection part 11 in accordance with the tables 13 through 15. Further, the control part 12 can perform an IP trace route (an IP route tracing) and process an Internet control message protocol (ICMP) message responding to the IP trace route.

FIG. 2A is a diagram showing an example of the middleman address management table 13. The middleman address management table 13 prestores the IP address of the middleman server β. The middleman address management table 13 is used for setting the IP address of the middleman server β in the user policy storage table 15 when a message requesting a band reservation (a band reservation request) arrives from the user.

FIG. 2B is a diagram showing an example of the content information management table 14. The content information management table 14 prestores a content capacity for each of the contents 16. The content information management table 14 is used for calculating a content transmission reservation end time in setting a content transmission reservation date and time in the user policy storage table 15 when the band reservation request arrives from the user.

FIG. 2C is a diagram showing an example of the user policy storage table 15. The user policy storage table 15 stores, for each of a series of ordering numbers (unique numbers in the content server α), such information as middleman IP address, IP address of a user requesting a band reservation, content name, desired band value to be reserved (requested band), reservation start date and time, reservation end date and time, and router port IP addresses. When the band reservation request arrives from the user, one ordering number is assigned to the request, and the contents of the request from the user, such as content name, requested band, and reservation start date and time, are set in their respective columns on the user policy storage table 15. At the same time, the IP address of the middleman that is to be requested to reserve the requested band is extracted from the middleman address management table 13 and is set in the column of middleman IP address.

Further, based on the content name included in the band reservation request transmitted from the user, the control part 12 calculates the content transmission end time from the capacity of the content extracted from the content information management table 14 and the requested band transmitted together with the content name, and sets the calculated content transmission end time in the column of reservation end date and time.

Further, the control part 12 performs the IP trace route on the basis of the IP address of the user, and enters the IP addresses of all the ports of routers (for instance, ISP routers 40-a and 40-b in FIG. 1) on a transmission line obtained from the ICMP message responding to the trace route in the column of router port IP address. The obtained IP addresses are used later as information for identifying the routers for reserving the band between the DTE-a and the content server α.

A band reservation request is made to the middleman in accordance with the content set in the user policy storage table 15.

(3) Operation of the Content Server α

A description will be given of an operation of the content server α from receiving the content request (content name, requested band, and reservation start date and time) together with the band reservation request from the DTE-a and making the band reservation request to the middleman server β up to receiving a band reservation result from the middleman server β and informing the user of the contents of the band reservation result. The operation is performed in the following steps.

(a) Receiving the content request from the DTE-a, the control part 12 assigns an ordering number to the request and sets the middleman IP address, the user IP address, the content name, the requested band, the reservation start date and time, the reservation end date and time, and the IP addresses of all the router ports between the DTE-a and the content server α in the user policy storage table 15.

(b) Letting the middleman IP address set in the user policy storage table 15 be a destination address, the control part 12 transmits the contents of the columns (of the user policy storage table 15) corresponding to the ordering number except for the content name to the middleman server β as the band reservation request from the user. Hereinafter, all or a part of the contents transmitted here may be referred to as a "policy" of the user.

(c) Receiving the band reservation result assigned the ordering number from the middleman server β, the content server α searches the user policy storage table 15 based on the ordering number, and transmits the band reservation result having the ordering number, letting the user IP address corresponding to the ordering number be a destination address. Since the band reservation contents recorded in their respective columns in a row of the user policy storage table 15 which row corresponds to the ordering number are based on the request from the user, as is apparent from step (a), the band reservation result is accurately transmitted to the DTE-a.

The ordering number transmitted to the DTE-a is used to release the reserved band in the middle of communication, which is later described in the part of a fourth method.

(4) Configuration of the Middleman Server β

The middleman server β includes a line connection part 21, a control part 22, a contractor ISP management table 23, an ISP policy table 24, and a policy reservation determination management table 25.

The line connection part 21 provides an interface with a network such as the Internet, and inputs and outputs data. The line connection part 21 receives data and transmits the received data to the control part 22 for processing. The line connection part 21 also outputs data that the control part 22 requests to be transmitted.

The control part 22 includes the contractor ISP management table 23, the ISP policy table 24, and the policy reservation determination management table 25, and processes the data received from the line connection part 21 in accordance with the tables 23 through 25.

FIG. 3A is a diagram showing an example of the contractor ISP management table 23. The contractor ISP management table 23 is used for searching for the IP addresses of the policy servers (band reservation setting servers) (for instance, policy servers 30-a and 30-b in FIG. 1) of the ISPs which policy servers can issue instructions to reserve the requested band (band reservation instructions) to the routers between the DTE-a and the content server α. The contractor ISP management table 23 prestores the IP addresses of the policy server and a client management server (employed in a later-described second method) for each of network addresses assigned to the ISPs managing the routers between the DTE-a and the content server α.

Receiving the user policy from the content server α, the middleman server β extracts the IP addresses of the router ports based on the contents of the received policy. Using the network addresses determined from the router port IP addresses as keys, the middleman server β searches the contractor ISP management table 23 for the IP addresses of the policy servers or client management servers that can issue the instructions to the routers.

FIG. 3B is a diagram showing an example of the ISP policy table 24. The ISP policy table 24 temporarily stores the user policy received from the content server α. The ISP policy table 24 stores, for each of the policy servers of the ISPs that can issue the band reservation instructions to the routers between the DTE-a and the content server α, such information as order reception number (unique number in the middleman server α), policy server IP address, user IP address, content server IP address, requested band, reservation start date and time, reservation end date and time, and router port IP address.

Receiving the user policy from the content server α, the middleman server β assigns an order reception number to the IP address of each of the policy servers determined from the contractor ISP management table 23, and sets the contents of the user policy (user IP address, requested band, reservation start date and time, and reservation end date and time) in their respective columns on the ISP policy table 24. When there are a plurality of routers and policy servers managing the routers between the DTE-a and the content server α, the policy servers are assigned serial order reception numbers, and the user policy is recorded for each of the serial order reception numbers.

When the middleman server β transmits a message requesting the band reservation to each of the policy servers, the contents of the columns (the user policy) except for the policy server IP address are transmitted with the policy server IP address being a destination address.

FIG. 3C is a diagram showing an example of the policy reservation determination management table 25. The policy reservation determination management table 25 is used for managing the result of the band reservation requested of each of the policy servers by the middleman server β. It is only when all the results of the band reservations requested of the policy servers between the DTE-a, and the content server α are OK that it is determined that the band is reserved all the way through between the DTE-a and the content server α. After the results of the band reservations are received from all the policy servers and recorded on the policy reservation determination management table 25, the content server α is informed that the band reservation is OK (confirmed) if all the results are OK and that the band reservation is NG (not confirmed) if any of the results is NG.

Specifically, after the IP policy table 24 is created, with respect to each pair of the content server IP address and its ordering number, that is, with respect to each user policy requested by a content provider, a pair of the order reception number and the policy server IP address of each corresponding policy server is recorded on the policy reservation determination management table 25.

Any time a message representing the band reservation result is received from each policy server, an OK or NG is written to the corresponding column on the policy reservation determination management table 25 based on the order reception number and the policy server IP address, which is a transmitter address, included in the result message. When the band reservation results are received from all the policy servers, the content server α is informed whether the band reservation made with the ordering number is confirmed or not with its content server IP address recorded in the column of content server IP address and corresponding to the band reservation result being employed as a destination IP address.

(5) Operation of the Middleman Server β

A description will be given of an operation of the middleman server β in which operation the user policy (ordering number, user IP address, requested band, reservation start date and time, reservation end date and time, and router port IP addresses) accompanied by the band reservation request is received from the content server α, the band reservation requests are made to the policy servers, and the band reservation result is returned to the content server α based on the band reservation results received back from the policy servers. The operation is performed in the following steps.

(a) Receiving the user policy with the ordering number from the content server α, the control part 22 searches the contractor ISP address management table 23 for the IP addresses of the policy servers of the ISPs. Then, the control part 22 assigns the order reception number to each of the discovered policy server IP addresses and stores the user policy for each policy server in the ISP policy table 24.

(b) At the same time, the control part 22 sets the IP address of the content provider (that is, the IP address of the content server α), its ordering number, and the pairs of the policy server IP addresses and their order reception numbers corresponding to the IP address of the content provider and its ordering number in the policy reservation determination management table 25.

(c) The control part 22 transmits each pair of the order reception number and the user policy to the corresponding policy server with its policy server IP address obtained from the user policy stored in step (a) being a destination IP address.

(d) Receiving the band reservation result from each policy server, the control part 22 searches the policy reservation determination management table 25 and writes each reservation result to the corresponding column based on the transmitter IP address of each result message and its order reception number.

(e) Receiving the band reservation results from all the corresponding policy servers in step (d) and determining whether the band reservation requested by the user is confirmed or not, the control part 22 transmits the result of the band reservation for the user policy indicated by its ordering number to the content server α, letting the corresponding content server IP address recorded on the policy reservation determination management table 25 be a destination address.

According to FIG. 1, the ISPs (ISP-a and ISP-b) include their respective policy servers 30-a and 30-b and ISP routers 40-a and 40-b. Hereinafter, each of the policy servers 30-a and 30-b may be referred to equally as a policy server 30, and each of the ISP routers 40-a and 40-b may be referred to equally as an ISP router 40 or simply as a router 40 for convenience of description.

A description will be given of a configuration and operation of each of the policy server 30 and the ISP router 40.

(6) Configuration of the Policy Server (a Band Reservation Setting Server) 30

The policy server 30 includes an output side port band management table 31, an executed policy management table 32, and a router management table 33, which are shown as an output side port band management table 31-a, an executed policy management table 32-a, and a router management table 33-a in FIG. 1, respectively.

FIG. 4A is a diagram showing an example of the output side port band management table 31. The output side port band management table 31 manages a band control port and line bands left after band reservation (residual line band) classified by date and time with respect to each of the IP addresses of the routers 40 under the policy server 30.

Using as a key the router IP address transmitted together with the user policy having its order reception number from the middleman server β, the policy server 30 determines from the later-described router management table 33 the port number of the router 40 (40-a in FIG. 1) for the band reservation requested by the user policy. Then, the policy server 30 determines that the band requested by the user policy is reservable if the requested band is smaller in data transmission amount than the residual line band of the port number throughout a given period of time of a desired reservation date and time. At this point, the policy server 30 decreases the data transmission amount (bps) of the residual line band by that of the requested band. At the same time, the policy server 30 informs the middleman server β that the requested band is reserved.

FIG. 4B is a diagram showing an example of the executed policy management table 32. The executed policy management table 32 is used for storing the user policy so that the policy server 30 can wait to instruct the router 40 to reserve or release the band until a specified execution time. The executed policy management table 32 stores, with respect to each policy number (a unique number in the policy server 30), IP address of an instructed router (destination IP address), transmitter IP address (content provider (server) IP address), requested band, reservation start date and time, reservation end date and time, middleman IP address, order reception number, router virtual IP address, and router output port number.

If the policy server 30 determines, with reference to the requested band of the user policy with its order reception number received from the middleman server β and the residual line band of the corresponding router port in the output side port band management table 31, that the requested band of the user policy is reservable, the policy server 30 records the contents of the user policy in their respective columns with the corresponding policy number. At this time, the policy server 30 also records the discovered router output port number in the corresponding column.

When the specified execution time of the user policy comes, the policy server 30 transmits the user policy with its policy number to the router 40 and instructs the router 40 in accordance with the user policy.

FIG. 4C is a diagram showing an example of the router management table 33. The router management table 33 prestores relationships between the IP addresses assigned to the ports of the router 40 and the virtual IP address for controlling the router 40. By searching the router management table 33 by using as a key the router port IP address transmitted from the middleman server β together with the user policy having its order reception number, the number of the port actually used for the band reservation can be inquired, and a destination to which the instruction for the band reservation is given, or the virtual IP address of the router 40, can be extracted.

(7) Operation of the Policy Server 30

Next, a description will be given of an operation of the policy server 30. The operation is performed in the following steps.

(a) Receiving the user policy having its order reception number from the middleman server β, the policy server 30 searches the router management table 33 for the virtual IP address of the router 40 using the router port IP address included in the transmitted user policy.

(b) The policy server 30 transmits the user IP address included in the received user policy to the router 40, letting the searched-out virtual IP address of the router 40 be a destination IP address, and transmits a message asking the output port of the router 40 at the time of performing the routing based on the user IP address.

(c) Receiving the output port number from the router 40, the policy server 30 refers to the output side port band management table 31 and confirms that the requested band of the user policy is smaller in data transmission amount than the residual line band of the output port number.

(d) Determining that the requested band of the user policy is reservable in the residual line band of the output port of the router 40, the policy server 30 enters the user policy in the executed policy management table 32. At this time, the policy server 30 also enters the virtual IP address and the output port of the router 40 in the executed policy management table 32. Further, the policy server 30 informs the middleman server β that the requested band of the user policy of the corresponding ordering number is reservable.

(e) Thereafter, the policy server 30 constantly monitors the executed policy management table 32 to instruct the router 40 to reserve or release the band at each specified execution time.

(8) Operation of the ISP Router 40

Receiving the data (message) asking the number of its output port to the user from the policy server 30, the ISP router 40 starts to find from which port data is output to the user IP address based on routing information and transmits the finding result to the policy server 30.

Further, in the case of receiving data commanding the band reservation or release, the ISP router 40 reserves or releases the line band of the port indicated by the data and transmits a message that the band reservation or release is completed to the policy server 30.

[Second Method]

Next, a description will be given of the second method by which a middleman is allowed to reserve a certain transmission band (frequency band) on a transmission line between two parties (for instance, between a user and a content provider) in the case of transferring data between the two parties via a plurality of ISPs on the Internet.

Hereinafter, the same elements as those of the description of the first method are referred to by the same numerals, and a description thereof will be omitted.

Here, the description will be given particularly of a case where the middleman server β commands the reservation of a transmission band (a band reservation) for the devices on the transmission line between the DTE-a and the content server α in the case of using the band of a connection line connecting the DTE-a to the ISP (ISP-a in FIG. 5) on a pay phone network as a band value to be reserved (a requested band) without the DTE-a setting the requested band.

(1) System Configuration

The description of the second method will be given with reference to FIG. 5 that is a diagram showing a system configuration of the second method. The system of FIG. 5 includes the DTE-a, the ISPs (ISP-a and ISP-b), the content server α, and the middleman server β.

Here, a description will be given of configurations and operations of the content server α, the middleman server β, and each of the ISPs.

(2) Configuration of the Content Server α

The content server α includes the line connection part 11, the control part 12, and the contents 16. The control part 12 includes the middleman address management table 13, the content information management table 14, and the user policy storage table 15.

The line connection part 11, the control part 12, and the middleman address management table 13 are equal to those of the content server α of the first method.

The content information management table 14 of the second method prestores a content capacity for each of the contents 16. When a message requesting the band reservation arrives from the user, the content information management table 14 is searched for a content capacity for a requested content by using as a key the name of the content included in the message so that the middleman server β is informed of the content capacity. The content information management table 14 is used for figuring out a band reservation end date and time in the middleman server β based on the band to be reserved for the user, which band is to be determined in the middleman server β, and the content capacity and a band reservation start date and time transmitted from the content server α.

The user policy storage table 15 of the second method is equal to that of the content server α of the first method. However, since the desired band value to be reserved is not transmitted from the user, the columns of requested band and reservation end date and time of the user policy storage table 15 remain blank with respect to the ordering number of the content server α.

(3) Operation of the Content Server α

A description will be given of an operation of the content server α from receiving a content request (content name and reservation start date and time) from the DTE-a (the user terminal) up to making a request for the band reservation to the middleman server β. The operation is performed in the following steps.

(a) Receiving the content request from the DTE-a, the control part 12 assigns an ordering number to the request, and sets the middleman IP address, the user IP address, the content name, the reservation start date and time, the IP addresses of all the routers between the DTE-a and the content server α in the user policy storage table 15 in the same manner as described in the first method.

(b) The control part 12 transmits the contents of the columns of the user policy storage table 15 except for the content name to the middleman server β as the band reservation request from the user, letting the middleman IP address set in the user policy storage table 15 be a destination address. However, the requested band value is not transmitted to the middleman server β because the column therefor remains blank.

(c) Receiving from the middleman server β the result of the band reservation with the ordering number assigned thereto, the content server α searches the user policy storage table 15, based on the ordering number, for the user IP address corresponding to the ordering number, and transmits the band reservation result, letting the user IP address be a destination address. Since the contents of the band reservation corresponding to the ordering number are transmitted from the DTE-a, as is apparent from step (a), the result is accurately transmitted to the DTE-a.

(4) Configuration of the Middleman Server β

The middleman server β includes the line connection part 21 and the control part 22. The control part 22 includes the contractor ISP management table 23, the ISP policy table 24, and the policy reservation determination management table 25.

The line connection part 21, the control part 22, and the policy reservation determination management part 25 are equal to those of the middleman server β of the first method.

The contractor ISP management table 23 of the second method is used for searching for the IP addresses of the policy servers of the ISPs which policy servers can issue band reservation instructions to the routers between the DTE-a and the content server α.

The contractor ISP management table 23 prestores the IP addresses of the policy server and the client management server (for instance, a client management server 50 in FIG. 5) for each of the network addresses assigned to the ISPs managing the routers between the DTE-a and the content server α. Receiving the user policy from the content server α, the middleman server β extracts the IP addresses of the routers based on the contents of the received policy. Based on the network addresses determined from the IP addresses, the middleman server β searches the contractor ISP management table 23 for the IP addresses of the policy servers that can issue the instructions to the routers. Further, upon receiving the user policy from the content server α, the middleman server β extracts the user IP address from the user policy. By searching the contractor ISP management table 23 by using as a key the network addresses determined from the user IP address, the middleman server β can obtain the IP address of the client management server storing the value of the line band used for the connection of the DTE-a to the ISP.

The ISP policy table 24 of the second method temporarily stores policies transmitted from content providers. The ISP policy table 24 manages the policies for the ISPs by a series of order reception numbers (unique numbers in the middleman server β) and is recorded with such information as policy server IP address, user IP address, requested band, reservation start date and time, and reservation end date and time for each of the order reception numbers.

Upon receiving the user policy (content name, reservation start date and time, and router port IP addresses) and the content capacity from the content server α with the ordering number, the control part 22 extracts the corresponding policy server IP addresses from the ISP policy table 24 based on the router port IP addresses and the network addresses recorded on the contractor ISP management table 23. The control part 22 assigns an order reception number to each of the policy server IP addresses and stores the contents of the user policy (the user IP address and the reservation start date and time) in their respective columns on the ISP policy table 24.

Further, the control part 22 inquires of the client management server of the ISP (ISP-a) "the band used for the connection of the DTE-a to the ISP" based on the corresponding network address of the user IP address.

Receiving the result of the inquiry, the control part 22 figures out a content transmission end date and time from the value of the band used for the connection and the content capacity, and sets the value of the band used for the connection and the content transmission end date and time in the columns of requested band and reservation end date and time, respectively.

When the middleman server β transmits the user policy for the band reservation to each of the corresponding policy servers of the ISPs, the middleman server β extracts the user policy from the ISP policy table 24 based on the corresponding pair of the order reception number and policy server IP address.

(5) Operation of the Middleman Server β

A description will be given of an operation of the middleman server β from receiving the user policy (ordering number, user IP address, reservation start date and time, and router port IP addresses) accompanied by the band reservation request and the content capacity from the content server α up to making a band reservation request to each of the policy servers. The operation is performed in the following steps.

(a) Receiving the user policy with the ordering number from the content server α, the control part 22 searches the contractor ISP management table 23, based on the network address of the ISP (ISP-a) determined from the user IP address included in the user policy, for the IP address of the client management server of the ISP (ISP-a) for managing the user.

(b) The control part 22 inquires about the connection line band value of the user, letting the searched-out IP address be a destination address.

(c) The control part 22 calculates a reservation end date and time from the connection line band value of the user transmitted from the client management server, and the content capacity and the reservation start date and time included in the user policy.

(d) The control part 22 searches the contractor ISP management table 23 for the IP addresses of the policy servers of the ISPs based on the network addresses of the ISPs determined from the IP addresses of the router port IP addresses included in the user policy. The control part 22 assigns the order reception number to each of the IP addresses of the policy servers and stores the user policy for each of the policy servers in the ISP policy table 24.

(e) At the same time, the control part 22 sets the IP address and the ordering number of the content provider, or the content server α, and pairs of the IP addresses of the policy servers corresponding to the ordering number and their respective order reception numbers assigned thereto in step (d) in the policy reservation determination management part 25.

(f) The control part 22 extracts the IP address of each policy server from the corresponding user policy stored in step (d), and transmits each pair of the order reception number and the user policy, letting the IP address of each policy server be a destination IP address.

(g) Receiving the band reservation result message back from each policy server, the control part 22 searches the policy reservation determination management table 25 and writes the band reservation results to the corresponding column on the policy reservation determination management table 25 based on the transmitter IP addresses of the messages and the transmitted order reception numbers.

Thereafter, the middleman server β performs the same operation as step (e) of the operation of the middleman server β of the first method.

According to FIG. 5, the ISPs (ISP-a and ISP-b) include their respective policy servers 30, the ISP routers 40, and client management servers 50. Each client management server 50 includes a client management table 51. AS previously described, each policy server 30 includes the output side port band management table 31, the executed policy management table 32, and the router management table 33.

The client management server 50 and the client management table 51 of the ISP-b are not shown in FIG. 5 for simplicity purposes.

The policy server 30 and the ISP router 40 of the second method are equal to those of the first method.

(6) Configuration of the Client Management Server 50

The client management server 50 includes the client management table 51 shown in FIG. 6.

When the connection of the user to the ISP (ISP-a in FIG. 5) is completed, the user IP address and the band used for the connection are set in the client management table 51.

If the middleman server β inquires of the client management server 50 the band used for the connection when the connection of the user to the ISP is completed, the client management server 50 transmits the band used for the connection to the middleman server β by using the user IP address as a key.

(7) Operation of the Client Management Server 50

The client management server 50 performs an operation in the following steps.

(a) Receiving from the middleman server β an inquiry about the band used for the connection of the user to the ISP at the time of the completion of the connection, the client management server 50 extracts the band used for the connection of the user from the client management table 51, using the user IP address as a key.

(b) The client management server 50 transmits the extracted used band of the user to the middleman server β.

[Third Method]

Next, a description will be given of a third method by which a middleman is allowed to reserve a certain transmission band (frequency band) on a transmission line between two parties (for instance, between a user and a content provider) in the case of transferring data between the two parties via a plurality of ISPs on the Internet.

The description will be given particularly of a case where the middleman server β commands the reservation of a transmission band (a band reservation) for the devices on the transmission line between the DTE-a and the content provider (content server α) when servers each having a copy of the content requested by the DTE-a (hereinafter referred to as copy servers) exist, apart from the content server α, in some places between the DTE-a and the content provider (content server α) on the Internet and the content is distributed to the DTE-a from the copy server nearest the DTE-a.

(1) System Configuration

The description of the third method will be given with reference to FIG. 7 that is a diagram showing a system configuration of the third method. The system of FIG. 7 includes the DTE-a, the ISPs (ISP-a and ISP-b), the content server α, and the middleman server β.

A description will be given of configurations and operations of the content server α, the middleman server β, and each of the ISPs.

(2) Configuration of the Content Server α

The content server α includes the line connection part 11, the control part 12, and the contents 16. The control part 12 includes the middleman address management table 13, the content information management table 14, the user policy storage table 15, and a copy content management table 17.

The line connection part 11, the middleman address management table 13, and the content information management table 14 are equal to those of the content server α of the first method.

The control part 12 includes the middleman address management table 13, the content information management table 14, the user policy management table 15, and the copy content management table 17, and processes data received from the line connection part 11 in accordance with the tables 13 through 15 and 17. Further, the control part 12 performs an IP trace route and processes an ICMP message responding thereto.

The user policy storage table is equal to that of the content server α of the first method. However, the trace route is performed from a copy server 60. Therefore, in the user policy storage table 15, the column of router port IP address remains blank with respect to the ordering number of the content server α.

FIG. 8A is a diagram showing an example of the copy content management table 17. The copy content management table 17 prestores the network address of the ISP (ISP-a in FIG. 7) that is under contract with the content provider to distribute a copy of the content and the IP address of the copy server 60 to which the copy content is to be distributed.

When a message requesting the band reservation arrives from the user, the user policy (user IP address, content name, requested band, reservation start date and time, and reservation end date and time) stored in the user policy storage table 15 is transmitted to the copy server 60 to reserve a band from the copy server 60 to the user and distribute the copy content to the user. At this point, in order to set the IP address of the copy server 60 as a destination address, the copy content management table 17 is used for extracting the IP address of the copy server 60 therefrom based on the corresponding network address with the user IP address stored in the user policy storage table 15 being used as a key.

(3) Operation of the Content Server α

A description will be given of an operation of the content server α from receiving a content request (content name, desired band value to be reserved, and reservation start date and time) from the DTE-a (the user terminal) up to making a request for the band reservation to the copy server 60. The operation is performed in the following steps.

(a) Receiving the content request from the DTE-a, the control part 12 assigns an ordering number to the request, and in the same manner as described in the first method, sets such information as middleman IP address, content name, requested band, reservation start date and time, and reservation end date and time in the user policy storage table 15.

(b) The control part 12 transmits the contents of the columns of the user policy storage table 15 to the copy server 60 as the band reservation request from the user, letting the IP address of the copy server 60 be a destination address. The IP address of the copy server 60 is extracted from the copy content management table 17 based on the corresponding network address by using as a key the user IP address set in the user policy storage table 15.

However, the router port IP addresses, which are obtained as a result of the trace route performed by the copy server 60, are not transmitted.

(c) Receiving from the copy server 60 the result of the band reservation with the ordering number assigned thereto, the content server α searches the user policy storage table 15, based on the ordering number, for the user IP address corresponding to the ordering number, and transmits the result of the band reservation, letting the user IP address be a destination address. Since the contents of the band reservation corresponding to the ordering number are transmitted from the DTE-a, as is apparent from step (a), the result is accurately transmitted to the DTE-a.

(4) Configuration of the Middleman Server β

The middleman server β includes the line connection part 21 and the control part 22. The control part 22 includes the contractor ISP management table 23, the ISP policy table 24, and the policy reservation determination management table 25.

The line connection part 21, the control part 22, and the policy reservation determination management part 25 are equal to those of the middleman server β of the first method.

The contractor ISP management table 23 is used for searching for the IP address of the policy server (the policy server 30 in FIG. 7) of the ISP (ISP-a in FIG. 7) which policy server can issue a band reservation instruction to a router (the ISP router 40 in FIG. 7) between the DTE-a and the copy server 60. The contractor ISP management table 23 prestores the IP address of the policy server for each of the network addresses assigned to the ISPs managing routers between the DTE-a and copy servers. Receiving the user policy from the copy server 60, the middleman server β extracts the IP address of the router based on the contents of the received policy. Using the network address determined from the IP address as a key, the middleman server β searches the contractor ISP management table 23 and obtains the IP address of the policy server that can issue the instruction to the router.

The ISP policy table 24 temporarily stores user policies transmitted from the copy servers. In the ISP policy table 24, the user policies for the ISPs and the IP addresses of the policy servers that can issue the band reservation instructions are stored in accordance with a series of order reception numbers.

After receiving the user policy with the ordering number from the copy server 60, the middleman server β operates in the same way as that of the first method.

(5) Operation of the Middleman Server β

A description will be given of an operation of the middleman server β from receiving the user policy (ordering number, content name, user IP address, requested band, reservation start date and time, and reservation end date and time) accompanied by the band reservation request from the copy server 60 up to making a band reservation request to the policy server.

Receiving the user policy with the ordering number from the copy server 60, the control part 22 searches the contractor ISP management table 23, based on the network address of the ISP (ISP-a) determined from the router port IP address included in the user policy, for the IP address of the policy server (the policy server 30-*a*) of the ISP (ISP-a) for managing the user. The control part 22 assigns the order reception number to the searched-out IP address of the policy server, and sets the user policy for the policy server in the ISP policy table 24.

Thereafter, the middleman server β operates in the same way as that of the first method.

According to FIG. 7, the ISPs (ISP-a and ISP-b) include their respective policy servers 30, ISP routers 40, and copy servers 60. Each policy server 30 includes the output side port band management table 31, the executed policy management table 32, and the router management table 33. Each copy server 60 includes a user policy storage table 61.

The copy server 60 and the user policy storage table 61 of the ISP-b are not shown in FIG. 7 for simplicity purposes.

A description will be given of the policy server 30, the ISP router 40, and the copy server 60.

(6) Configuration and Operation of the Policy Server 30

The output side port band management table 31, the executed policy management table 32, and the router management table 33 of the policy server 30 are equal to those of the policy server 30 of the first method.

(7) Operation of the ISP Router 40

The ISP router 40 operates in the same way as that of the first method.

(8) Copy Server 60

The copy server 60 includes the user policy storage table 61 and processes data received from the content server α.

Further, the copy server 60 can perform an IP trace route and process an ICMP message responding thereto.

(9) User Policy Storage Table 61

FIG. 8 is a diagram showing an example of the user policy storage table 61. The user policy storage table 61 is used in the same way as the user policy storage table 15 of the first method. The user policy storage table 61 is used so that the copy server 60 replaces the content server α to make a band reservation request accompanying the user policy to the middleman server β.

When a message of the user requesting the band reservation is transmitted with the ordering number from the content server α, the contents of the request (ordering number, middleman IP address, content name, user IP address, requested band, reservation start date and time, and reservation end date and time) are recorded on the user policy storage table 61.

When the trace route is performed based on the user IP address and the IP addresses of all router ports (in the case of FIG. 7, a port of the router 40-*a*) on the transmission line are obtained from the ICMP message, the IP addresses are recorded in the column of router port IP address.

The band reservation request is made to the middleman server β in accordance with the contents set in the user policy storage table 61.

(10) Operation of the Copy Server 60

A description will be given of an operation of the copy server 60 from receiving the content request (content name, requested band, and reservation start date and time) accompanied by the band reservation request of the DTE-a from the content server α and making the band reservation request to the middleman server β up to receiving the result of the band reservation from the middleman server β and transmitting the result to the content server α. The operation is performed in the following steps.

(a) Receiving the content request of the user from the content server α, the control part (not shown in the drawing) of the copy server 60 sets the contents in the corresponding columns on the user policy storage table 61 in the same way as the contents of the user policy are stored in the user policy storage table 15 of the first method.

(b) Thereafter, the copy server 60 operates in the same way as the content server α of the first method.

(c) Receiving the band reservation result with the ordering number from the middleman server β, the copy server 60 transmits the band reservation result to the content server α.

[Fourth Embodiment]

Next, a description will be given of the fourth method by which a middleman is allowed to reserve a certain transmission band (frequency band) on a transmission line between two parties (for instance, between a user and a content provider) in the case of transferring data between the two parties via a plurality of ISPs on the Internet.

Here, the description will be given particularly of a case where the middleman server β releases a reserved band at the request of the DTE-a to release the reserved band (a reserved band release request) while a content is downloaded at a band value requested by the DTE-a between the DTE-a and the content server α.

(1) System Configuration

Figure 9:
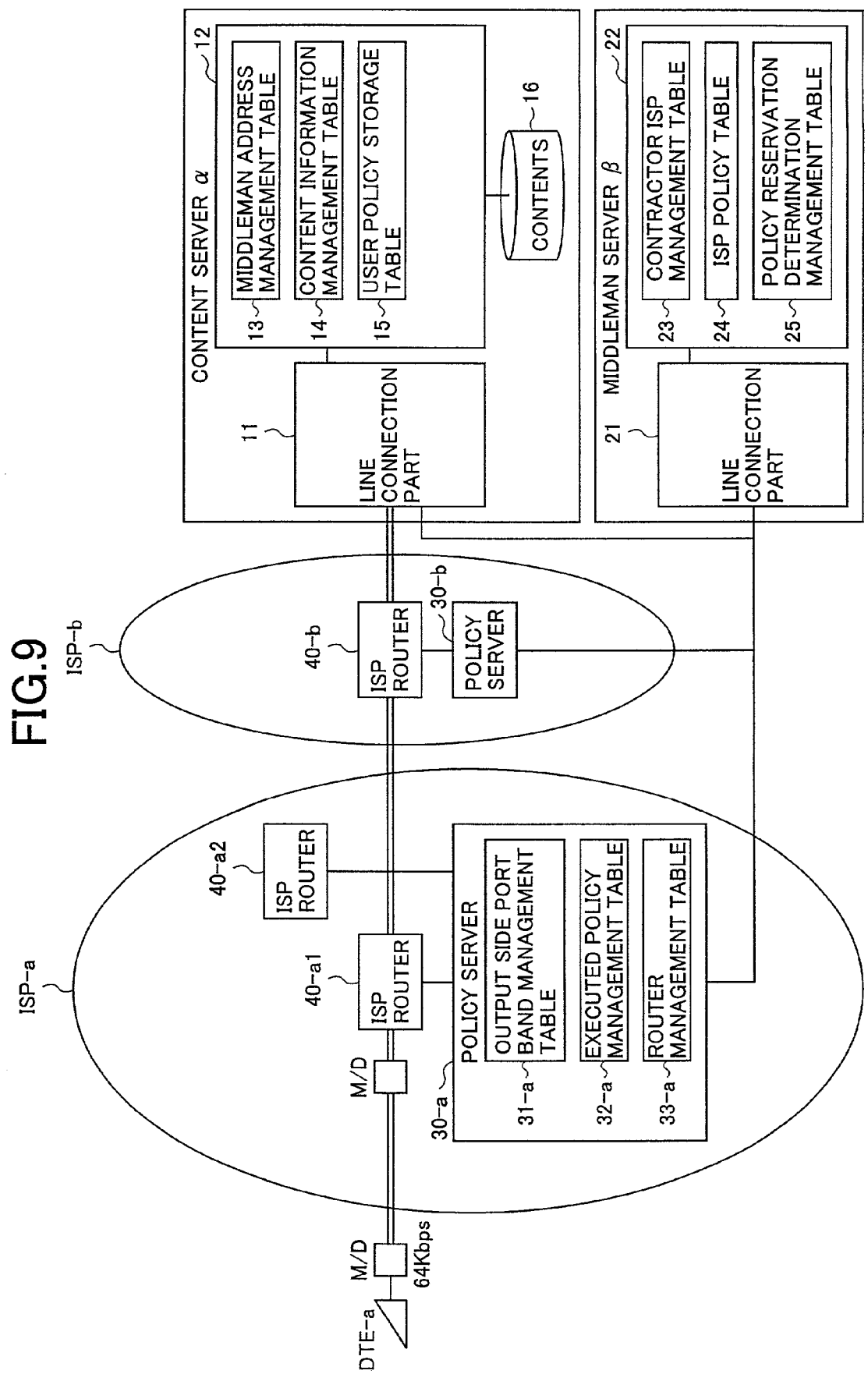
FIG. 9 is a diagram showing a system configuration of a fourth method according to the present invention.

The description of the fourth method will be given with reference to FIG. 9 that is a diagram showing a system configuration of the fourth method. The system of FIG. 9 includes the DTE-a, the ISPs (ISP-a and ISP-b), the content server α, and the middleman server β.

Each of the ISP-a and ISP-b includes a plurality of routers (indicated by 40-*a*1 and 40-*a*2 for the ISP-a; only the router 40-*b* is shown for the ISP-b for simplicity purposes). In the following description, the routers are equally referred to by the numeral 40 for convenience of description.

A description will be given of configurations and operations of the content server α, the middleman server β, and each of the ISPs.

(2) Configuration of the Content Server α

The content server α includes the line connection part 11, the control part 12, and the contents 16. The control part 12 includes the middleman address management table 13, the content information management table 14, and the user policy storage table 15.

The line connection part 11, the control part 12, the middleman address management table 13, the content information management table 14, and the user policy storage table 15 are equal to those of the content server α of the first method.

(3) Operation of the Content Server α

A description will be given of an operation of the content server α from receiving from the user the reserved band release request having an ordering number transmitted from the content server α in the case of the first method assigned thereto and making a request to release the reserved band to the middleman server β up to receiving the result of the release of the reserved band from the middleman server β. The operation is performed in the following steps.

(a) Receiving the reserved band release request with the ordering number from the user, the control part 12 searches the user policy storage table 15 for the IP address of the middleman based on the ordering number, and transmits the band reservation release request with the ordering number to the middleman server β with the searched-out IP address of the middleman being a destination address.

(b) The control part 12 receives the ordering number of the user policy to be deleted from the middleman server β, and deletes the user policy corresponding to the ordering number.

(4) Configuration of the Middleman Server β

The middleman server β includes the line connection part 21 and the control part 22. The control part 22 includes the contractor ISP management table 23, the ISP policy table 24, and the policy reservation determination management table 25.

The line connection part 21, the control part 22, the contractor ISP management table 25, the ISP policy table 24, and the policy reservation determination management table 25 are equal to those of the middleman server β of the first method.

(5) Operation of the Middleman Server β

A description will be given of an operation of the middleman server β from receiving the reserved band release request with the ordering number from the content server α and instructing the corresponding policy servers to release the reserved band up to returning a release completion message to the content server α based on the release results of the policy servers. The operation is performed in the following steps.

(a) Receiving the reserved band release request with the ordering number from the content server α, the control part 22 searches the policy reservation determination table 25 for the order reception numbers and the policy server IP addresses corresponding to the ordering number.

(b) The control part 22 transmits messages with the order reception numbers requesting the release of the reserved band to the corresponding policy servers, letting the searched-out IP addresses of the policy servers be destination addresses.

(c) Receiving a message (data) confirming the release of the reserved band corresponding to the order reception number back from any of the policy servers, the control part 22 turns off the reservation flag of the order reception number in the policy reservation determination management table 25. The reservation flags are turned on if the requested band is reserved. When all the reservation flags corresponding to the order reception numbers are turned off, the control part 22 deletes all the data corresponding to the order reception numbers and transmits the message that the release is completed with respect to the ordering number to the content server α.

The ISP-a and ISP-b includes their respective policy servers 30 and ISP routers 40.

A description will now be given of the policy server 30 and the ISP router 40.

(6) Configuration of the Policy Server 30

The policy server 30 includes the output side port band management table 31, the executed policy management table 32, and the router management table 33.

The output side port band management table 31, the executed policy management table 32, and the router management table 33 are equal to those of the policy server 30 of the first method in configuration and operation.

(7) Operation of the Policy Server 30

The policy server 30 operates in the following steps.

(a) Receiving the reserved band release message with the order reception number from the middleman server β, the policy server 30 searches the executed policy management table 32 based on the transmitter IP address and the order reception number of the message. Letting the router IP address (an address to which band reservation and release instructions are given) corresponding to the transmitter IP address and the order reception number of the message be a destination address, the policy server 30 transmits to the corresponding router a message that the user policy corresponding to the transmitter IP address and the order reception number of the message is to be deleted.

(b) Receiving a message confirming the completion of the release of the corresponding reserved band from the router, the policy server 30 increases the residual line band (data amount) of the corresponding router port in the output side port band management table 31 by the amount of the released band, using as a key the corresponding number of the output port of the router in the executed policy management table 32.

(c) The policy server 30 transmits the message (data) confirming the deletion of the user policy having the order reception number to the middleman server β.

(8) Operation of the ISP Router 40

The ISP router 40 operates in the same way as that of the first method.

[Fifth Method]

A description will now be given of a fifth method of the present invention. According to the fifth method, in the case of transferring data between two parties via a plurality of ISPs on the Internet, with a band reservation being made by an RSVP message assigned an ID (a payment ID) issued in advance by a middleman and with routers on a transmission line checking the ID included in the reservation message, the band reservation can be authorized with the ID guaranteeing the middleman a charge payment for the band reservation.

(1) System Configuration

The description of the fifth method will be given with reference to FIG. 10 that is a diagram showing a system configuration of the fifth method. The system of FIG. 10 includes the DTE-a, the ISPs (ISP-a and ISP-b), the content server α, and the middleman server β.

A description will be given of configurations and operations of the content server α, the middleman server β, and each of the ISPs.

(2) Configuration of the Content Server α

The content server α includes the line connection part 11, the control part 12, and the contents 16. The line connection part is equal to that of the content server α of the first method. The control part 12 includes a payment ID storage table 18, and processes data received from the line connection part 11. Further, the control part 12 can perform and process operations in conformity to the RSVP protocol.

FIG. 11A is a diagram showing an example of the payment ID storage table 18. The payment ID storage table 18 is used for storing an ID (a payment ID) issued when the content provider and the middleman make a general contract for payment for band reservation. The ID is transmitted and received as an object of each RSVP message such as a Path message, a Resv message, a Resv Tear message, or a Path Tear message, and is used for a router to determine whether the message (RSVP message) requesting the band reservation is payment-guaranteed. Further, the ID is exchanged as a key used by router-managing servers or the middleman to confirm a guarantee on payment for the band reservation.

(3) Operation of the Content Server α

A description will be given of an operation of the content server α from receiving a content request accompanied by a band reservation request from the DTE-a and transmitting a Path message to request the routers on the transmission line between the content server α and the DTE-a to reserve a requested band up to transmitting a Path Tear message to the DTE-a to confirm the release of the reserved band. The operation is performed in the following steps.

(a) Receiving the content request from the DTE-a, first, the content server α starts to transmit a requested content to the DTE-a without reserving a band. Further, in order to cause the routers on the transmission line to the DTE-a to prepare for the band reservation, the content server α includes the ID extracted from the payment ID storage table 18 in the Path message as an object, and transmits the Path message, letting the IP address of the DTE-a be a destination address.

(b) Receiving a Resv message transmitted from the DTE-a, the content server α controls a transfer rate for the transmitted content in accordance with a band to be reserved (the requested band) of flow spec objects in the Resv message.

(c) Receiving a Resv Tear message from the DTE-a, the content server α transmits a Path Tear message to the DTE-a to confirm the release of the reserved band.

Next, a description will be given of an operation of the content server α in the case of being charged for the band reservation by the middleman server β.

Receiving billing particulars (amount billed, payment ID, destination IP address, destination port number, reserved (requested) band, use start date and time, and use end date and time) from the middleman server β, the content server α pays the middleman the amount billed and charges the user the amount paid.

(4) Configuration of the Middleman Server β

The middleman server β includes the line connection part 21 and the control part 22. The line connection part 21 is equal to that of the middleman server β of the first method. The control part 22 includes a payment ID management table 26 and an ISP billing particulars table 27, and processes data received from the line connection part 21 in accordance with the tables 26 and 27.

FIG. 11B is a diagram showing an example of the payment ID management table 26. The payment ID management table 26 is recorded with payment IDs issued in advance to content providers (servers) for their respective IP addresses when the middleman contracts the content providers. In this case, the payment ID to the content server α is stored in the payment ID management table 26, being correlated with the IP address of the content server α.

FIG. 11C is a diagram showing an example of the ISP billing particulars table 27. The ISP billing particulars table 27 is recorded with billing particulars transmitted from a server (a bill collection server 80 in FIG. 10) that manages a router (the router 40-a in FIG. 10) and collects a bill for a band reservation.

(5) Operation of the Middleman Server β

A description will be given of an operation of the middleman server β from receiving the billing particulars from the bill collection server 80 up to charging the content server α the amount billed. The operation is performed in the following steps.

(a) Receiving the billing particulars with the payment ID from the bill collection server 80, which has received the usage particulars of the reserved band (band usage particulars) from the ISP router 40-a, the control part 22 records the billing particulars on the ISP billing particulars table 27.

(b) After a given period of time passes, the control part 22 searches the ISP billing particulars table 27 for the IP address of the content server α corresponding to the payment ID, and transmits the billing particulars, letting the searched-out IP address be a destination address.

Next, a description will be given of configurations and operations of the bill collection server 80 and the ISP router 40.

(6) Configuration and Operation of the Bill Collection Server 80

The bill collection server 80 includes a billing address determination table 81 and a billing particulars table 82.

FIG. 12A is a diagram showing an example of the billing address determination table 81. The billing address determination table 81 prestores a middleman IP address that is a billing address for a payment ID when a middleman contracts an ISP (the ISP-a in FIG. 10) that manages the bill collection server 80 and the ISP router 40.

FIG. 12B is a diagram showing an example of the billing particulars table 82. The billing particular table 82 is recorded with the band usage particulars (payment ID, destination IP address, and destination port number) collected from the ISP router 40.

(7) Operation of the Bill Collection Server 80.

A description will be given of an operation of the bill collection server 80 from receiving the band usage particulars from the ISP router 40 up to charging the middleman server β.

(a) The bill collection server 80 collects the band usage particulars at regular intervals from the ISP router 40 managed and identified by the bill collection server 80, letting the IP address of the ISP router 40 be a destination address.

(b) Collecting the band usage particulars, the bill collection server 80 extracts the IP address of the middleman server β that is the billing address from the billing address determination table 81 based on the payment ID included in the band usage particulars.

(c) The bill collection server 80 transmits the band usage particulars to the middleman server β with the extracted IP address being a destination address.

(8) Configuration of the ISP Router 40

The ISP router 40 is capable of interpreting an object of a newly defined payment ID in each RSVP message, and includes a payment ID determination table 41 and a band usage particulars table 42.

FIG. 12C is a diagram showing an example of the payment ID determination table 41. The payment ID determination table 41 stores a payment ID when a middleman contracts an ISP managing the bill collection server 80 and the ISP router 40.

When a Path message including a payment ID is received from a content provider, or when an Resv message including a payment ID is received from a user, by comparing the payment ID with a payment ID recorded on the payment ID determination table 41 to see whether the payment IDs match, it is confirmed whether payment for the band reservation by the message is guaranteed.

FIG. 12D is a diagram showing an example of the band usage particulars table 42. The band usage particulars table 42 is recorded with such information as payment ID, destination IP address, destination port number, reserved (requested) band, use start date and time, and use end date and time. When the ISP router 40 receives each RSVP message (Path message, Resv message, Resv Tear message, and Path Tear message), such information is extracted from the received message and recorded on the band usage particulars table 42. Further, when the ISP router 40 receives a message notifying the collection of band usage particulars from the bill collection server 80, the ISP router 40 transmits the band usage particulars to the bill collection server 80.

(9) Operation of the ISP Router 40

A description will be given of an operation of the ISP router 40 in the case of transmitting and receiving RSVP messages for band reservation from a content provider and a user terminal.

(a) Receiving the Path message including the payment ID as an object from the content server α, the ISP router 40 confirms whether the payment ID matches that recorded on the payment ID determination table 41 (that is, whether the payment ID is recorded on the payment ID determination table 41). If it is confirmed in the affirmative, the ISP router 40 records session objects (destination IP address and destination port number) included in the Path message as well as the payment ID on the band usage particulars table 42. Thereafter, the ISP router 40 transmits the Path message to the DTE-a.

(b) Receiving the Resv message including the payment ID as an object from the DTE-a, the ISP router 40 confirms whether the payment ID and the session objects match those recorded on the band usage particulars table 42. If it is confirmed in the affirmative, the ISP router 40 sets the requested band set as a flow spec object in the Resv message actually as a band to be reserved by the ISP router 40. At this time, the ISP router 40 records the requested band and a usage start date and time at which the requested band is reserved on the band usage particulars table 42. Thereafter, the router 40 transmits the Resv message to the content provider (the content server α).

(c) Receiving the Resv Tear message including the payment ID as an object from the DTE-a, the ISP router 40 confirms whether the payment ID and the session objects match those recorded on the band usage particulars table 42. If it is confirmed in the affirmative, the ISP router 40 increases the line band of its corresponding port to its original level in data transmission amount. Further, the ISP router 40 records a usage end date and time on the band usage particulars table 42. Thereafter, the ISP router 40 transmits the Resv Tear message to the content server α.

(d) Receiving the Path Tear message including the payment ID as an object from the content server α, the ISP router 40 transfers the Path Tear message directly to the DTE-a.

Next, a description will be given of an operation of the ISP router 40 in the case of receiving the message notifying the collection of band usage particulars from the bill collection server 80.

Receiving the message notifying the collection of the stored band usage particulars from the bill collection server 80 managing the ISP router 40, the ISP router 40 transmits the band usage particulars stored by that time to the bill collection server 80.

Next, a description will be given, with reference to the accompanying drawings, of embodiments of the present invention.

[First Embodiment]

In a first embodiment, a content server (content provider), in distributing its content to a user terminal (user) via the Internet, transmits to a middleman server (middleman) the IP addresses of the user terminal and the content server, a desired band value to be reserved (a requested band) on a transmission line between the user terminal and the content server, the IP addresses of the ports of all routers between the user terminal and the content server so that the middleman server causes policy servers between the user terminal and the content server to reserve the requested band.

(1) System Configuration

A description will be given of the first embodiment with reference to FIG. 13A that is a diagram showing a network structure of the first embodiment. A description of second through fourth embodiments will also be given with reference to FIG. 13A.

Figure 13A:
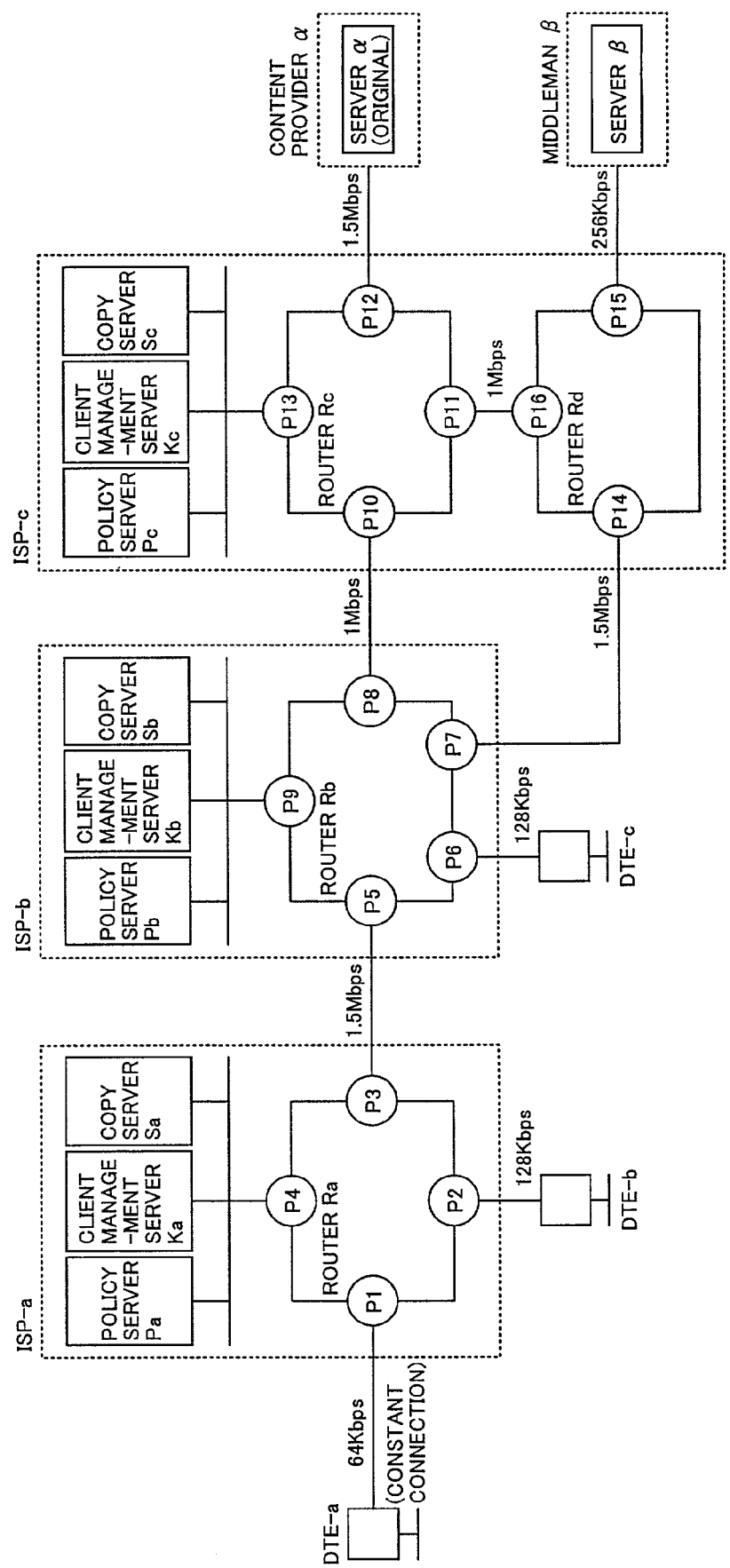
FIG. 13A is a diagram showing a network structure of a first embodiment of the present invention.

As shown in FIG. 13A, a network of the first embodiment includes user terminals (DTE-a through DTE-c), ISPs (ISP-a through ISP-c), a server of a content provider α (a content server α), and a server of a middleman β (a middleman server β). The content server α and the middleman server β are equal in structure and operation to those previously described in the first through fifth method.

The ISP-a includes a policy server Pa, a client management server Ka, a copy server Sa, and a router Ra. The ISP-b includes a policy server Pb, a client management server Kb, a copy server Sb, and a router Rb. The ISP-c includes a policy server Pc, a client management server Kc, a copy server Sc, and routers Rc and Rd. The policy servers Pa through Pc are equal to the above-described policy server 30, the client management servers Ka through Kc are equal to the above-described client management server 50, the copy servers Sa through Sc are equal to the above-described copy server 60, and the routers Ra through Rd are equal to the above-described routers 40.

The router Ra includes ports P1 through P4, the router Rb includes ports PS through P9, the router Rc includes ports P10 through P13, and the router Rd includes ports P14 through P16.

The content server α includes the middleman address management table 13, the content information management table 14, and the user policy storage table 15 as shown in FIG. 1.

The middleman server β includes the contractor ISP management table 23, the ISP policy table 24, and the policy reservation determination management table 25 as shown in FIG. 1.

The IP addresses of the above-described components of the network are shown in FIG. 13B.

(2) Precondition

In the network structure of FIG. 13A, a variety of data is set in each of the following network components. Here, a band of "128 Kbps" is reserved in advance on a transmission line between the DTE-b and DTE-c for a period of 10:00 to 12:00 on 2001/9/1.

Next, a description will be given of the tables set in the content server α, the middleman server β, and the policy servers Pa through Pc and the routers Ra through Rd of the ISP-a through ISP-c.

(A) Tables Set in the Content Server α

The content server α includes the middleman address management table 13, the content information management table 14, and the user policy storage table 15.

As shown in FIG. 14A, the user policy management table 15 manages a band reservation request from the user (DTE-a) by a serial ordering number assigned thereto. The band reservation request from the user is called a "policy".

As shown in FIG. 14B, the middleman address management table 13 manages the IP address of the middleman β (middleman server β) so as to transmits the user policy to the middleman β. Here, the middleman address management table 13 prestores the IP address of the middleman server β.

As shown in FIG. 14C, the content information management table 14 manages a content capacity for calculating a reservation end time for the band request from the user. Here, the content information management table 14 stores information on contents A and B.

(B) Tables Set in the Middleman Server β

The middleman server β includes the contractor ISP management table 23, the ISP policy table 24, and the policy reservation determination management table 25.

As shown in FIG. 15A, the contractor ISP management table 23 manages the network addresses of the ISP-a through ISP-c and the IP addresses of the policy servers Pa through Pc and the client management servers Ka through Kc so as to make band reservation for the ISP-a through ISP-c. Here, the contractor ISP management table 23 prestores the network addresses of the ISP-a through ISP-c and the IP addresses of the policy servers Pa through Pc and the client management servers Ka through Kc.

As shown in FIG. 15B, the ISP policy table 24 temporarily stores the user policy (band reservation request from the user) transmitted from the content server α and manages the user policy by a serial order reception number assigned thereto so as to transmit the user policy to each of the policy servers Pa through Pc of the ISP-a through ISP-c.

As shown in FIG. 15C, the policy reservation determination management table 25 manages band reservation results transmitted from the policy servers Pa through Pc.

(C) The Tables Set in the Policy Servers Pa through Pc

Each of the policy servers Pa through Pc of the ISP-a through ISP-c includes the output side port band management table 31, the executed policy management table 32, and the router management table 33.

FIGS. 16A through 16C are diagrams showing the output side port band management tables 31 of the policy servers Pa through Pc, respectively, according to this embodiment. As shown in FIGS. 16A through 16C, each output side port band management table 31 manages the bands of the output ports of the corresponding router(s). Here, the band of "128 Kbps" is reserved on the transmission line between the DTE-b and the DTE-c for a period of 10:00 to 12:00 on 2001/9/1.

FIGS. 17A through 17C are diagrams showing the executed policy management tables 32 of the policy servers Pa through Pc, respectively, according to this embodiment. As shown in FIGS. 17A through 17C, each executed policy management table 32 manages the user policy operated by the corresponding router(s) by a serial policy number assigned to the user policy. Here, the band of "128 Kbps" is reserved on the transmission line between the DTE-b and the DTE-c for the period of 10:00 to 12:00 on 2001/9/1.

FIGS. 18A through 18C are diagrams showing the router management tables 33 of the policy servers Pa through Pc, respectively, according to this embodiment. As shown in FIGS. 18A through 18C, each router management table 33 manages IP addresses used for identifying the corresponding router(s) and its ports in transmitting to the corresponding router(s) the user policy transmitted from the middleman server β. Each of the routers Ra through Rd of the ISP-a through ISP-c has given routing information, and routing is performed based on the routing information.

(3) System Operation

Figure 19:
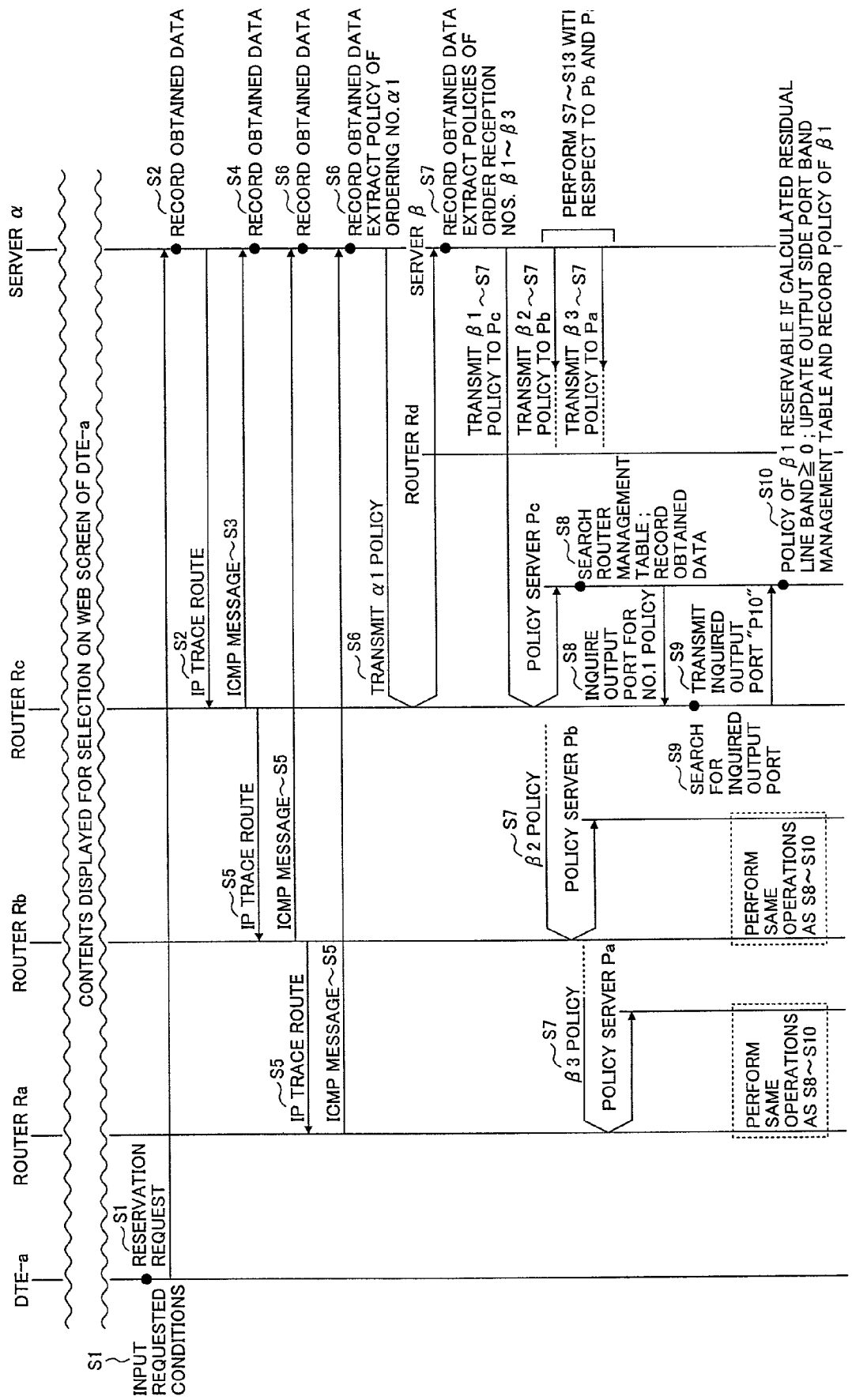
FIGS. 19 and 20 are diagrams showing a sequence of steps of a system operation according to the first embodiment.
Figure 20:
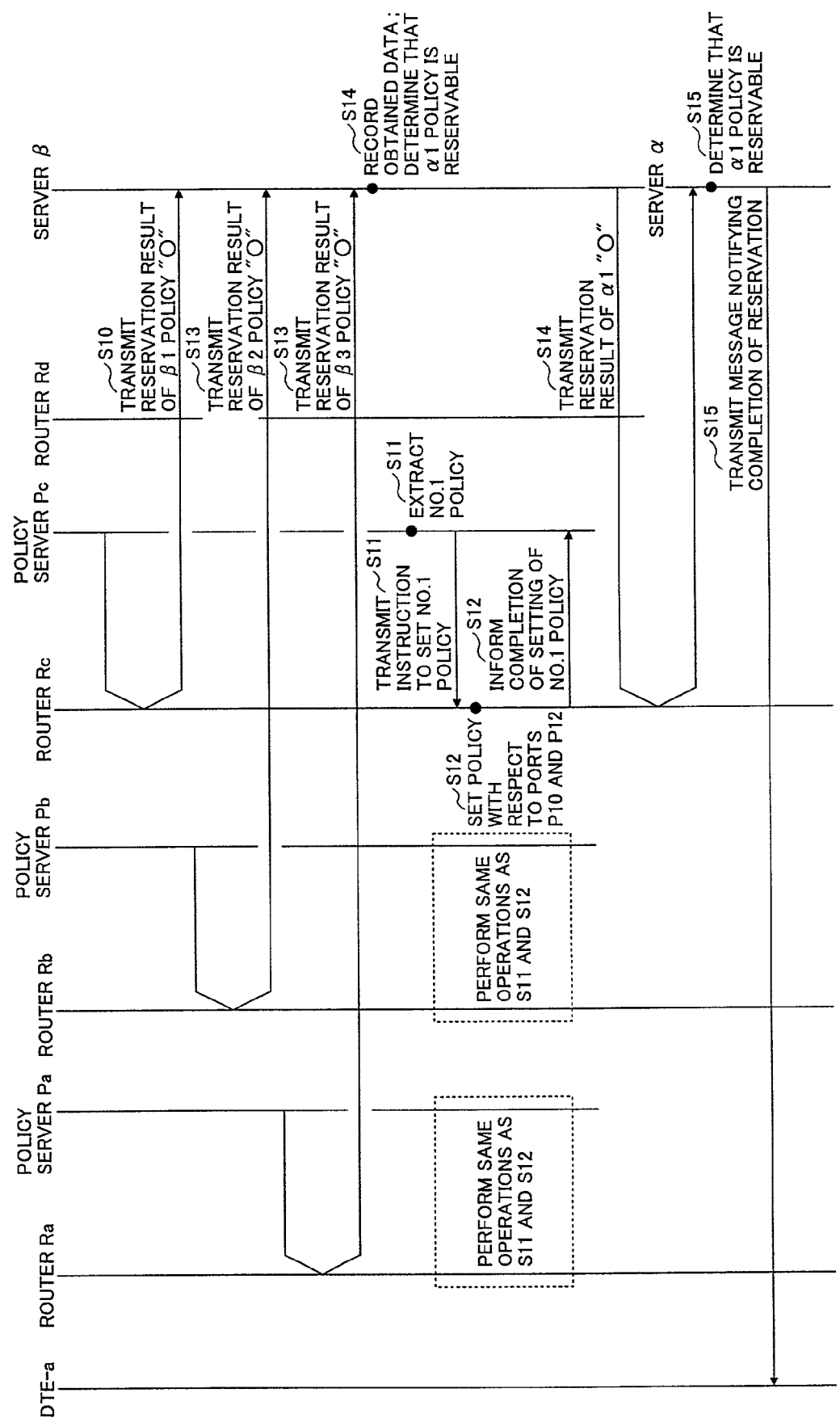

FIGS. 19 and 20 are diagrams showing a sequence of steps of a system operation according to the first embodiment. FIGS. 21 through 26 are flowcharts of operations of the DTE-a, the content server α, the middleman server β, the policy servers Pa through Pc, and the routers Ra through Rc.

A description will be given, with reference to FIGS. 19 through 35C, of a system operation according to the first embodiment.

In step S1 of FIG. 19, the user selects conditions to be requested from the list of contents displayed on a web screen of the DTE-a, and the DTE-a transmits an IP packet including the conditions to the content server α. This operation corresponds to steps S10101 through S10102 of FIG. 21. The IP packet transmitted to the content server α is shown in FIG. 27A.

The conditions requested by the DTE-a are as follows:
Content name: Content A
Desired band value to be reserved (requested band): 64 Kbps
Reservation start date and time: 2001/9/1, 10:00 a.m.

Figure 21:
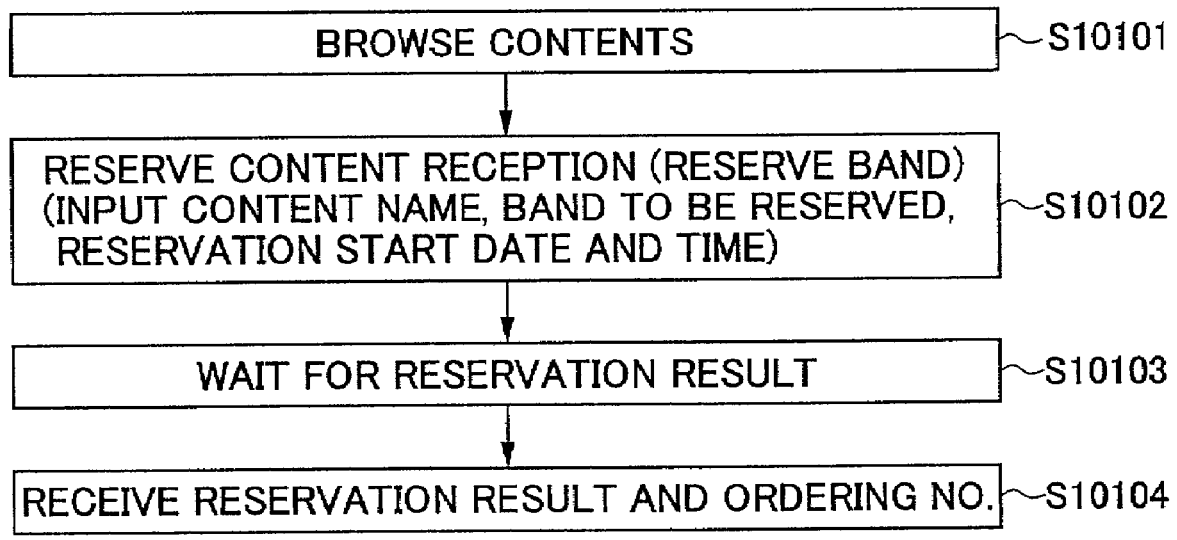
FIG. 21 is a flowchart of an operation of a user terminal according to the first embodiment.

Thereafter, the DTE-a waits for a band reservation result transmitted from the content server α (step S10103 of FIG. 21).

In step S2 of FIG. 19, when the content server α, which waits to receive data (step S10201 of FIG. 22), receives the IP packet (step S10202), the content server α identifies the transmitter of the IP packet (step S10203) and extracts from the IP packet its transmitter IP address and the requested conditions (content name, requested band, and reservation start date and time) of the DTE-a (step S10204).

Thereafter, first, as shown in FIG. 27B, the content server α extracts the IP address of the middleman server β from the middleman address management table 13 (step S10205).

Next, as shown in FIG. 27C, the content server α searches the content information management table 14 for the content name (content A) specified by the DTE-a, and calculates a reservation (transmission) end date and time from a content capacity for the content name (step S10206). As shown in FIG. 27D(a), since the content A of 57.6 Mbytes in size is to be transmitted at a transmission rate of 64 Kbps, 7200 seconds are required to transmit the content A. Therefore, by adding 7200 seconds to the reservation start date and time of 2001/9/1, 10:00 a.m. as shown in FIG. 27D(b), the reservation end date and time is calculated at 2001/9/1, 12:00 p.m. as shown in FIG. 27D(c).

Figures 27E, 27F:
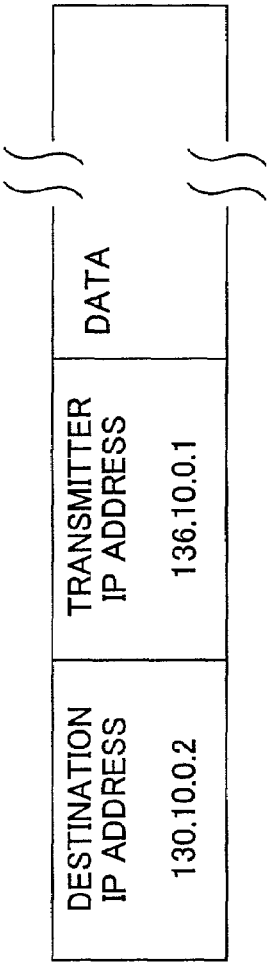

Further, as shown in FIG. 27E, the content server α assigns an ordering number "α1" to a group of the obtained data items (middleman server IP address, content name, transmitter IP address, requested band, reservation start date and time, and calculated reservation end date and time), and records the data in the respective columns (ordering number, middleman IP address, content name, user IP address, requested band, reservation start date and time, and reservation end date and time) on the user policy storage table 15 (step S10207).

Here, in order to reserve a data transfer route for the content A on the transmission line between the DTE-a and the content server α, the content server α, letting the data recorded in the column of user IP address of the user policy storage table 15 be a destination address, transmits an IP trace route shown in FIG. 27E to the DTE-a (step S10208).

In step S3 of FIG. 19, when the router Rc, which waits to receive data (step S10601 of FIG. 26), receives the IP trace route (step S10602), the router Rc identifies the transmitter of the IP trace route (step S10603) and transmits an ICMP message as shown in FIG. 28A to the content server α with the transmitter IP address of the IP trace route and the IP address of its port P12 being set as the destination IP address and the transmitter IP address of the ICMP message, respectively (step S10604).

Figure 22:
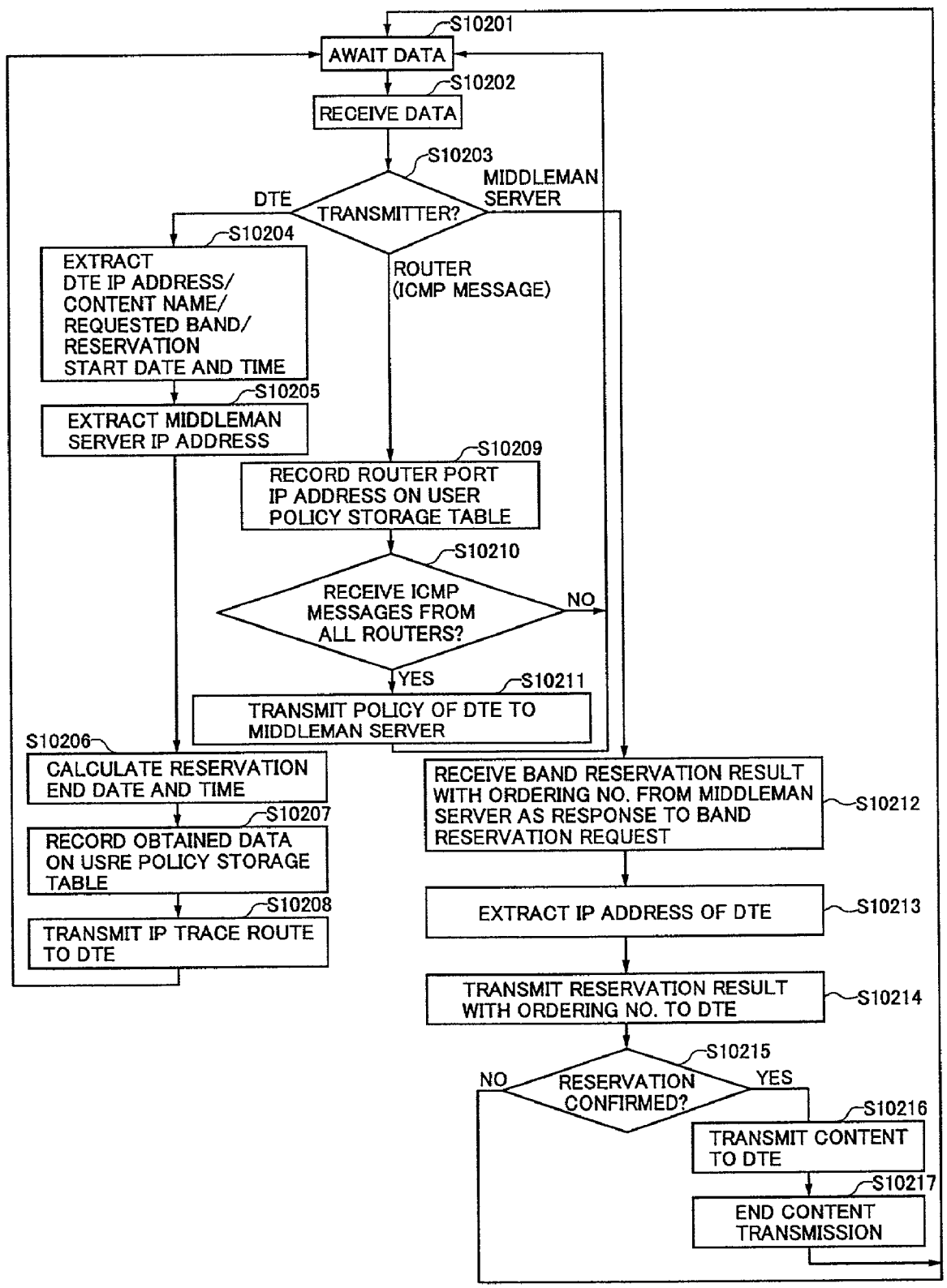
FIG. 22 is a flowchart of an operation of the content server according to the first embodiment.

In step S4 of FIG. 19, receiving the ICMP message from the router Rc, the content server α extracts the transmitter IP address from the ICMP message and records the transmitter IP address in the column of router port IP address on the user policy storage table (step S10209 of FIG. 22).

In step S5 of FIG. 19, the router Rc transmits the IP trace route to the router Rb as in step S2, and the router Rb, receiving the IP trace route, transmits an ICMP message to the content server α. Thereafter, the router Ra operates in the same way as in steps S2 and S3 (steps S10601 through S10604). FIG. 28C is a diagram showing the ICMP message transmitted from the router Rb to the content server α, and FIG. 28D is a diagram showing the ICMP message transmitted from the router Ra to the content server α.

In step S6 of FIG. 19, receiving the ICMP messages from the routers Rb and Ra, the content server α extracts the transmitter IP addresses of the ICMP messages as in step S4, and records the extracted transmitter IP addresses in the column of router port IP address on the user policy storage table 15. FIG. 29A is a diagram showing the user policy storage table 15 recorded further with the transmitter IP addresses of the routers Rb and Ra. Thereafter, it is determined whether the content server α has received the ICMP messages from all the routers (the routers Ra through Rc in this case) on the transmission line between the DTE-a and the content server α (step S10210 of FIG. 22).

If it is determined in the negative in step S10210, the steps S10201 through S10203 and S10209 are repeated until the content server α receives the ICMP messages from all the routers Ra through Rc.

If it is determined in the affirmative in step S10210, in step S10211, the content server α, letting the data corresponding to the ordering number α1 in the column of middleman server IP address of the user policy storage table 15 be a destination IP address, transmits to the middleman server β an IP packet including the items of the user policy (ordering number, user IP address, requested band, reservation start date and time, reservation end date and time, and router port IP addresses (input side)) of the ordering number α1. The IP packet includes information indicated by hatching in FIG. 29B as data. FIG. 29C is a diagram showing the IP packet.

In step S7 of FIG. 19, when the middleman server β, which waits to receive data (step S10301 of FIG. 23), receives the IP packet (step S10302), the middleman server β identifies the transmitter of the IP packet (step S10303) and extracts from the IP packet its transmitter IP address and the policy items (ordering number, user IP address, requested band, reservation start date and time, reservation end date and time, and router port IP addresses) of the user policy of the ordering number α1 (step S10304).

Thereafter, first, the middleman server β extracts the router port IP addresses (addresses of the input ports P3, P8, and P12) of the routers Ra, Rb, and Rc from the user policy (step S10305), and searches the column of network address on the contractor ISP management table 23 for network addresses (network addresses of the ISP-a through ISP-c) corresponding to the extracted router port IP addresses (step S10306). Then, the middleman server β extracts data corresponding to the extracted network addresses from the column of policy server IP address of the contractor ISP management table 23 (step S10307). That is, the middleman server β extracts the IP addresses of the policy servers Pa through Pc. FIG. 30A is a diagram for illustrating the above-described operations.

Then, in step S10308, it is determined whether the middleman server β has extracted the IP addresses of the policy servers Pa through Pc. If it is determined in the negative in step S10308, the middleman server β records NG (not confirmed) in the column of reservation result on the policy reservation determination management table 25 for each corresponding one of the policy server IP addresses (step S10312), and transmits to the content server α a message that the user policy of the ordering number α1 is not reservable (step S10313). Thereafter, the operation goes back to step S10301.

If it is determined in the affirmative in step S10308, the middleman server β assigns an order reception number "β1" to the extracted IP address of the policy server Pc, and records the order reception number "β1" and the IP address of the policy server Pc in the columns of order reception number and policy server IP address on the ISP policy table 24. Further, with respect to the policy server Pc, the middleman server β records the extracted policy items (transmitter IP address, user IP address, requested band, reservation start date and time, reservation end date and time, and router port IP address) in their respective columns (content server IP address, user IP address, requested band, reservation start date and time, reservation end date and time, and router port IP address) on the ISP policy table 24 so that the items are correlated with the ordering number β1 (that is, the items are recorded in a row corresponding to the ordering number β1 in the columns on the ISP policy table 24).

Thereafter, the middleman server β successively performs the same operation with respect to each of the policy servers Pb and Pa, and records the extracted data on the ISP policy table 24 as shown in FIG. 30B (step S10309). The policy servers Pb and Pa are assigned order reception numbers "β2" and "β3", respectively.

Further, the middleman server β records the extracted data items (transmitter IP address and ordering number) in the columns of content server IP address and ordering number on the policy reservation determination management table 25, respectively, and as shown in FIG. 31A, records a pair of the data of order reception number and policy server IP address of each of the policy servers Pa through Pc in the columns of order reception number and policy server IP address on the policy reservation determination management table 25 so that each pair of the data is correlated with the IP address "136.10.0.1" of the content server α in the column of the content server IP address (step S10310).

Here, in order to cause the policy server Pc of the ISP-c to execute the user policy, the middleman server β, letting the data corresponding to the order reception number β1 in the column of policy server IP address of the ISP policy table 24 be a destination address, transmits to the policy server Pc an IP packet including the policy items (order reception number, user IP address, content server IP address, requested band, reservation start date and time, reservation end date and time, and router port IP address) of the order reception number β1. FIG. 31B is a diagram showing the ISP policy table 24 according to this embodiment. In FIG. 31B, the data items of the user policy transmitted to the policy server Pc are indicated by hatching. FIG. 31C is a diagram showing the IP packet transmitted from the middleman server β to the policy server Pc.

The middleman server β successively extracts the order reception numbers β2 and β3, and performs the same operation with respect to each of the policy servers Pb and Pa (step S10311). FIGS. 31E and 31F are diagrams showing IP packets transmitted from the middleman server β to the policy servers Pb and Pa, respectively.

In step S8 of FIG. 19, when the policy server Pc, which waits to receive data (step S10401 of FIG. 24), receives the IP packet from the middleman server β (step S10402), the policy server Pc identifies the transmitter of the IP packet (step S10403) and extracts from the IP packet its transmitter IP address and the policy items (order reception number, user IP address, content server IP address, requested band, reservation start date and time, reservation end date and time, and router port IP address) of the order reception number β1 (step S10404).

Then, as shown in FIG. 32A, the policy server Pc searches the column of router port IP address on the router management table 33 based on the extracted item of router port IP address (IP address of the port P12), and extracts data corresponding to the searched-out router port IP address from the column of router virtual IP address on the router management table 33 (step S10405).

Next, in order to transmit the policy to the subordinate router Rc, the policy server Pc assigns a policy number "1" to the extracted policy items (transmitter IP address, order reception number, user IP address, content server IP address, requested band, reservation start date and time, reservation end date and time, and router virtual IP address), and records the policy items in the columns of middleman IP address, order reception number, destination IP address, transmitter IP address, requested band, reservation start date and time, reservation end date and time, and router virtual IP address of the executed policy management table 32, respectively (step S10406). FIG. 32B is a diagram showing the executed policy management table 32 according to this embodiment.

Then, the policy server Pc transmits to the router Rc an IP packet including a message inquiring the output side port of the router Rc to the user IP address of the policy number 1 (step S10407). FIG. 32C is a diagram showing the IP packet.

In step S9 of FIG. 19, receiving the IP packet from the policy server Pc, the router Rc determines whether the IP packet includes the message inquiring an output side port thereof (step S10605). If the router Rc determines that the IP packet includes the inquiry message, in step S10611, the router Rc searches for its router port to the user IP address of the policy number 1 (the IP address of the DTE-a). Then, in step S10612, the router Rc transmits to the policy server Pc an IP packet including the result of the inquiry (that is, the number (P10) of the output port P10). FIG. 33A is a diagram showing the IP packet including the inquiry result.

In step S10 of FIG. 19, when the policy server Pc receives the IP packet from the router Rc, the policy server Pc determines whether the IP message includes the result of a request to reserve a band for the DTE-a (step S10408). Since the IP message does not include the band reservation result, the policy server Pc determines that the received IP packet is a response to the inquiry about the output side port of the router Rc, and extracts the policy number ("1") and the inquiry result (output side port P10) from the IP packet (step S10410). Then, in step S10411, the policy server Pc searches the column of policy number on the executed policy management table 32 for the policy number 1, and records the number (P10) of the output port P10 in the column of output port number on the executed policy management table 32 so that the number (P10) of the output port P10 is correlated with the policy number 1 (that is, the number (P10) of the output port P10 is recorded in a row corresponding to the policy number 1 in the column on the executed policy management table 32). FIG. 33B is a diagram showing the executed policy management table 32 recorded with the policy number 1.

Next, the policy server Pc extracts the output port number P10, and searches the column of output port number on the output side port band management table 31 so as to find a residual line band for a reserved period corresponding to the output port number P10 (step S10412).

Since the reservation start date and time and reservation end date and time extracted in step S8 are 10:00 a.m. and 12:00 p.m., respectively, the policy server Pc determines whether the requested band is reservable in the residual line band for the reserved period of 10:00 to 12:00 of the router port number P10 (step S10413). In this case, as shown in FIG. 33C, by subtracting 64 Kbps from the residual line band of 1 Mbps, a band of 0.936 Mbps in a data transmission amount is still obtained. Since 0.936 Mbps>0 bps, the policy server Pc determines that the requested band is reservable, that is, the policy of the order reception number β1 is executable, and updates the output side port band management table 31 as shown in FIG. 33D (step S10414). That is, the policy server Pc decreases the residual line band for the reserved period of 10:00 to 12:00 of the output port number P10 by the data transmission amount of the requested band.

If the result of the subtraction of the requested band from the residual line band is smaller than zero bps, the policy server Pc determines that the policy of the order reception number β1 is not reservable, and transmits to the middleman server β a message to that effect (step S10416).

Here, as shown in FIG. 33E, the policy server Pc transmits to the middleman server β an IP packet including a reservation result "○ (OK or confirmed)" of the user policy of the order reception number β1, letting the data in the column of middleman server IP address on the executed policy management table 32 be a destination address (step S10415).

In step S11 of FIG. 20, the policy server Pc refers to the executed policy management table 32 when necessary (step S10501 of FIG. 25), and if it is determined in step S10502 that the reservation start (date and) time comes, the policy server Pc extracts the policy items (policy number, destination IP address, transmitter IP address, requested band, reservation start date and time, and reservation end date and time) of the policy number 1 from the executed policy management table 32 shown in FIG. 34A.

Then, in order to cause the router Rc to set the user policy, the policy server Pc transmits to the router Rc an IP packet including the extracted policy items of the policy number 1, letting the data in the column of router virtual IP address on the executed policy management table 32 as shown in FIG. 34B (step S10505). FIG. 34B is a diagram showing the IP packet.

Figure 26:
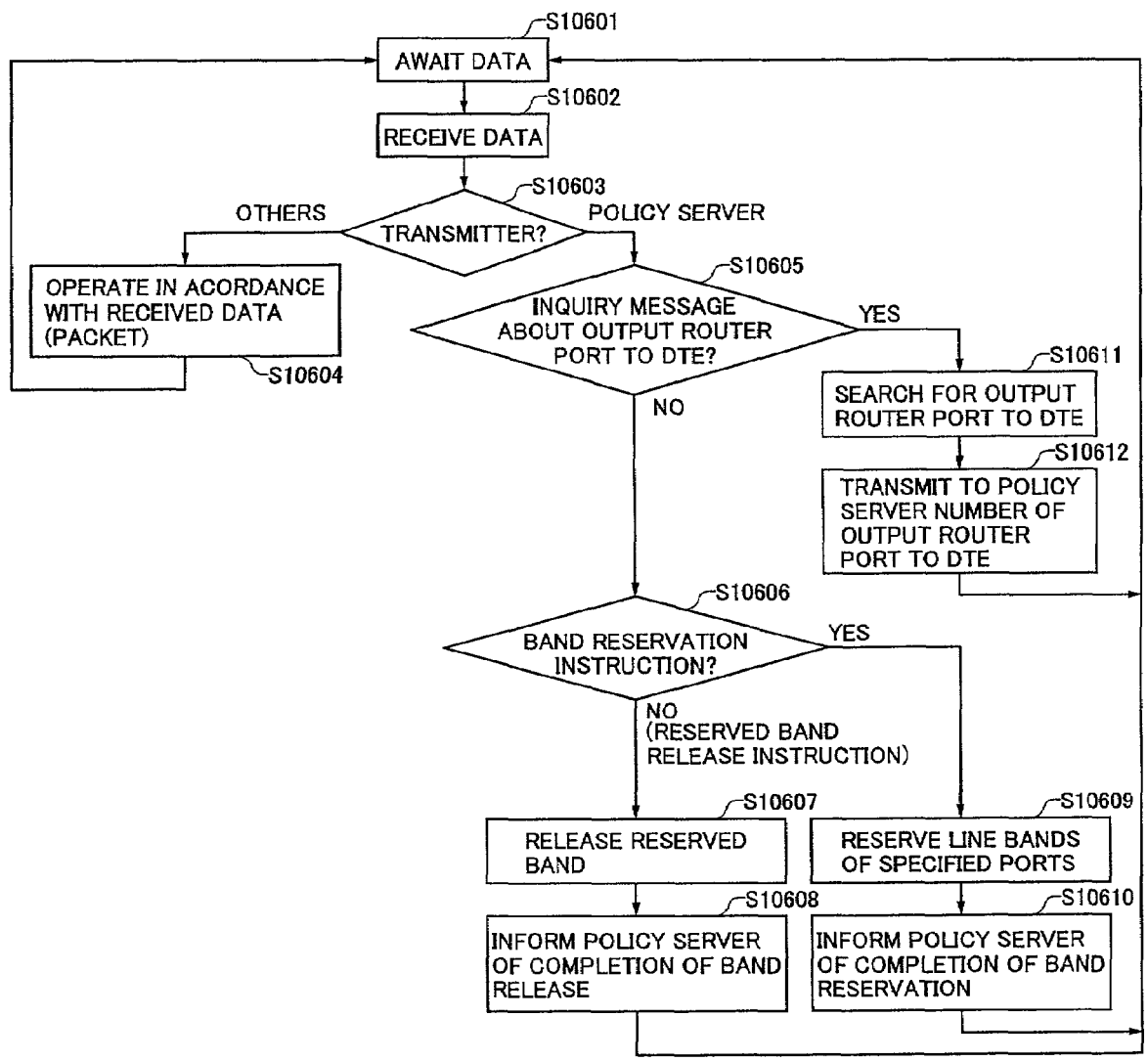
FIG. 26 is a flowchart of an operation of each ISP router according to the first embodiment.

In step S12, if it is determined in steps S10605 and S10606 of FIG. 26 that the IP packet from the policy server Pc is a band reservation instruction, the router Rc extracts the policy items and sets the policy with respect to its ports to the destination IP address and the transmitter IP address (that is, with respect to the ports P10 and P12) (step S10609).

Thereafter, the router Rc transmits to the policy server Pc an IP packet including a message notifying the completion of the setting of the policy of the policy number 1 (step S10610). FIG. 34C is a diagram showing the IP packet.

Figure 24:
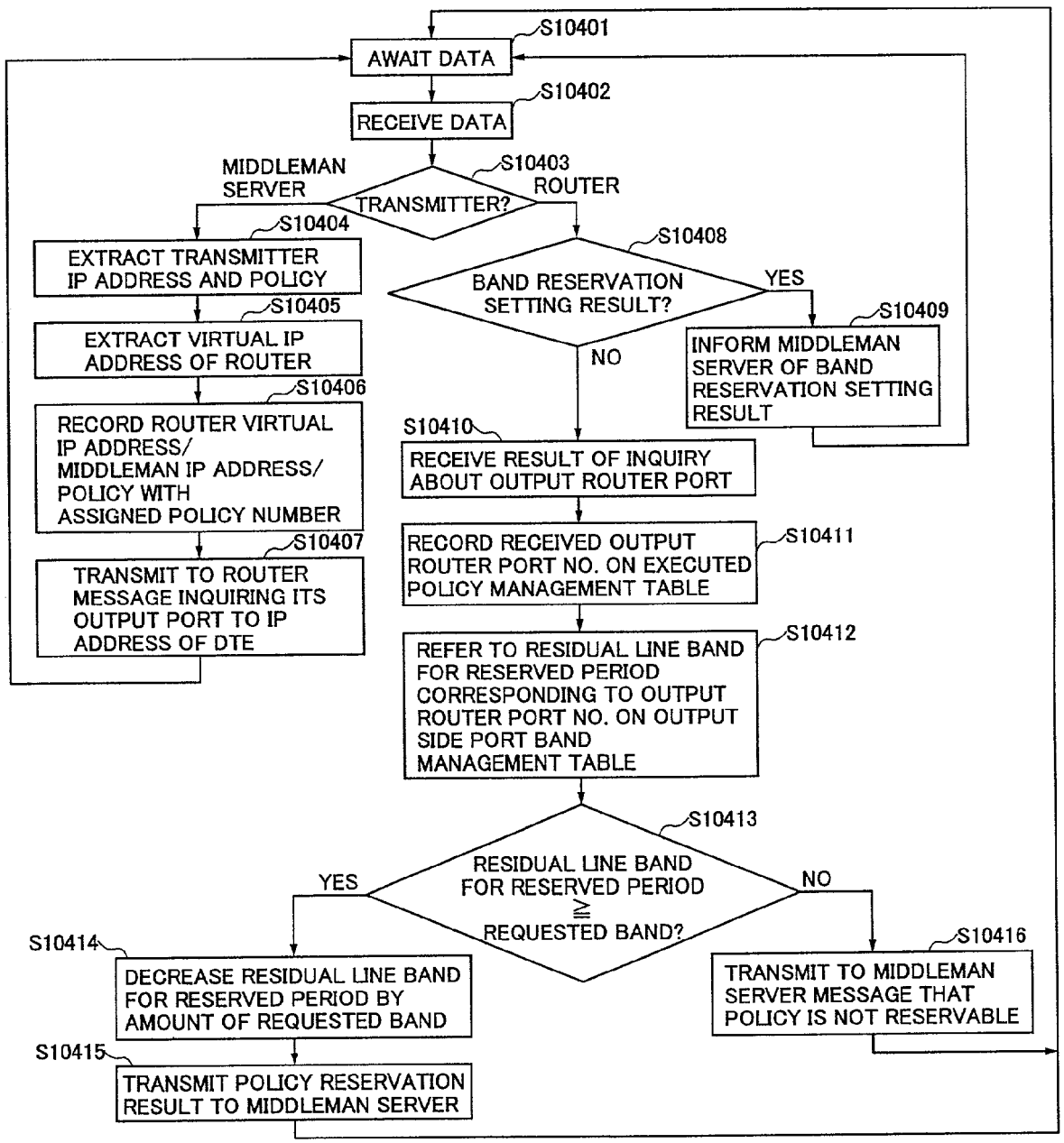
FIG. 24 is a flowchart of an operation of each policy server according to the first embodiment.
Figure 25:
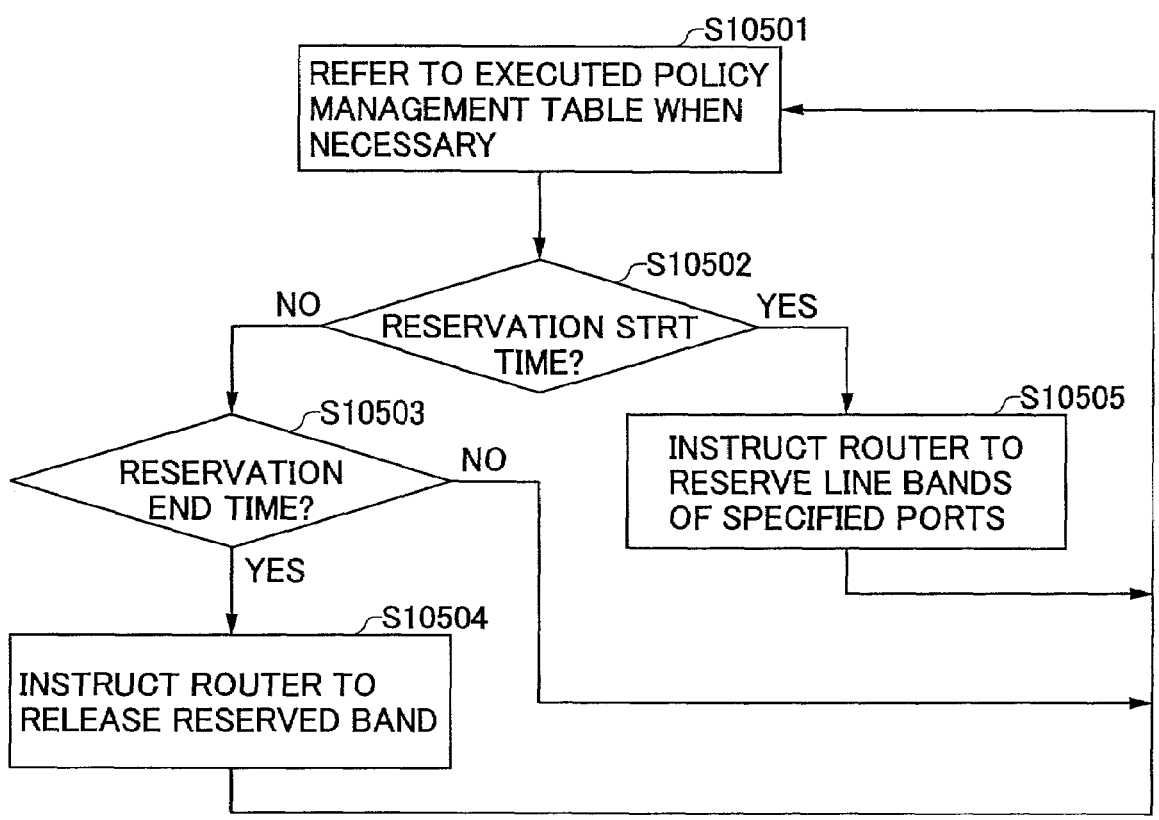
FIG. 25 is a flowchart of another operation of each policy server according to the first embodiment.

Receiving the IP packet from the router Rc, the policy server Pc informs the middleman server β of the completion of the setting of the policy of the policy number 1 (step S10409 of FIG. 24).

In step S13 of FIG. 20, the policy servers Pb and Pa successively transmits to the middleman server β IP packets including the reservation results of "○" of the policies of the policy numbers β2 and β3, respectively (see steps S10401 through 10408, and steps S10410 through 10415 of FIG. 24). FIGS. 34D and 34E are diagrams showing the IP packets transmitted from the policy servers Pb and Pa, respectively. Here, the middleman server β may receive the IP packets from the policy servers Pa through Pc in no special order although the middleman server β receives the IP packets from the policy servers Pc, Pb, and Pa in the order described in this embodiment for convenience of description.

In step S14 of FIG. 20, receiving the IP packets transmitted from the policy servers Pc, Pb, and Pa in steps S10 and S13, the middleman server β successively extracts the reservation results "○" of the policies of the order reception numbers β1 through β3 from the IP packets. Then, searching the column of order reception number on the policy reservation determination management table 25, the middleman server β records the reservation results "○" in the column of reservation result so that the reservation results "○" are correlated with the corresponding order reception numbers β1 through β3 (step S10314 of FIG. 23). FIG. 35A is a diagram showing the policy reservation determination management table recorded with the reservation results "○" in the column of reservation result.

Then, the middleman server β determines whether all the reservation results from the policy servers Pa through Pc are "○" (that is, whether all the band reservations are confirmed) (step S10315). If the middleman server β determines in step S10315 that all the reservation results are "○", in step S10316, the middleman server β judges by a general determination that the requested band is reservable, and transmits to the content server α an IP packet including a general determination result "○" for the ordering number α1, letting the data corresponding to the order reception numbers β1 through β3 in the column of content server on the policy reservation determination table 25 be a destination address (step S10316). FIG. 35B is a diagram showing the IP packet.

If any of the reservation results transmitted from the policy servers Pa through Pc is "× (NG or not confirmed)", the middleman server β determines in step S10315 that the requested band is not reservable, and transmits to the content server α an IP packet including a general determination result "×" for the ordering number α1.

In step S15 of FIG. 20, receiving the IP packet from the middleman server β (step S10212), the content server α extracts the general determination result "○" from the IP packet and determines that the policy for the DTE-a is reservable. Then, the content server α extracts the IP address of the DTE-a from the user policy storage table 15, using as a key the ordering number α1 received from the middleman server β (step S10213). Thereafter, the content server α transmits to the DTE-a an IP package including a message notifying the completion of the band reservation with the ordering number α1, such as "Reservation of the ordering number "α1" has been confirmed. Transmission of the content A will be completed in two hours from its start" (step S10214). FIG. 35C is a diagram showing the IP packet. The DTE-a receives the IP packet with the ordering number α1 (step S10104 of FIG. 21).

If the content server α receives the IP packet including the general determination result "×" in step S10212, the content server α transmits to the DTE-a an IP packet including a message to that effect, such as "Reservation is not confirmable."

Thereafter, the content server α determines whether the policy is reservable (that is, the requested band is reservable) (step S10215), and if the policy is reservable, the content server α starts transmitting the content A to the DTE-a with the reserved band for the reserved period of time (10:00 to 12:00) (step S10216). When the reservation end (date and) time comes (step S10503 of FIG. 25), the content server α ends the transmission of the content A (step S10217), and the policy servers Pa through Pc transmit to their respective routers Ra through Rc instructions to release the reserved band (step S10504). Receiving the instructions from the policy servers Pa through Pc, the routers Ra through Rc each release the reserved band (step S10607). Thereafter, the routers Ra through Rc transmits to their respective policy servers Pa through Pc IP packets each including a message notifying the completion of the band release (step S10608).

[Second Embodiment]

In the second embodiment, a content server (content provider), in distributing its content to a user terminal (user) via the Internet, transmits to a middleman server (middleman) the IP addresses of the user terminal and the content server and the IP addresses of the ports of all routers between the user terminal and the content server so that the middleman server makes an inquiry to a client management server of an ISP that the user contracts about a desired band value to be reserved (a requested band) on a transmission line between the user terminal and the ISP and causes the band value to be reserved on the transmission line between the user terminal and the content server.

(1) Precondition

In the network structure of FIG. 13A, a variety of data is set in each of the following network components. Here, a band of "128 Kbps" is reserved in advance on a transmission line between the DTE-b and DTE-c for a period of 10:00 to 12:00 on 2001/9/1.

Next, a description will be given of the tables set in the content server α, the middleman server β, and the policy servers Pa through Pc, the client management servers Ka through Kc, and the routers Ra through Rd of the ISP-a through ISP-c.

(A) The content server α includes the middleman address management table 13, the content information management table 14, and the user policy storage table 15 that are equal to those described in the first embodiment.

(B) The middleman server β includes the contractor ISP management table 23, the ISP policy table 24, and the policy reservation determination management table 25 that are equal to those described in the first embodiment.

(C) Each of the policy servers Pa through Pc of the ISP-a through ISP-c includes the output side port band management table 31, the executed policy management table 32, and the router management table 33 that are equal to those described in the first embodiment.

(D) Each of the client management servers Ka through Kc of the ISP-a through ISP-c includes the client management table 51. FIGS. 41A through 41C are diagrams showing the client management tables 51 of the client management servers Ka through Kc, respectively, according to this embodiment. As shown in FIGS. 41A through 41C, the client management tables 51 manage bands used for the connections of the users (DTE-a through DTE-c) to their respective ISPs (ISP-a through ISP-c) via a pay phone network.

Each of the routers Ra through Rd of the ISP-a through ISP-c has given routing information, and routing is performed based on the routing information.

(2) System Operation

Figure 36:
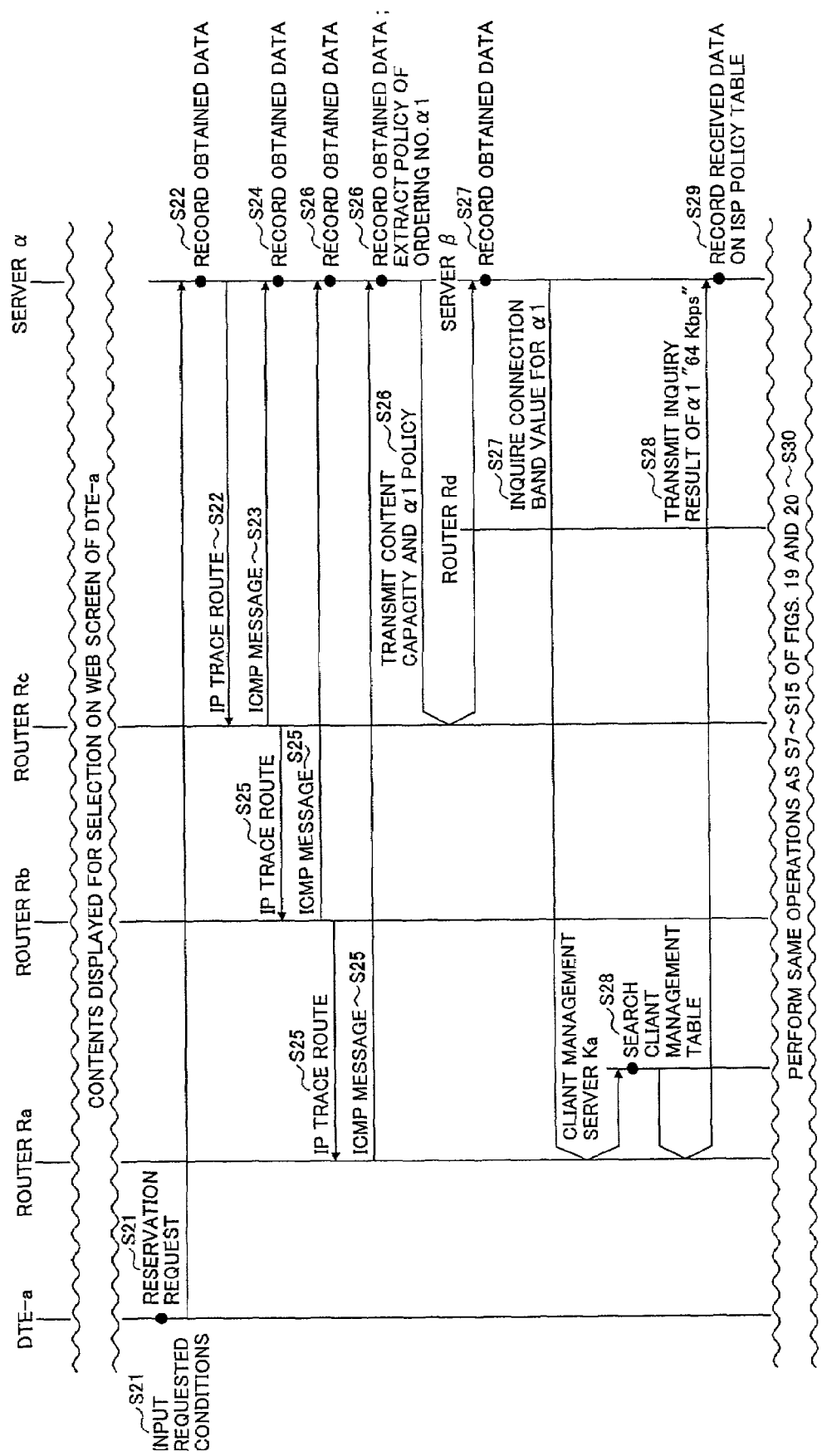
FIG. 36 is a diagram showing a sequence of steps of a system operation according to a second embodiment of the present invention.

FIG. 36 is a diagram showing a sequence of steps of a system operation according to the second embodiment. Operations of the DTE-a, the content server α, the middleman server β, the client management server Ka, and the routers Ra through Rc are specifically described in FIGS. 37 through 40 and 26, respectively. The client management servers Kb and Kc operate in the same way as the client management server Ka.

A description will be given, with reference to FIGS. 26 and 36 through 46D, of the system operation according to the second embodiment.

In step S21 of FIG. 36, the user selects conditions to be requested from the list of contents displayed on a web screen of the DTE-a, and the DTE-a transmits an IP packet including the conditions to the content server α. This operation corresponds to steps S20101 through S20102 of FIG. 37. The IP packet transmitted to the content server α is shown in FIG. 42A.

The conditions requested by the DTE-a are as follows:
Content name: Content A
Reservation start date and time: 2001/9/1, 10:00 a.m.

Figure 37:
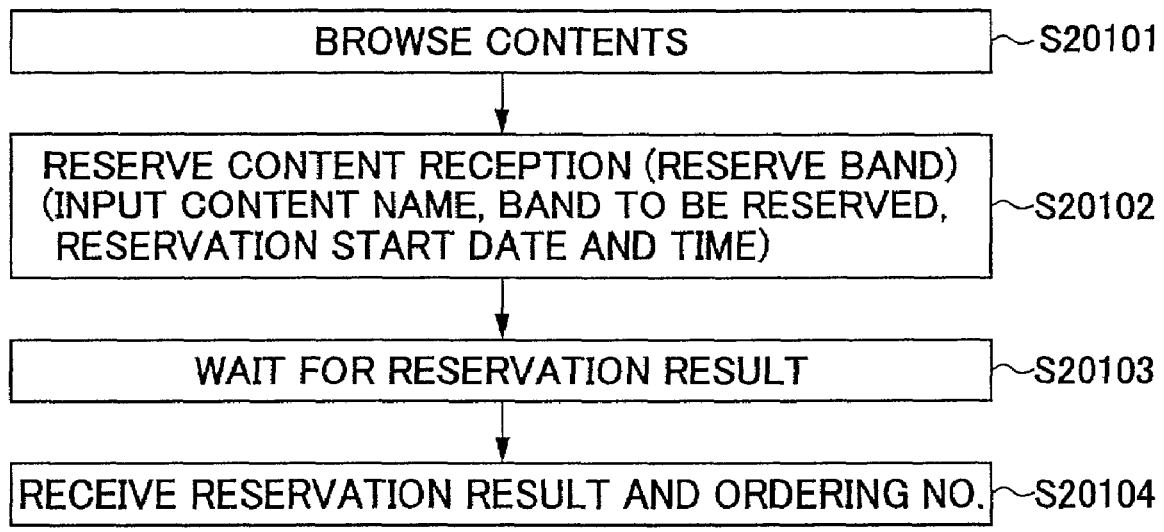
FIG. 37 is a flowchart of an operation of the user terminal according to the second embodiment.

Thereafter, the DTE-a waits for a band reservation result transmitted from the content server α (step S20103 of FIG. 37).

In step S22 of FIG. 36, when the content server α, which waits to receive data (step S20201 of FIG. 38), receives the IP packet (step S20202), the content server α identifies the transmitter of the IP packet (step S20203) and extracts from the IP packet its transmitter IP address and the requested conditions (content name and reservation start date and time) of the DTE-a (step S20204).

Thereafter, first, as shown in FIG. 42B, the content server α extracts the IP address of the middleman server β from the middleman address management table 13 (step S20205).

Then, the content server α assigns an ordering number "α1" to a group of the extracted data items (middleman server IP address, content name, transmitter IP address, and reservation start date and time), and records the data in the respective columns (ordering number, middleman IP address, content name, user IP address, and reservation start date and time) on the user policy storage table 15 (step S20206). FIG. 42C is a diagram showing the user policy storage table 15 recorded with the above-described data items.

Here, in order to reserve a data transfer route for the content A on the transmission line between the DTE-a and the content server α, the content server α, letting the data recorded in the column of user IP address of the user policy storage table 15 be a destination address, transmits an IP trace route shown in FIG. 42D to the DTE-a (step S20207).

In step S23 of FIG. 36, when the router Rc, which waits to receive data (step S10601 of FIG. 26), receives the IP trace route (step S10602), the router Rc identifies the transmitter of the IP trace route (step S10603) and transmits an ICMP message as shown in FIG. 43A to the content server α with the transmitter IP address of the IP trace route and the IP address of its port P12 being set as the destination IP address and the transmitter IP address of the ICMP message, respectively (step S10604).

Figure 38:
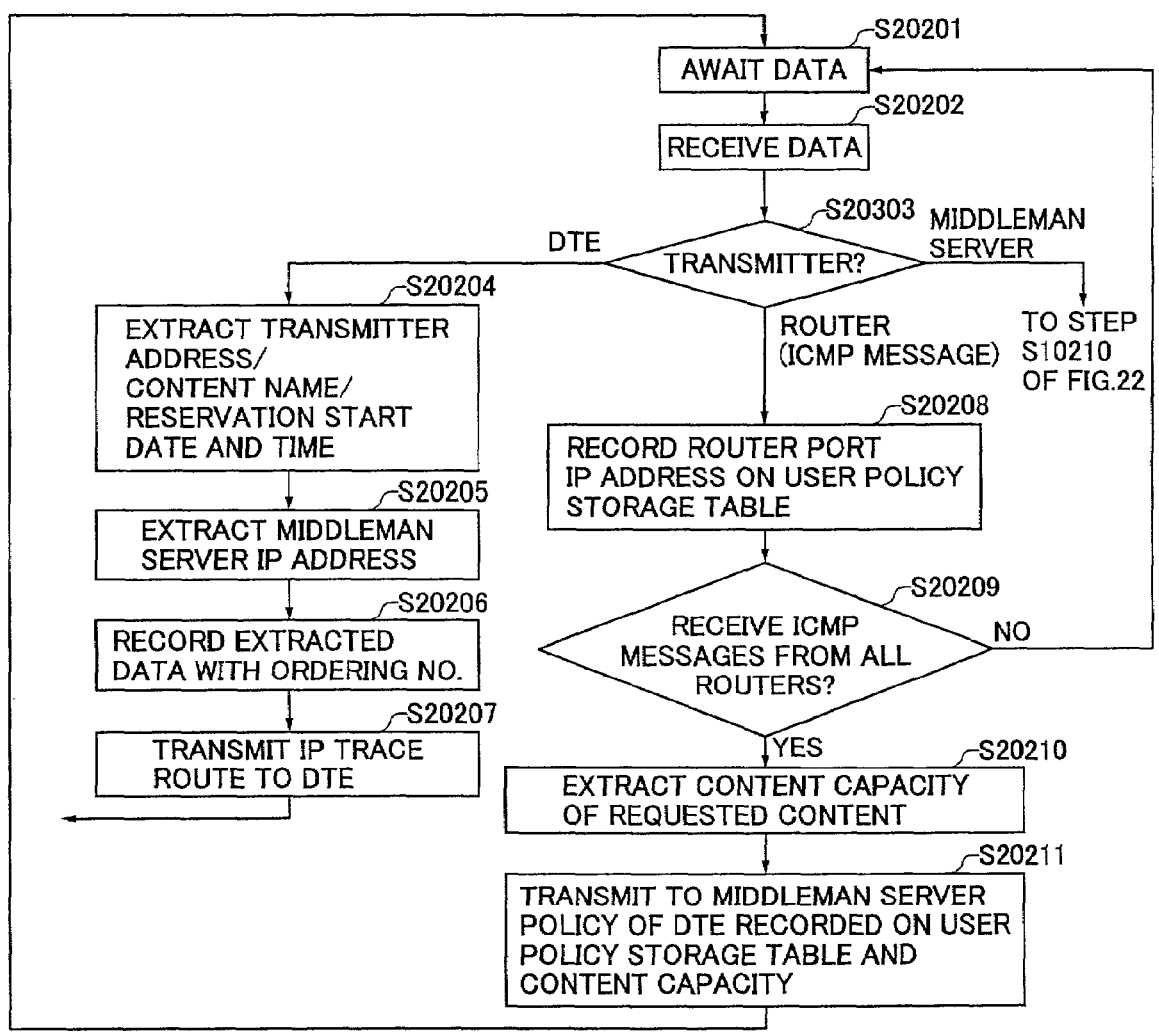
FIG. 38 is a flowchart of an operation of the content server according to the second embodiment.

In step S24 of FIG. 36, receiving the ICMP message from the router Rc, the content server α extracts the transmitter IP address from the ICMP message and records the transmitter IP address in the column of router port IP address on the user policy storage table (step S20208 of FIG. 38). FIG. 43B is a diagram showing the user policy storage table recorded with the transmitter IP address.

In step S25 of FIG. 36, the router Rc transmits the IP trace route to the router Rb as in step S22, and the router Rb, receiving the IP trace route, transmits an ICMP message to the content server α as in step S23. Thereafter, the router Ra operates in the same way as in steps S22 and S23 (steps S10601 through S10604 of FIG. 26). FIG. 43C is a diagram showing the ICMP message transmitted from the router Rb to the content server α, and FIG. 43D is a diagram showing the ICMP message transmitted from the router Ra to the content server α.

In step S26 of FIG. 36, receiving the ICMP messages from the routers Rb and Ra, the content server α extracts the transmitter IP addresses of the ICMP messages as in step S24, and records the extracted transmitter IP addresses in the column of router port IP address on the user policy storage table 15. FIG. 44A is a diagram showing the user policy storage table 15 recorded further with the transmitter IP addresses of the routers Rb and Ra. Thereafter, it is determined whether the content server α has received the ICMP messages from all the routers (the routers Ra through Rc in this case) on the transmission line between the DTE-a and the content server α (step S20209 of FIG. 38).

If it is determined in the negative in step S20209, the steps S20201 through S20203 and S20208 are repeated until the content server α receives the ICMP messages from all the routers Ra through Rc.

If it is determined in the affirmative in step S20209, in step S20210, the content server α searches the column of content name on the content information management table 14 for the requested content name (content A), and extracts a content capacity corresponding to the content name from the content information management table 14. Here, as shown in FIG. 44B, a content capacity of 57.6 Mbytes corresponding to the content A is extracted from the content information management table 14.

Then, the content server α, letting the data corresponding to the ordering number α1 in the column of middleman server IP address of the user policy storage table 15 be a destination IP address, transmits to the middleman server β an IP packet including the content capacity and the policy items (ordering number, user IP address, reservation start date and time, and router port IP addresses (input side)) of the ordering number α1 (step S20211). The IP packet includes information indicated by hatching in FIG. 44C as data. FIG. 44D is a diagram showing the IP packet.

In step S27 of FIG. 36, when the middleman server β, which waits to receive data (step S20301 of FIG. 39), receives the IP packet (step S20302), the middleman server β identifies the transmitter of the IP packet (step S20303) and extracts from the IP packet its transmitter IP address, the content capacity, and the policy items (ordering number, user IP address, reservation start date and time, and router port IP addresses) of the user policy of the ordering number α1 (step S20307).

Thereafter, first, the middleman server β searches the column of network address on the contractor ISP management table 23 for network addresses (network addresses of the ISP-a through ISP-c) corresponding to the extracted router port IP addresses (addresses of the input ports P3, P8, and P12 of the routers Ra, Rb, and Rc) (step S20308), and extracts data corresponding to the extracted network addresses from the column of policy server IP address of the contractor ISP management table 23 as shown in FIG. 45A (step S20309). That is, the middleman server β extracts the IP addresses of the policy servers Pa through Pc.

Then, in step S20310, it is determined whether the middleman server β has extracted the IP addresses of the policy servers Pa through Pc. If it is determined in the negative in step S10308, the operation goes to step S10312 of FIG. 23.

If it is determined in the affirmative in step S20310, the middleman server β assigns an order reception number "β1" to the extracted IP address of the policy server Pc, and records the order reception number β1 and the IP address of the policy server Pc in the columns of order reception number and policy server IP address on the ISP policy table 24. Further, with respect to the policy server Pc, the middleman server β records the extracted policy items (transmitter IP address, user IP address, reservation start date and time, and router port IP address) in their respective columns (content server IP address, user IP address, reservation start date and time, and router port IP address) on the ISP policy table 24 so that the items are correlated with the ordering number β1 (that is, the items are recorded in a row corresponding to the ordering number β1 in the columns on the ISP policy table 24).

Thereafter, the middleman server β successively performs the same operation with respect to each of the policy servers Pb and Pa, and records the extracted data on the ISP policy table 24 as shown in FIG. 45B. The policy servers Pb and Pa are assigned order reception numbers "β2" and "β3", respectively.

Further, the middleman server β records the extracted data items (transmitter IP address and ordering number) in the columns of content server IP address and ordering number on the policy reservation determination management table 25, respectively, and as shown in FIG. 45C, records a pair of the data of order reception number and policy server IP address of each of the policy servers Pa through Pc in the columns of order reception number and policy server IP address on the policy reservation determination management table 25 so that each pair of the data is correlated with the IP address "136.10.0.1" of the content server α in the column of the content server IP address (step S20311).

Then, the middleman server β searches the column of network address on the contractor ISP management table 23 for a network address corresponding to the extracted policy item of user IP address of the ordering number α1 (step S20312). That is, the middleman server β searches for the network address of the ISP-a that the user (DTE-a) contracts. Thereafter, the middleman server β extracts a client management server IP address corresponding to the searched-out network address from the contractor ISP management table 23 as shown in FIG. 45D (step S20313). In this case, the middleman server β extracts the IP address of the client management server Ka. Then, the middleman server β, letting the extracted client management server IP address be a destination address, transmits an IP packet including an inquiry about a band (value) used for the connection of the DTE-a to the ISP-a to the client management server Ka with the ordering number α1 and the user IP address (step S20314). FIG. 45E is a diagram showing the IP packet.

In step S28 of FIG. 36, when the client management server Ka, which waits to receive data (step S20401 of FIG. 40), receives the IP packet from the middleman server β (step S20402), the client management server Ka identifies the transmitter of the IP packet (step S20403) and extracts the user IP address from the IP packet. Then, the client management server Ka searches the column of user IP address on the client management table 51 for data corresponding to the extracted user IP address. The client management server Ka extracts data corresponding to the searched-out user IP address in the column of band used for connection (connection band (value)) of the client management table 51 as shown in FIG. 46A (step S20405).

Then, the client management server Ka transmits to the middleman server β an IP packet including data of the connection band value of "64 Kbps", which is a response to the inquiry of the ordering number α1 (step S20406). FIG. 46B is a diagram showing the IP packet.

If the client management server Ka receives an IP packet (data) from other components of the network than the middleman server β in step S20402, the client management server Ka identifies the transmitter of the IP packet in step S20403 and operates in accordance with the received IP packet in step S20404.

Figure 39:
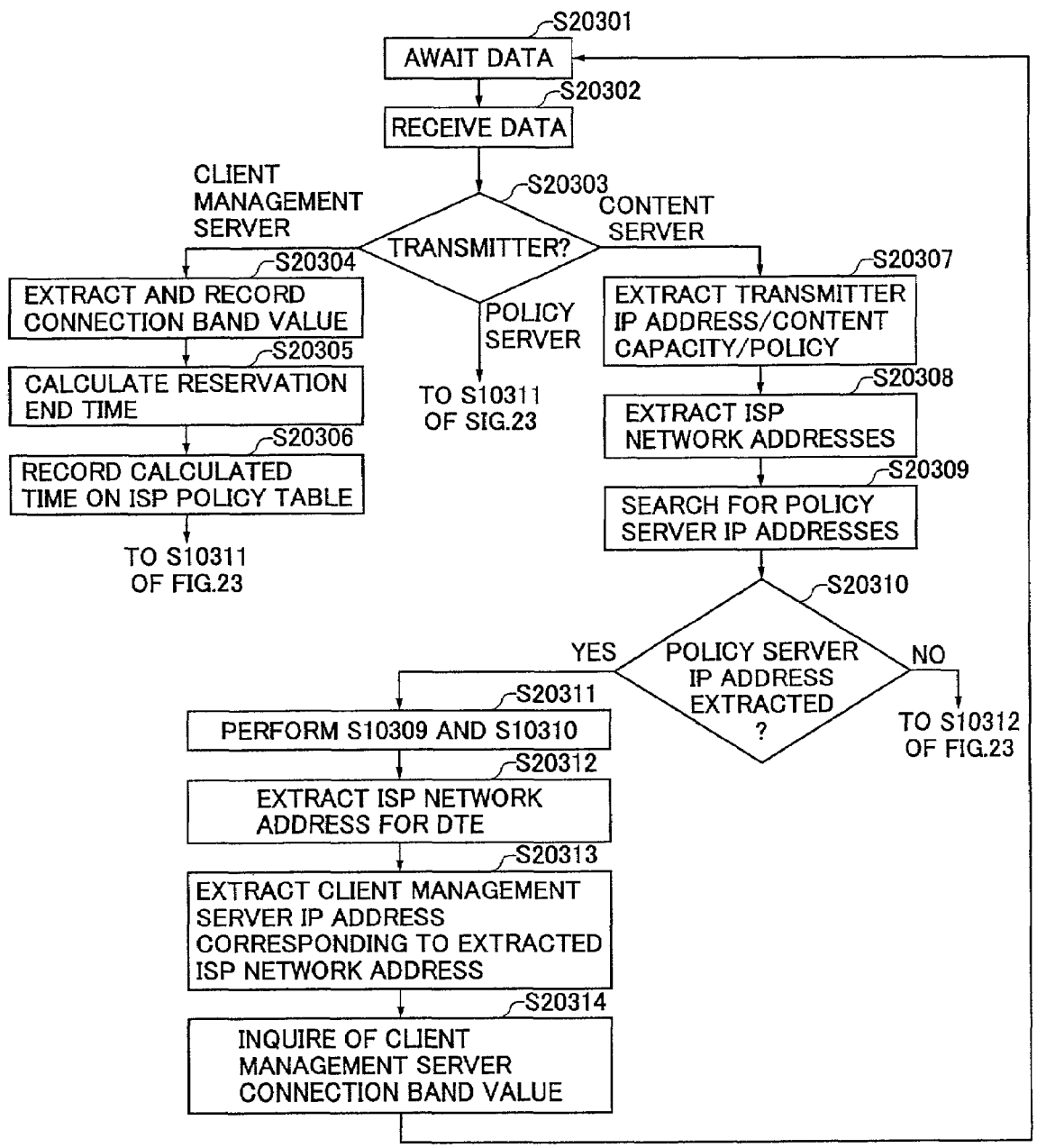
FIG. 39 is a flowchart of an operation of the middleman server according to the second embodiment.
Figure 40:
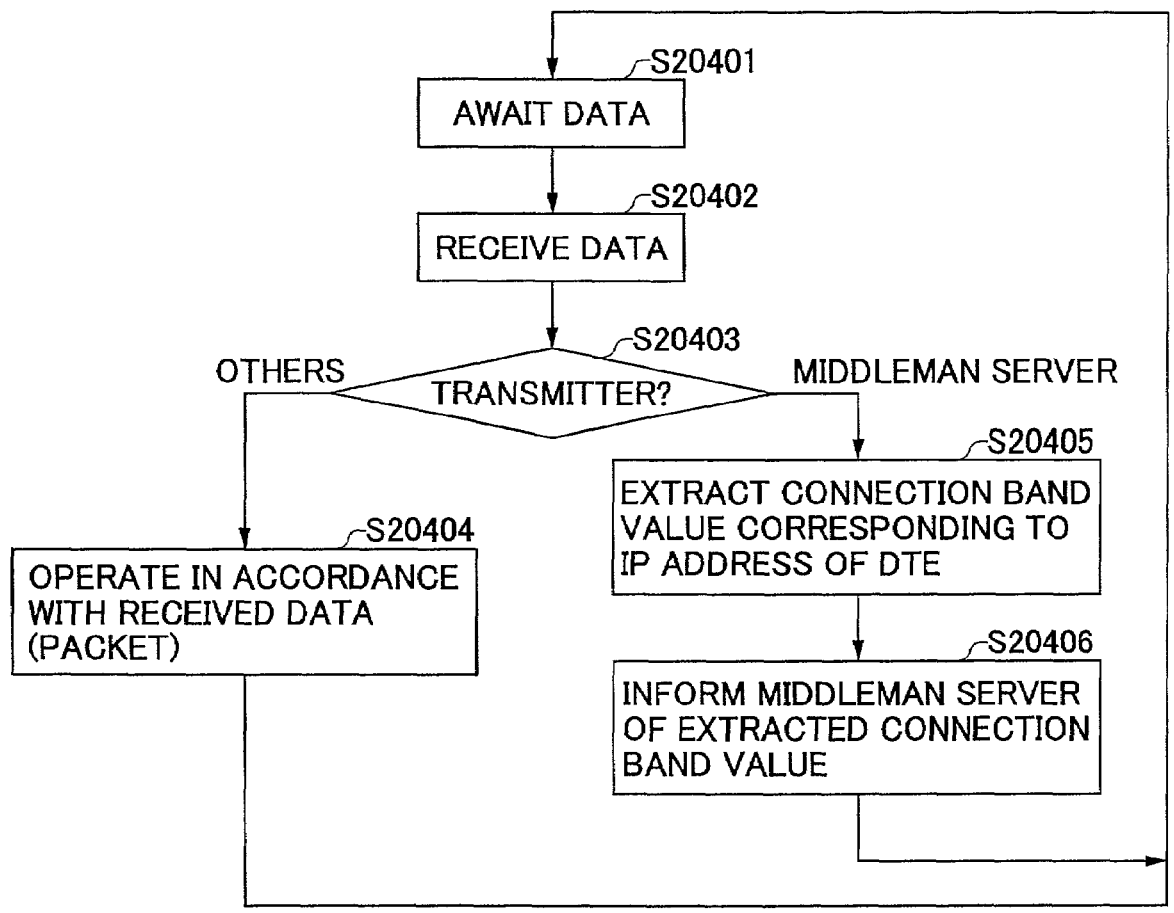
FIG. 40 is a flowchart of an operation of the client management server according to the second embodiment.
Figure 48:
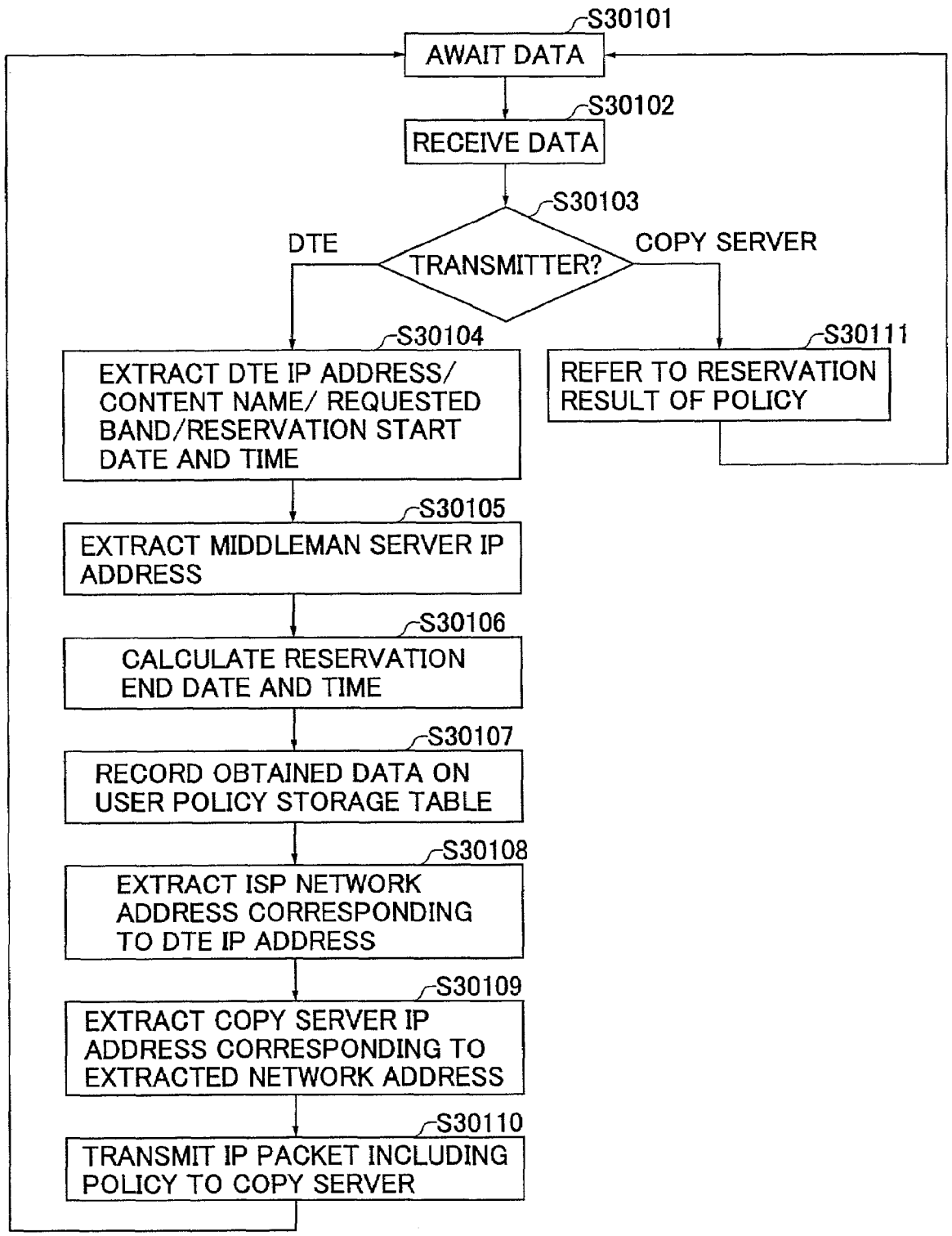
FIG. 48 is a flowchart of an operation of the content server according to the third embodiment.
Figure 49:
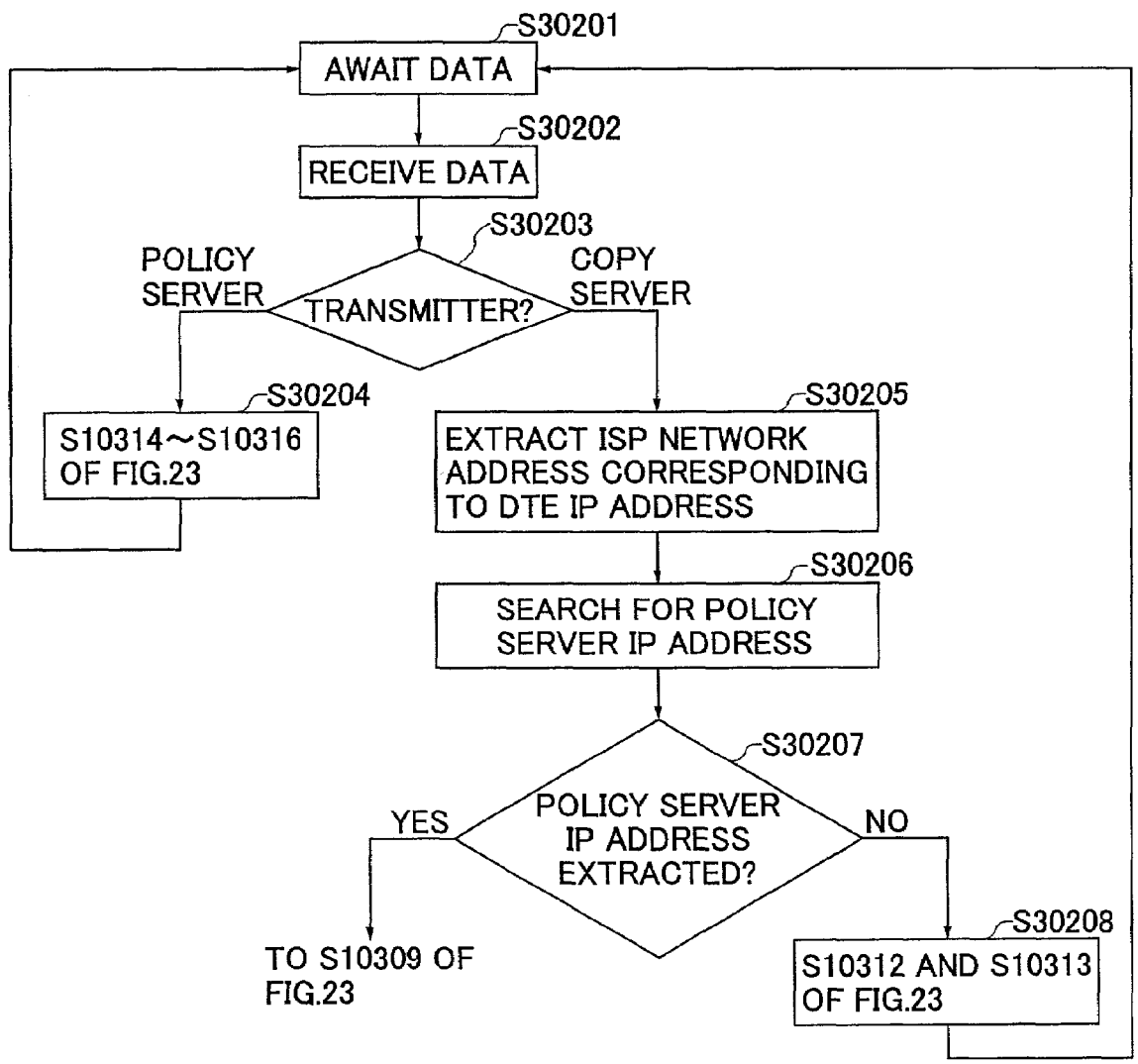
FIG. 49 is a flowchart of an operation of the middleman server according to the third embodiment.

In step S29 of FIG. 36, receiving the IP packet from the client management server Ka, the middleman server β extracts the connection band value of 64 Kbps from the IP packet and records the extracted value in the column of requested band on the ISP policy table 24 so that the extracted value is correlated with each of the order reception numbers β1 through β3 corresponding to the ordering number α1 (step S20304 of FIG. 39). That is, the extracted value is recorded in rows in the column of requested band which rows correspond to the order reception numbers β1 through β3 on the ISP policy table 24.

Further, the middleman server β calculates a reservation end date and time based on the extracted value of 64 Kbps and the previously extracted content capacity (step S20305), and records the reservation end date and time in the column of reservation end date and time on the ISP policy table 24 so that the reservation end date and time is correlated with each of the order reception numbers β1 through β3 corresponding to the ordering number β1 (step S20306). As shown in FIG. 46C(a), since the content A of 57.6 Mbytes in size is to be transmitted at a transmission rate of 64 Kbps, 7200 seconds are required to transmit the content A. Therefore, by adding 7200 seconds to the reservation start date and time of 2001/ 9/1, 10:00 a.m. as shown in FIG. 46C(b), the reservation end date and time is calculated at 2001/9/1, 12:00 p.m. as shown in FIG. 46C(c). FIG. 46D is a diagram showing the ISP policy table 24 on which the requested band and the calculated reservation end date and time are recorded so as to be correlated with each of the order reception numbers β1 through β3.

In step S30 of FIG. 36, the same operations as in steps S7 through S15 of FIG. 19 are performed.

[Third Embodiment]

In the third embodiment, a content server (content provider), in distributing its content to a user terminal (user) via the Internet, in order to cause an ISP nearest the user terminal to distribute the content to the user terminal, selects the ISP and transmits to a copy server of the ISP the IP address of the user terminal, the IP addresses of the ports of all routers between the user terminal and the copy server, and a desired band value to be reserved (a requested band) on a transmission line between the user terminal and the copy server so that the copy server can reserve the requested band.

(1) Precondition

In the network structure of FIG. 13A, a variety of data is set in each of the following network components. Here, a band of "128 Kbps" is reserved in advance on a transmission line between the DTE-b and DTE-c for a period of 10:00 to 12:00 on 2001/9/1.

Next, a description will be given of the tables set in the content server α, the middleman server β, and the policy servers Pa through Pc, the copy servers Sa through Sc, and the routers Ra through Rd of the ISP-a through ISP-c.

(A) The content server α includes the middleman address management table 13, the content information management table 14, the user policy storage table 15, and the copy content management table 17. The middleman address management table 13, the content information management table 14, and the user policy storage table 15 are equal to those described in the first embodiment. The copy content management table 17 manages the network addresses of the ISP-a through ISP-c and the IP addresses of the copy servers Sa through Sc so that the contents of the user policy storage table 15 can be transmitted to the copy servers Sa through Sc storing copies of contents (copy contents) distributed in advance from the content server α under contracts with the ISP-a through ISP-c. FIG. 51A is a diagram showing the copy content management table 17 for a content A according to this embodiment.

(B) The middleman server β includes the contractor ISP management table 23, the ISP policy table 24, and the policy reservation determination management table 25 that are equal to those described in the first embodiment.

(C) Each of the policy servers Pa through Pc of the ISP-a through ISP-c includes the output side port band management table 31, the executed policy management table 32, and the router management table 33 that are equal to those described in the first embodiment.

(D) Each of the copy servers Sa through Sc of the ISP-a through ISP-c includes the user policy storage table 61. As shown in FIG. 51B, the user policy storage table 61 is recorded with the contents of the user policy storage table 15 transmitted from the content server α so as to store a band reservation request from a user and manage the band reservation request by a serial ordering number for the content server α.

The copy servers Sa through Sc each include the IP address of the content server α based on the contracts between the ISP-a through ISP-c and the content server α.

Each of the routers Ra through Rd of the ISP-a through ISP-c has given routing information, and routing is performed based on the routing information.

(2) System Operation

FIG. 47 is a diagram showing a sequence of steps of a system operation according to the third embodiment. Operations of the DTE-a, the content server α, the middleman server β, the copy server Sa, and the router Ra are specifically described in FIGS. 21, 48 through 50, and 26, respectively. The copy servers Sb and Sc operate in the same way as the copy server Sa.

A description will be given, with reference to FIGS. 21, 26, and 47 through 54E, of the system operation according to the third embodiment.

In step S31 of FIG. 47, the user selects conditions to be requested from the list of contents displayed on a web screen of the DTE-a, and the DTE-a transmits an IP packet including the conditions to the content server α. This operation corresponds to steps S10101 through S10102 of FIG. 21. The IP packet transmitted to the content server α is shown in FIG. 52.

The conditions requested by the DTE-a are as follows:
Content name: Content A
Desired band value to be reserved (requested band): 64 Kbps
Reservation start date and time: 2001/9/1, 10:00 a.m.

Thereafter, the DTE-a waits for a band reservation result transmitted from the content server α (step S10103 of FIG. 21).

In step S32 of FIG. 47, when the content server α, which waits to receive data (step S30101 of FIG. 48), receives the IP packet (step S30102), the content server α identifies the transmitter of the IP packet (step S30103) and extracts from the IP packet its transmitter IP address and the requested conditions (content name, requested band, and reservation start date and time) of the DTE-a (step S30104).

Thereafter, first, as shown in FIG. 53A, the content server α extracts the IP address of the middleman server β from the middleman address management table 13, and records the extracted middleman server IP address in the column of middleman server IP address on the user policy storage table 15 (step S30105).

Next, as shown in FIG. 53B, the content server α searches the content information management table 14 for the content name (content A) specified by the DTE-a. Then, the content server α calculates a reservation (transmission) end date and time from a content capacity for the content name, and records the calculated reservation end date and time in the column of reservation end date and time on the user policy storage table 15 (step S30106). As shown in FIG. 53C(a), since the content A of 57.6 Mbytes in size is to be transmitted at a transmission rate of 64 Kbps, 7200 seconds are required to transmit the content A. Therefore, by adding 7200 seconds to the reservation start date and time of 2001/9/1, 10:00 a.m. as shown in FIG. 53C(b), the reservation end date and time is calculated at 2001/9/1, 12:00 p.m. as shown in FIG. 53C(c).

Further, as shown in FIG. 53D, the content server α assigns an ordering number "α1" to a group of the obtained data items (middleman server IP address, content name, transmitter IP address, requested band, reservation start date and time, and calculated reservation end date and time), and records the data items in the respective columns (ordering number, middleman IP address, content name, user IP address, requested band, reservation start date and time, and reservation end date and time) on the user policy storage table 15 (step S30107).

Next, the content server α searches the column of network address on the copy content management table 17 for a network address corresponding to the extracted user IP address as shown in FIG. 53E (S30108). Then, the content server α extracts data corresponding to the searched-out network address from the column of copy server IP address on the copy content management table 17 (S30109). That is, in this case, the content server α extracts the IP address of the copy server Sa.

Here, letting the extracted copy server IP address be a destination address, the content server α transmits to the copy server Sa the policy items (ordering number, middleman server IP address, content name, user IP address, requested band, reservation start date and time, and reservation end date and time) of the ordering number α1 (step S30110). FIG. 53F is a diagram showing the IP packet.

In step S33 of FIG. 47, when the copy server Sa, which waits to receive data (step S30301 of FIG. 50), receives the IP packet from the content server α (step S30302), the copy server Sa identifies the transmitter of the IP packet (step S30303) and extracts the policy of the ordering number α1 from the IP packet (step S30304). Then, the copy server Sa records the extracted policy items in the corresponding columns (ordering number, middleman server IP address, content name, user IP address, requested band, reservation start date and time, and reservation end date and time) on the user policy storage table 61 (step S30305). FIG. 54A is a diagram showing the user policy storage table 61 recorded with the policy of the ordering number α1.

Here, in order to reserve a data transfer route for the content A on the transmission line between the DTE-a and the copy server Sa, the copy server Sa, letting the recorded user IP address be a destination address, transmits an IP trace route shown in FIG. 54B to the DTE-a (step S30306).

In step S34 of FIG. 47, when the router Ra, which waits to receive data (step S10601 of FIG. 26), receives the IP trace route (step S10602), the router Ra identifies the transmitter of the IP trace route (step S10603) and transmits an ICMP message as shown in FIG. 54C to the copy server Sa with the transmitter IP address of the IP trace route and the IP address of its port P4 being set as the destination IP address and the transmitter IP address of the ICMP message, respectively (step S10604)

Figure 50:
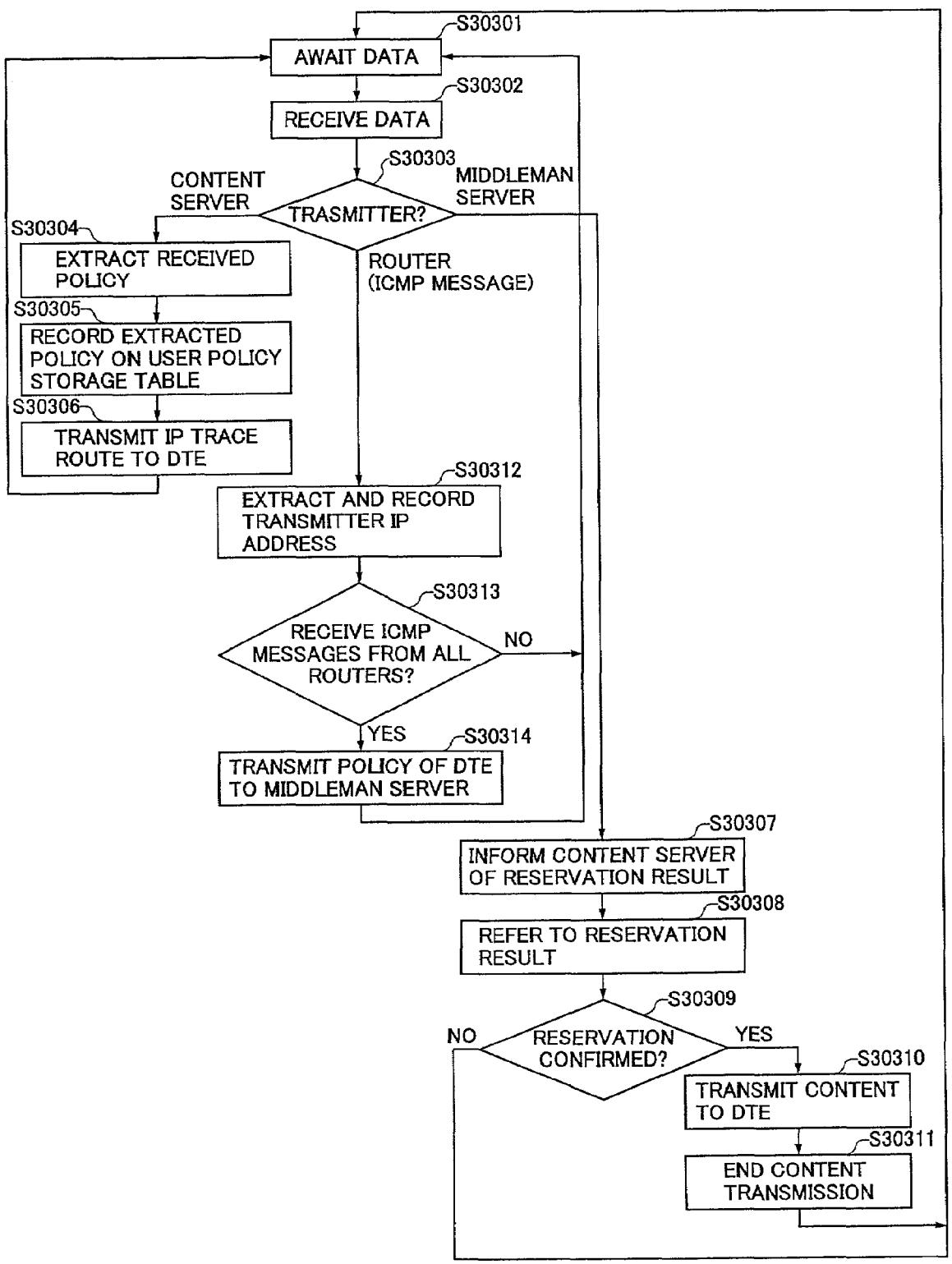
FIG. 50 is a flowchart of an operation of the copy server according to the third embodiment.

In step S35 of FIG. 47, receiving the ICMP message from the router Ra, the copy server Sa extracts the transmitter IP address from the ICMP message, and records the extracted transmitter IP address in the column of router port IP address on the user policy storage table 61 as shown in FIG. 54D (step S30312 of FIG. 50).

Thereafter, it is determined whether the copy server Sa has received the ICMP messages from all the routers (in this embodiment, the router Ra) between the DTE-a and the copy server Sa (step S30313).

If it is determined in the negative in step S30313, the operation goes back to step S30301, and steps S30301 through S30303 and S30312 are repeated until the copy server Sa receives the ICMP messages from all the routers.

Then, the copy server Sa, letting the data corresponding to the ordering number α1 in the column of middleman server IP address of the user policy storage table 61 be a destination IP address, transmits to the middleman server β an IP packet including the items of the user policy (ordering number, user IP address, requested band, reservation start date and time, reservation end date and time, and router port IP addresses (input side)) of the ordering number α1 (step S30314).

In step S36 of FIG. 47, the middleman server β, the policy server Pa, and the router Ra basically perform the same operations as in steps S7 through S14 of FIG. 19 in the first embodiment. That is, when the middleman server β, which waits to receive data (step S30201 of FIG. 49), receives the IP packet from the copy server Sa (step S30202), identifies the transmitter of the IP packet (step S30203) and extracts the transmitter IP address and the policy items of the ordering number α1 from the IP packet. Then, the middleman server β searches the column of network address on the contractor ISP management table 23 for data corresponding to the user IP address (step S30205). In this case, the middleman server β extracts the network address of the ISP-a. Then, the middleman server β searches the contractor ISP management table 23 for a policy server IP address corresponding to the extracted network address (step S30206). Thereafter, it is determined whether the middleman server β has extracted the IP address of the policy server Pa (step S30207). If it is determined in the negative in step S30207, the middleman server β performs the same operations as in steps S10312 and S10313 of FIG. 23 with respect to the policy server Pa. Thereafter, the operation goes back to step S30201.

Figure 23:
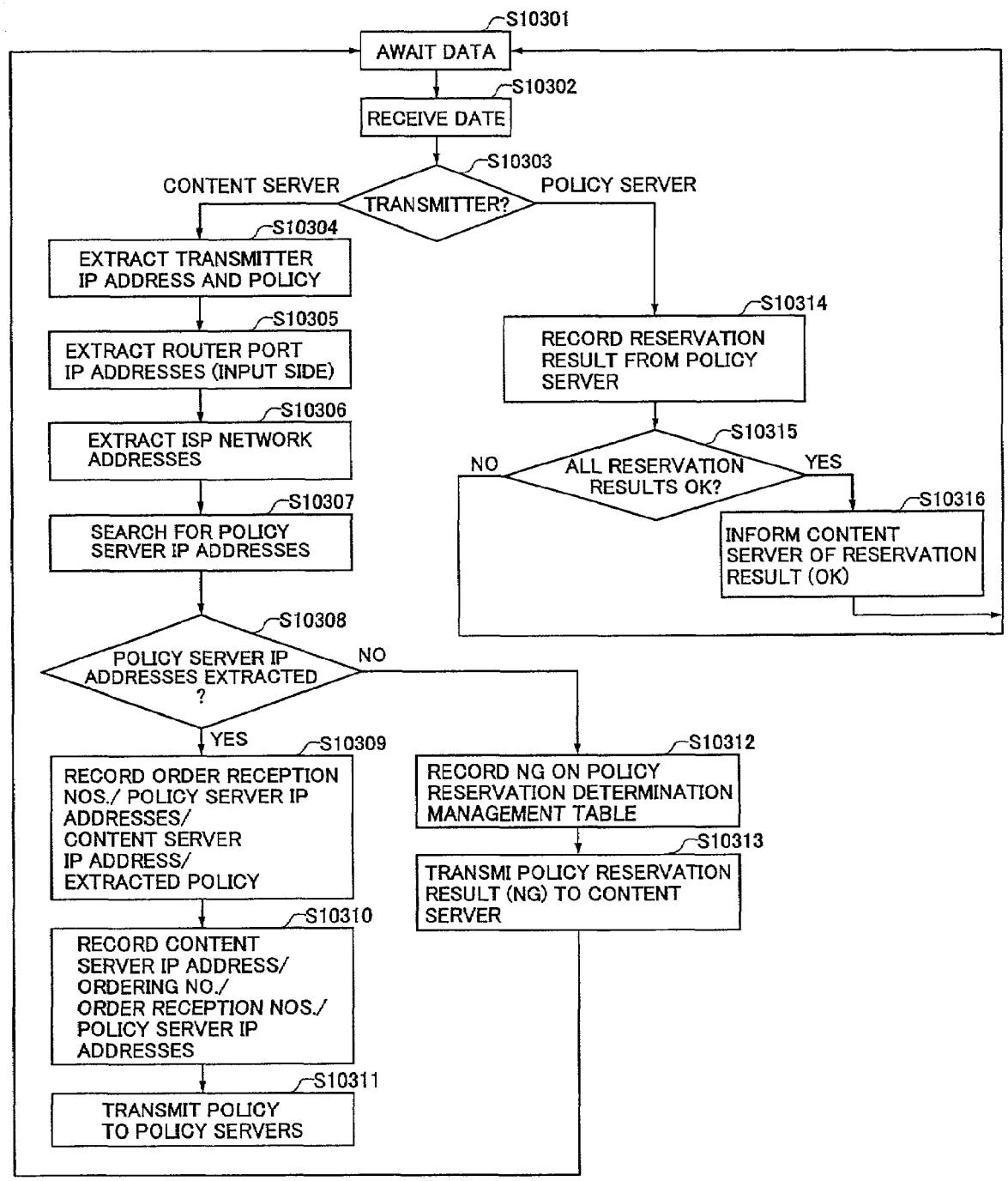
FIG. 23 is a flowchart of an operation of the middleman server according to the first embodiment.

If it is determined in the affirmative in step S30207, the operation goes to step S10309 of FIG. 23, and the middleman server β performs the same operations as in steps S10309 through S10311 with respect to the policy server Pa (step S30208).

Thereafter, the policy server Pa and the router Ra performs the same operations as in the first embodiment, and finally, the policy server Pa transmits an IP packet including a reservation result (OK or NG) to the middleman server β.

Receiving the IP packet from the policy server Pa, the middleman server performs the same operations as in steps S10314 through S10316 of FIG. 23, and transmits to the copy server Sa an IP packet including a general determination result (OK or NG) for the ordering number α1.

In step S37 of FIG. 47, receiving the IP packet including from the middleman server β, the copy server Sa transmits an IP packet including the general determination result to the content server α (step S30307 of FIG. 50). Here, if the general determination result is "○ (OK)", the IP packet includes a message notifying the content server α of the completion of the reservation of the policy of the ordering number α1. FIG. 54E is a diagram showing the IP packet.

Then, the copy server Sa refers to the general determination result (reservation result) (step S30308), and determines whether the reservation of the policy (requested band) is confirmed (step S30309). If the reservation is confirmed, the copy server Sa starts transmitting the content A to the DTE-a with the reserved band for the reserved period of time (step S30310). When the reservation end (date and) time comes, the copy server Sa ends the transmission of the content A (step S30311).

In step S38 of FIG. 47, receiving the IP packet from the copy server Sa, the content server α stores the received packet (data) and refers to the general determination result (reservation result) (step S30111).

[Fourth Embodiment]

In the fourth embodiment, a middleman server, while a content server (content provider) distributes a reserved content to a user terminal (user) at a reserved band value of 64 Kbps via the Internet, releases the reserved band value with the user informing the content server of an ordering number for the reservation of the content so as to cancel the reservation in the middle of communication (data distribution) at the request of the user terminal.

(1) Precondition

In the network structure of FIG. 13A, a variety of data is set in each of the following network components.

First, a band of "128 Kbps" is reserved in advance on a transmission line between the DTE-b and DTE-c for a period of 10:00 to 12:00 on 2001/9/1.

Further, for a content A provided by the content provider α, the DTE-a reserves a band of "64 Kbps" on a transmission line between the DTE-a and the content server α for a period of 10:00 to 12:00 on 2001/9/1, and the content A is being distributed on the web screen of the DTE-a.

Here, a description will be given of the tables set in the content server α, the middleman server β, and the policy servers Pa through Pc and the routers Ra through Rd of the ISP-a through ISP-c.

(A) The content server α includes the middleman address management table 13, the content information management table 14, and the user policy storage table 15 that are equal to those described in the first embodiment.

(B) The middleman server β includes the contractor ISP management table 23, the ISP policy table 24, and the policy reservation determination management table 25 that are equal to those described in the first embodiment.

(C) Each of the policy servers Pa through Pc of the ISP-a through ISP-c includes the output side port band management table 31, the executed policy management table 32, and the router management table 33 that are equal to those described in the first embodiment.

The output side port band management table 31 of the policy server Pa manages the bands of the output side ports P1 and P2 of its subordinate router Ra as shown in FIG. 62A. The output side port band management table 31 of the policy server Pb manages the bands of the output side ports P5 and P6 of its subordinate router Rb as shown in FIG. 62B. The output side port band management table 31 of the policy server Pc manages the bands of the output side ports P10 and P11 of its subordinate router Rc and the output side ports P14 and P16 of its subordinate router Rd as shown in FIG. 62C.

The executed policy management tables 32 of the policy servers Pa through Pc manage policies executed by their respective subordinate routers Ra through Rd by a series of ordering numbers. FIGS. 63A through 63C are diagrams showing the executed policy management tables 32 of the policy servers Pa through Pc according to this embodiment, respectively.

Each of the routers Ra through Rd of the ISP-a through ISP-c has given routing information, and routing is performed based on the routing information.

(2) System Operation

Figure 55:
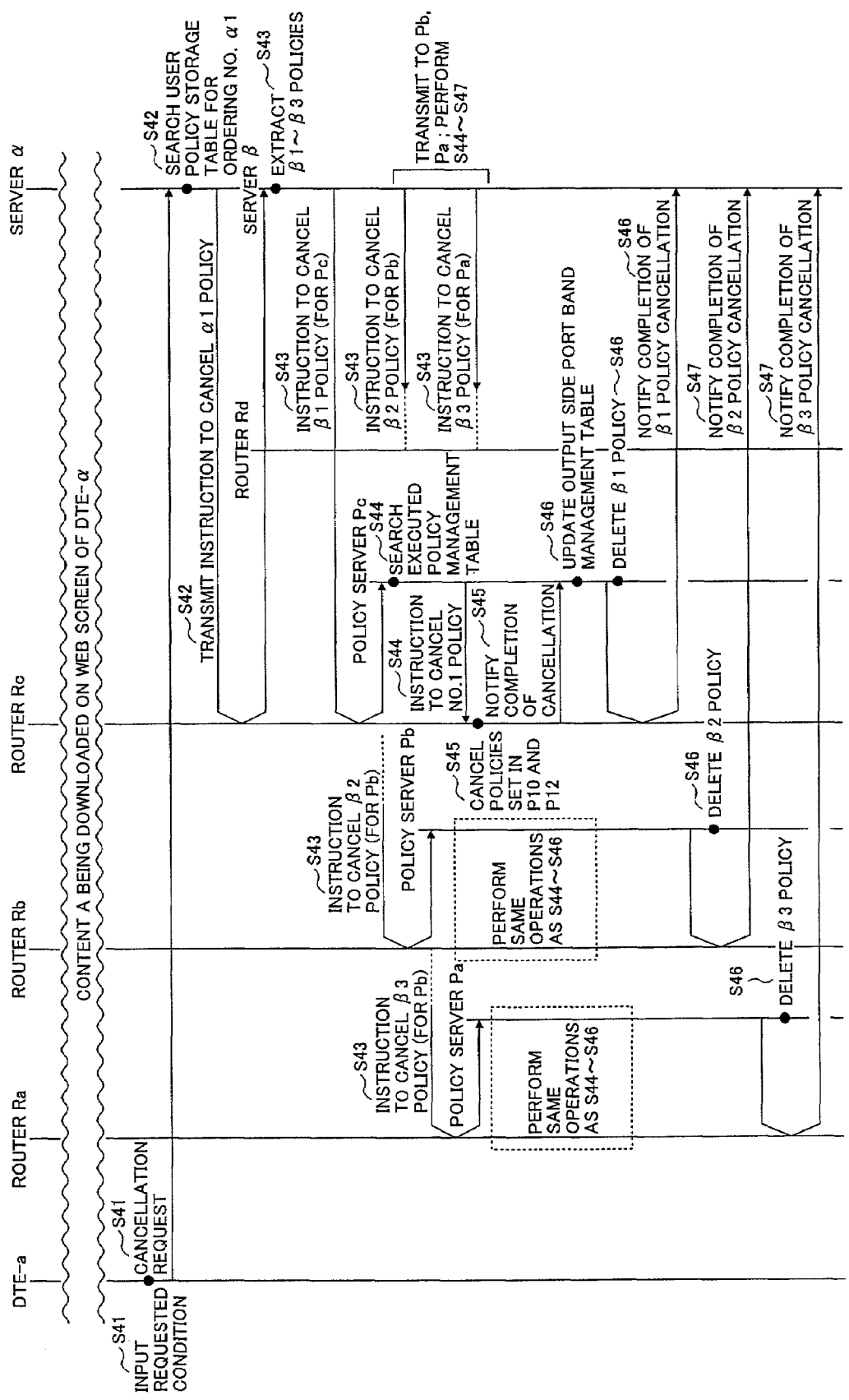
FIGS. 55 and 56 are diagrams showing a sequence of steps of a system operation according to a fourth embodiment of the present invention.
Figure 56:
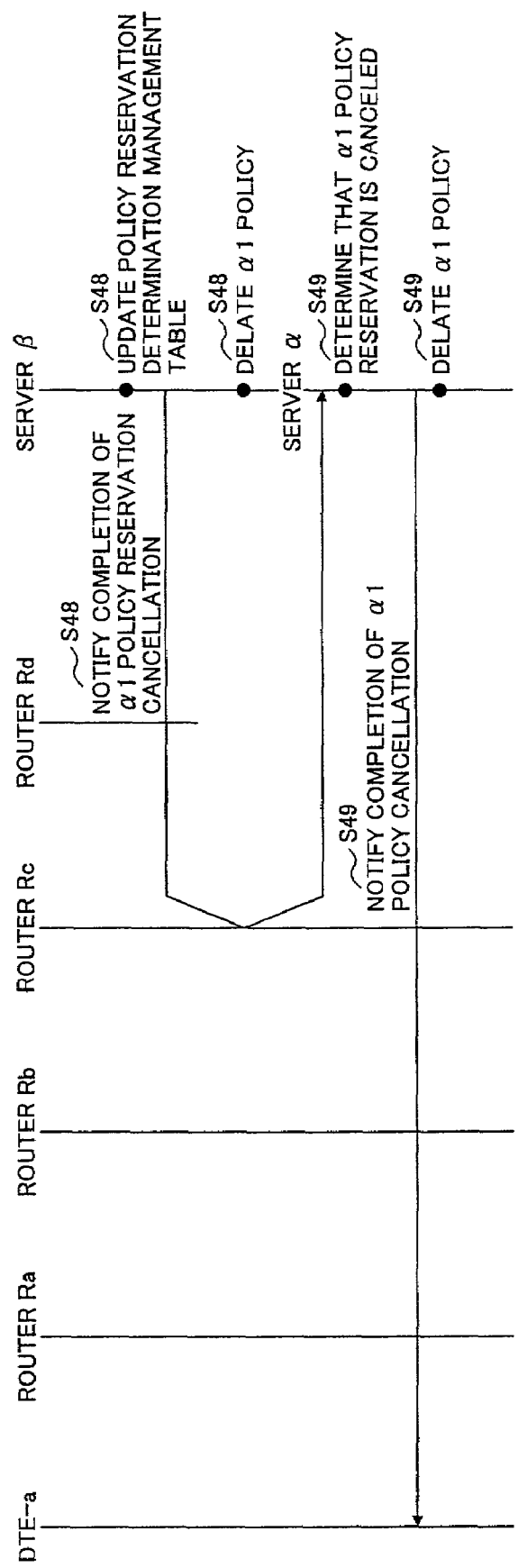

FIGS. 55 and 56 are diagrams showing a sequence of steps of a system operation according to the fourth embodiment. FIGS. 57 through 61 are flowcharts of operations of the DTE-a, the content server α, the middleman server β, the policy servers Pa through Pc, and the routers Ra through Rd, respectively.

A description will be given, with reference to FIGS. 55 through 69B, of the system operation according to the fourth embodiment.

Figure 57:
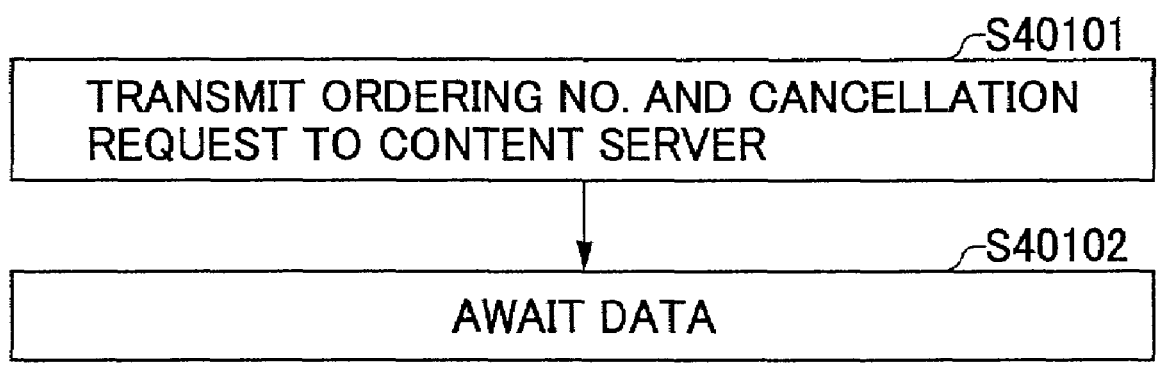
FIG. 57 is a flowchart of an operation of the user terminal according to the fourth embodiment.
Figure 58:
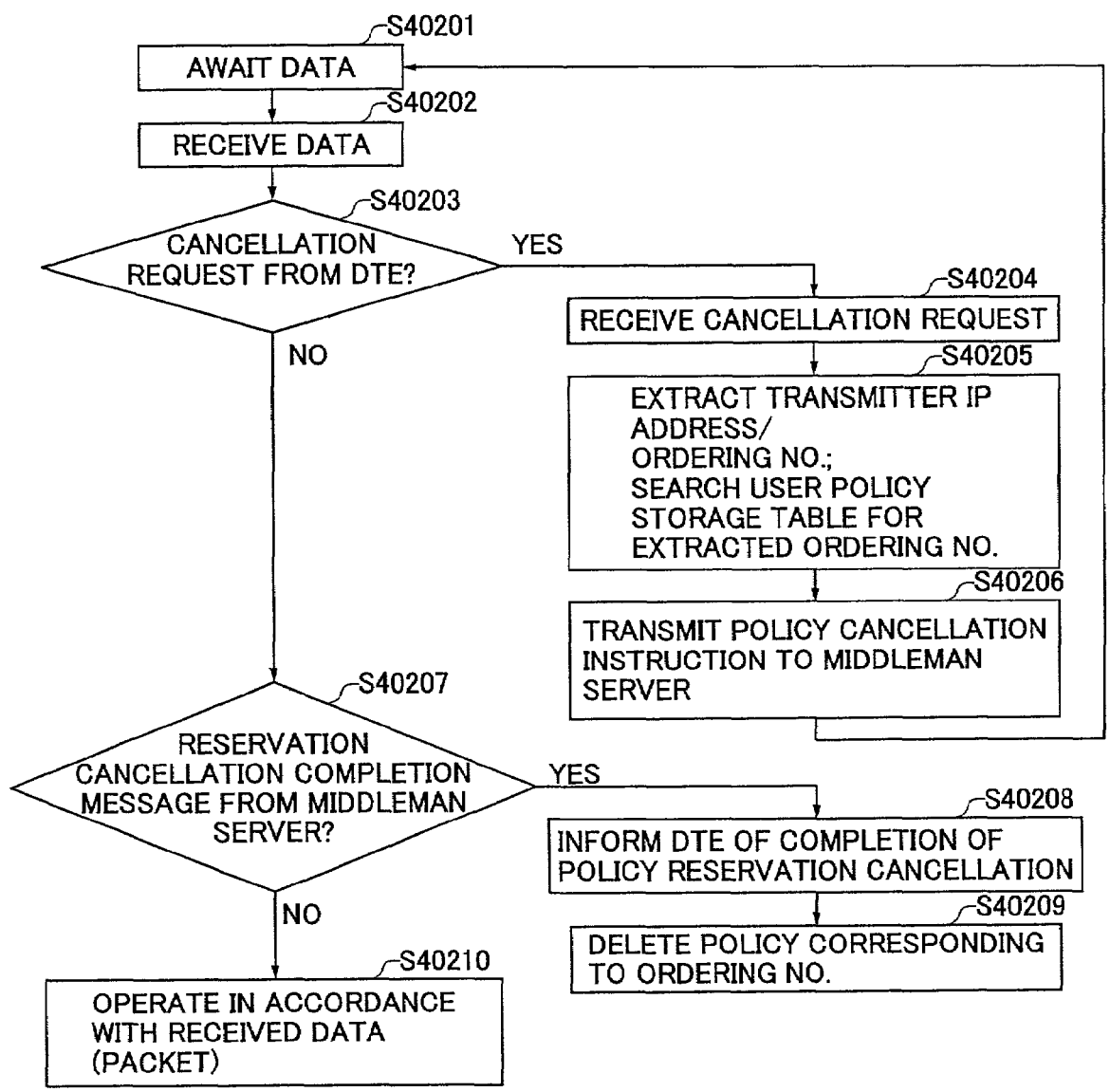
FIG. 58 is a flowchart of an operation of the content server according to the fourth embodiment.

In step S41 of FIG. 55, the DTE-a, for its own reason, transmits to the content server α an IP packet in which a condition to be requested is set on the web screen (step S40101 of FIG. 57). FIG. 64A is a diagram showing the IP packet.

The condition requested by the DTE-a is as follows:

Cancellation of ordering number α1

Thereafter, the DTE-a waits to receive data from the content server α (step S40102).

In step S42 of FIG. 55, when the content server α, which waits to receive data (step S40201), receives the IP packet (step S40202), the content server α determines whether the IP packet includes a request from the DTE-a for canceling the reservation or transmission of the content A (a cancellation request from the DTE-a) (step S40203). If the IP packet includes such a request, it is determined in step S40204 that the content server α has received the cancellation request from the DTE-a. Then, the content server α extracts the transmitter IP address and the ordering number α1 from the IP packet, and searches the column of ordering number on the user policy storage table 15 for data matching the ordering number α1 as shown in FIG. 64B (step S40205).

Since the user policy storage table 15 is recorded with data matching the ordering number α1, the content server α transmits to the middleman server β an IP packet including an instruction to cancel the policy of the ordering number α1 (a policy cancellation instruction), letting the data corresponding to the ordering number α1 in the column of middleman server IP address of the user policy storage table 15 be the destination IP address of the IP packet (step S40206).

In step S43 of FIG. 55, when the middleman server β, which waits to receive data (step S40301 of FIG. 59), receives the IP packet (step S40302), the middleman server β determines whether the IP packet is a policy cancellation instruction from the content server α (step S40303).

If the middleman server β determines in step S40303 that the IP packet is the policy cancellation instruction, the middleman server β extracts the transmitter IP address and the ordering number (α1) from the IP packet, and searches the columns of content server IP address and ordering number on the policy reservation determination management table 25 for data matching the extracted transmitter IP address and ordering number. Then, the middleman server extracts data in the column of policy server IP address which data corresponds to both extracted transmitter IP address and ordering number as shown in FIG. 65A (step S40306). That is, the middleman server β extracts the IP addresses of the policy servers Pa through Pc.

Here, the middleman server β, letting the policy server IP addresses be destination IP addresses, transmits to the policy servers Pa through Pc IP packets including instructions to cancel the policies of the order reception numbers β3, β2, and β1, respectively (step S40307). FIGS. 65B through 65C are diagrams showing the IP packets to the policy servers Pc, Pb, and Pa, respectively.

In step S44 of FIG. 55, the policy server Pc, which waits to receive data (step S40401 of FIG. 60), receives the IP packet (step S40402), the policy server Pc determines whether the IP packet is an instruction to cancel the policy of the order reception number β1 from the middleman server β (step S40403). If the policy server Pc determines in step S40403 that the IP packet is the policy cancellation instruction, the policy server Pc extracts the transmitter IP address and the order reception number (β1) from the IP packet, and searches the columns of middleman server IP address and order reception number on the executed policy management table for data matching the extracted transmitter IP address and order reception number. Then, the policy server Pc extracts policy items (policy number, destination IP address, transmitter IP address, requested band, reservation start date and time, reservation end date and time, and router IP address) corresponding to both extracted transmitter IP address and order reception number as shown in FIG. 66A (step S40404).

Next, the policy server Pc, letting the extracted router virtual IP address be a destination address, transmits to the router Rc an IP packet including an instruction to cancel the policy items (policy number, destination IP address, transmitter IP address, requested band, reservation start date and time, and reservation end date and time) of the policy number 1 (step S40405). FIG. 66B is a diagram showing the IP packet.

When the router Rc, which waits to receive data (step S40501 of FIG. 61), receives the IP packet from the policy server Pc (step S40502), the router Rc extracts the policy items, and cancels the policy setting with respect to its ports to the destination IP address and the transmitter IP address (that is, with respect to the ports P10 and P12) (step S40503). That is, the router Rc releases the bands of the ports P10 and P12 which bands are reserved for the policy of the policy number 1.

Next, the router Rc transmits to the policy server Pc an IP packet including a message notifying the completion of the cancellation of the policy of the policy number 1 (step S40504). FIG. 66C is a diagram showing the IP packet.

In step S46 of FIG. 55, receiving the IP packet from the router Rc, the policy server Pc extracts the policy number (1) from the IP packet, and searches the column of policy number on the executed policy management table. Then, as shown in FIG. 67A, extracts output items (reservation start date and time, reservation end date and time, and output port number) corresponding to the searched-out policy number (step S40406 of FIG. 60).

Next, the policy server Pc searches the column of port number on the output side port band management table 31 for the extracted output port number P10. Then, with respect to the (output) port number P10, the policy server Pc updates the output side port band management table 31 by adding the reserved (requested) band value of 64 Kbps to a residual band value for the reserved period (10:00 to 12:00) obtained from the extracted reservation start date and time and reservation end date and time (step S40407). As shown in FIG. 67C, the residual line band of the port number P10 for the period of 10:00 to 12:00 is updated to 1 Mbps by adding 64 Kbps to 0.936 Mbps as shown in FIG. 67B.

Here, the policy server Pc, letting data corresponding to the policy number 1 in the column of middleman server IP address on the executed policy management table 32 be a destination IP address, transmits to the middleman server β an IP packet including a message notifying the completion of the cancellation of the policy of the order reception number β1 (step S40408). FIG. 67D is a diagram showing the IP packet.

Further, the policy server Pc searches the executed policy management table 32 for the order reception number β1, and deletes the policy corresponding to the order reception number β1 from the executed policy management table 32 as shown in FIG. 67E (step S40409).

Figures 68A, 68B, 68C:
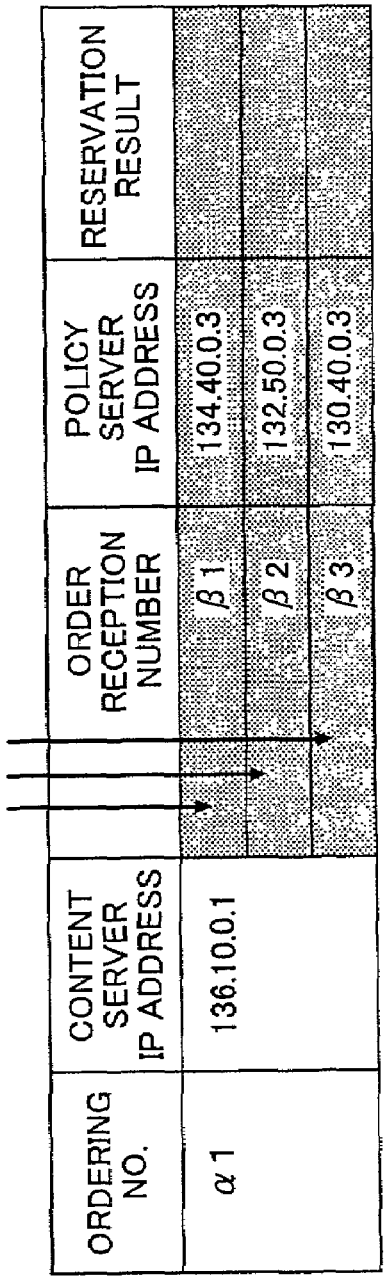

In step S47 of FIG. 55, the policy servers Pb and Pa successively transmit to the middleman server β IP packets including messages notifying the completions of the cancellations of the policies of the order reception numbers β2 and β3, respectively, in the same way as the policy server Pc. FIGS. 68A and 68B are diagrams showing the IP packets transmitted from the policy servers Pb and Pa, respectively.

Figure 59:
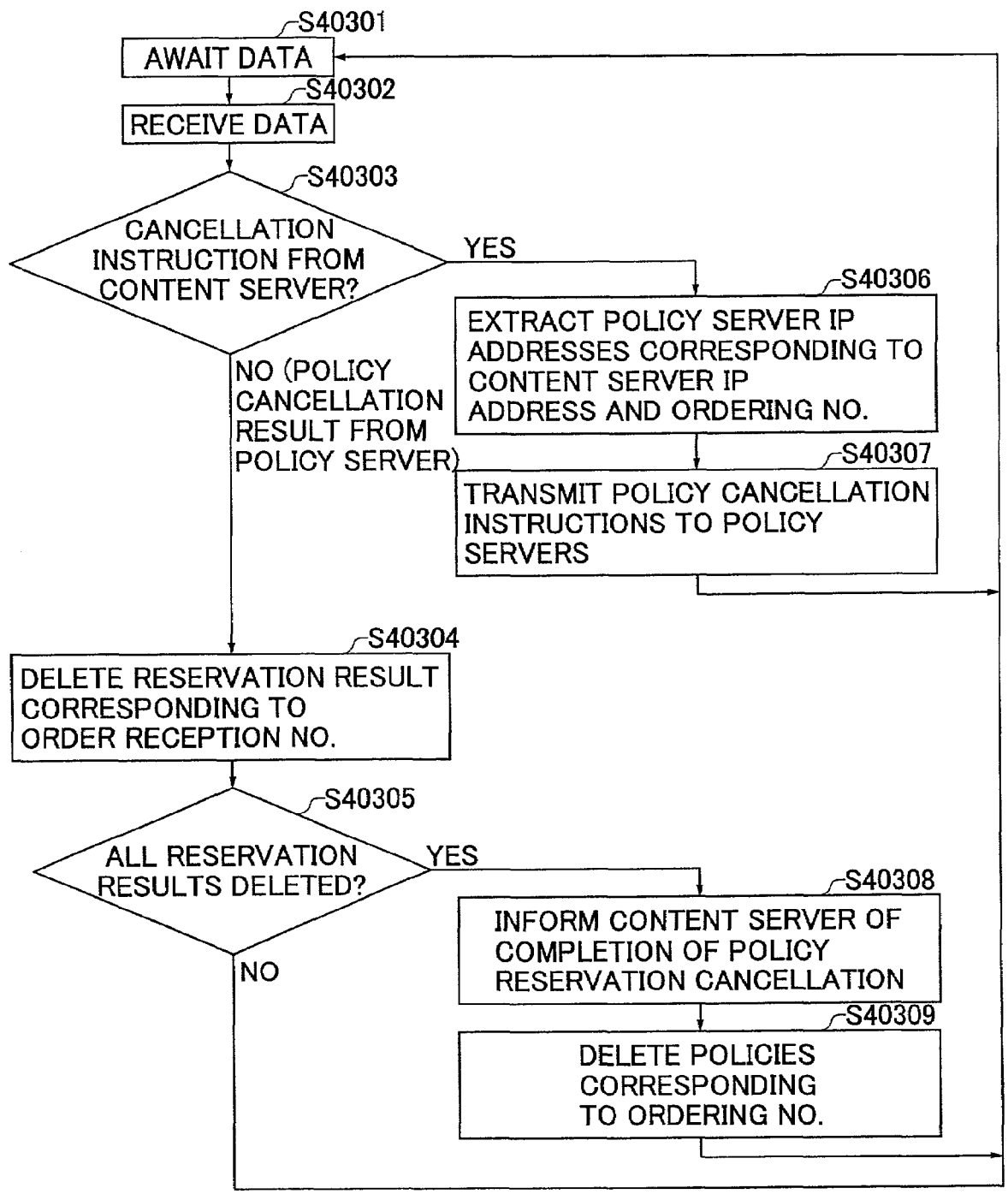
FIG. 59 is a flowchart of an operation of the middleman server according to the fourth embodiment.
Figure 60:
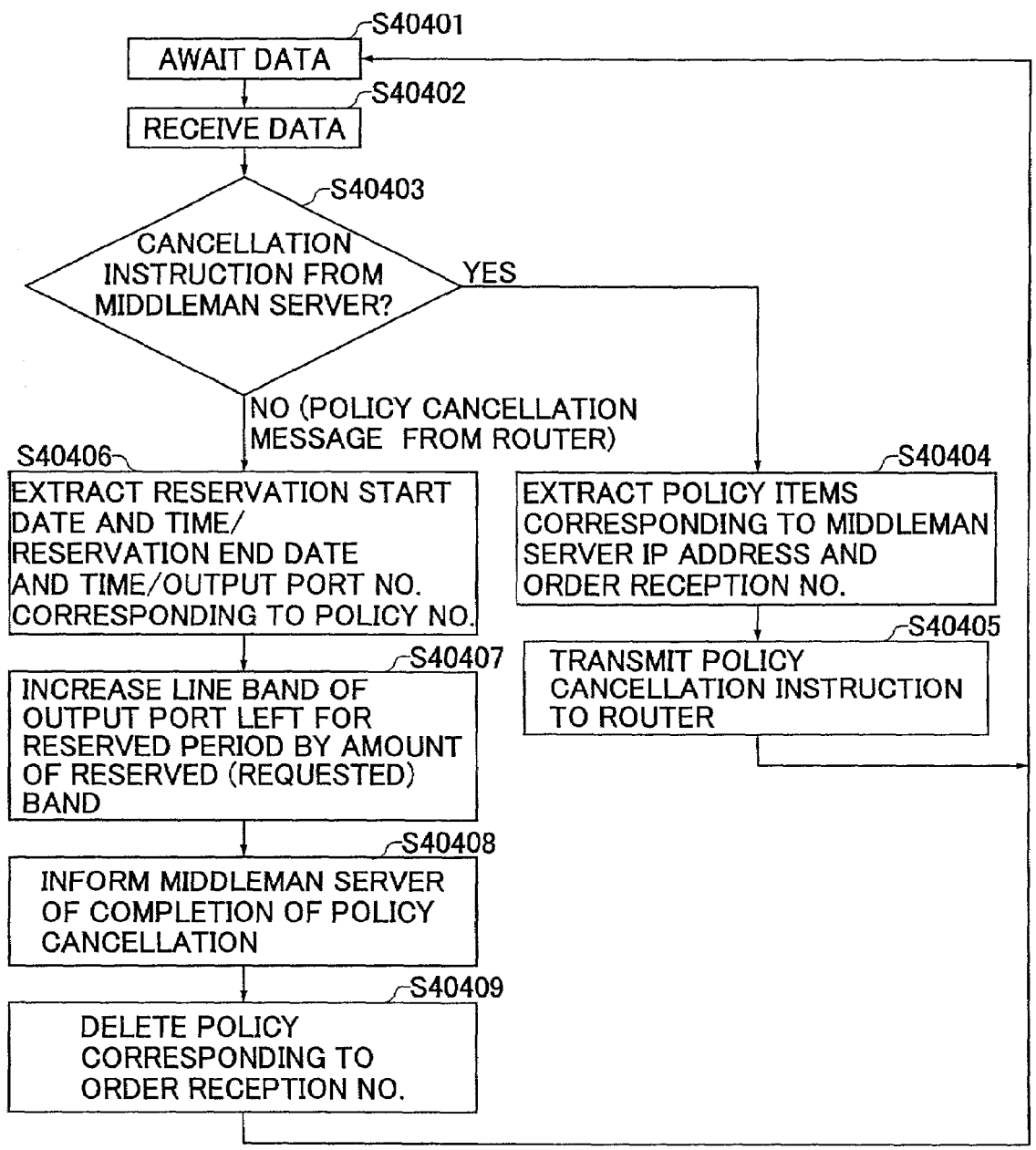
FIG. 60 is a flowchart of an operation of each policy server according to the fourth embodiment.
Figure 61:
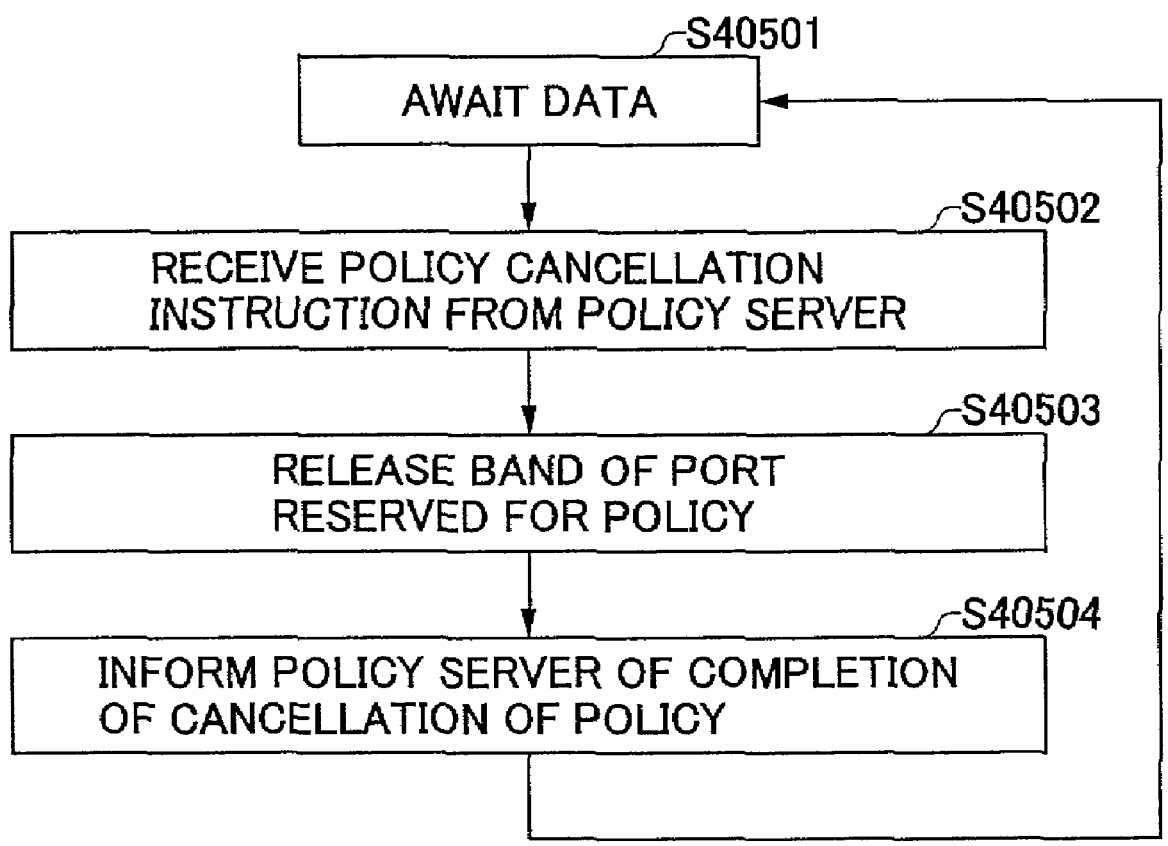
FIG. 61 is a flowchart of an operation of each router according to the fourth embodiment.

In step S48 of FIG. 56, receiving the IP packet transmitted from the policy server Pc in step S46, the middleman server β searches the column of order reception number on the policy reservation determination management table 25 for data corresponding to the order reception number β1, and deletes data corresponding to the order reception number β1 from the column of reservation result on the policy reservation determination management table 25 (step S40304 of FIG. 59).

Then, the middleman server β successively performs the same operation with respect to each of the IP messages transmitted from the policy servers Pb and Pa in step S47. FIG. 68C is a diagram showing the policy reservation determination management table 25 whose reservation result column is updated.

Next, the middleman server β determines whether all the reservation results corresponding to the order reception numbers β1 through β3 are deleted from the policy reservation determination management table 25 (step S40305).

If the middleman server β determines that all the reservation results are deleted in step S40305, the middleman server β judges by a general determination that the reserved policy is canceled, and transmits to the content server α an IP packet including a message notifying the completion of the cancellation of the reservation of the policy of the ordering number β1 (step S40308). FIG. 68D is a diagram showing the IP packet.

Then, the middleman server β searches the column of ordering number on the policy reservation determination management table 25, and deletes the policies corresponding to the searched-out ordering number as shown in FIG. 68E (step S40319).

In step S49 of FIG. 56, receiving the IP packet, the content server α determines whether the IP packet includes a message notifying the completion of the cancellation of the reservation of the policy of the ordering number α1 (step S40207).

If the content server α determines in step S40207 that the IP packet includes such a message, the content server α transmits to the DTE-a an IP packet including a message notifying the completion of the policy reservation cancellation, such as "Cancellation of the reserved policy of the ordering number α1 is completed," letting data corresponding to the ordering number α1 in the column of user IP address on the user policy storage table 15 be the destination address of the IP packet (step S40208). FIG. 69A is a diagram showing the IP packet.

Then, the content server α searches the user policy storage table for the ordering number α1, and deletes the policy corresponding to the ordering number α1 as shown in FIG. 69B (step S40209).

If the content server α determines in step S40207 that the IP packet does not include such a message from the middleman server β, the content server α operates in accordance with the received IP packet (step S40210).

[Fifth Embodiment]

In the fifth embodiment, a user terminal (user) transmits to a content server (content provider) a request for a content in receiving the content from the content server via the Internet, and the content server, receiving the request from the user terminal, causes routers between the user terminal and the content server to reserve a band value recorded in advance in the user terminal by using an RSVP message with an ID issued by a middleman server.

(1) System Configuration

A description will be given of the fifth embodiment with reference to FIG. 70A that is a diagram showing a network structure of the fifth embodiment.

Figure 70A:
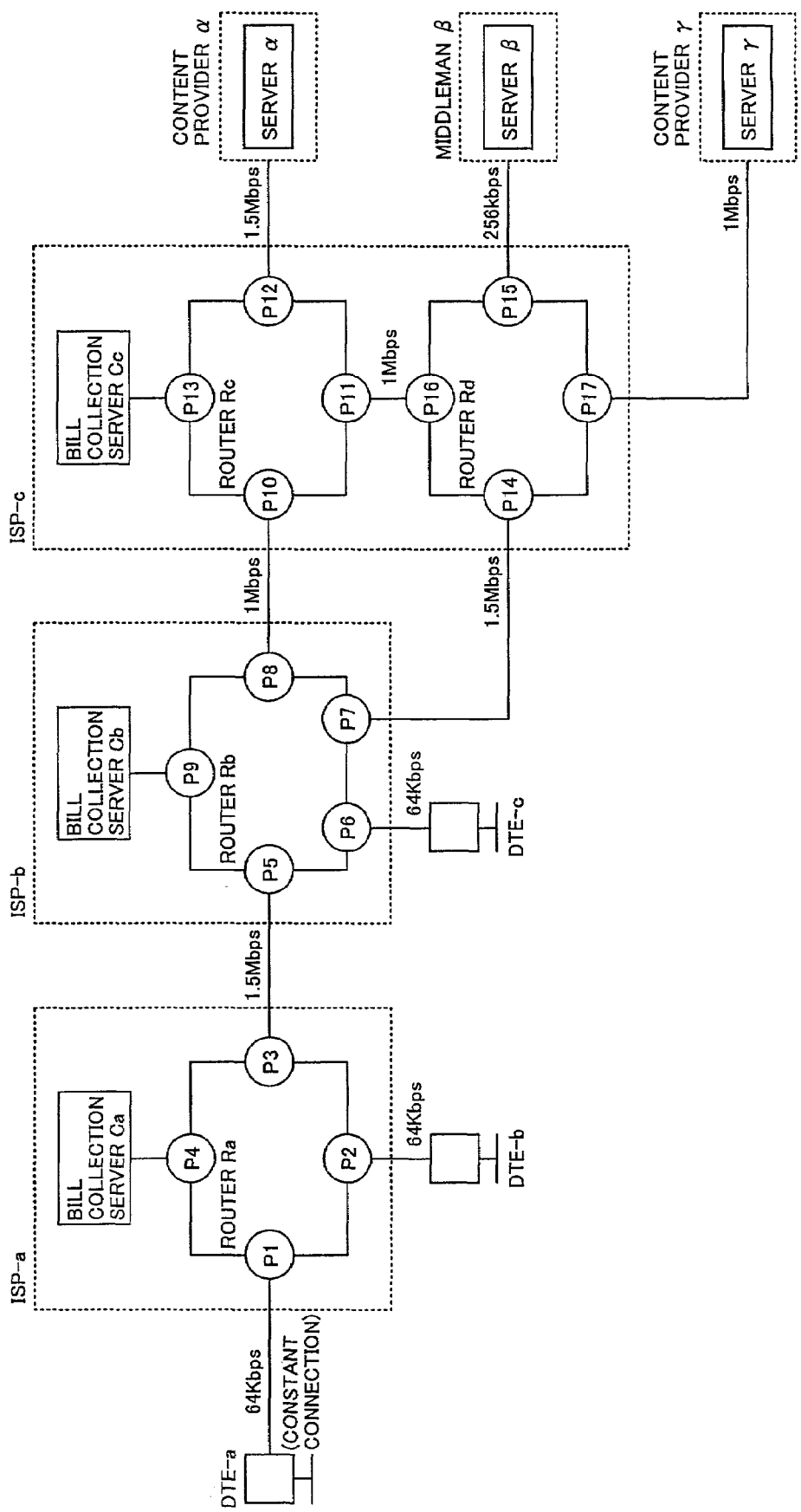
FIG. 70A is a diagram showing a network structure of a fifth embodiment of the present invention.

As shown in FIG. 70A, a network of the first embodiment includes user terminals (DTE-a through DTE-c), ISPs (ISP-a through ISP-c), servers of content providers α and γ (content servers α and γ), and a server of a middleman β (a middleman server β). The content servers α and γ are equal in structure and operation to the previously described content server α, and the middleman server β is equal in structure and operation to the previously described middleman server β.

The ISP-a includes a bill collection server Ca and a router Ra. The ISP-b includes a bill collection server Cb and a router Rb. The ISP-c includes a bill collection server Cc and routers Rc and Rd. The bill collection servers Ca through Cc are equal to the above-described bill collection server 80, and the routers Ra through Rd are equal to the above-described routers 40.

The router Ra includes ports P1 through P4, the router Rb includes ports P5 through P9, the router Rc includes ports P10 through P13, and the router Rd includes ports P14 through P17.

The content servers α and γ include their respective payment ID storage tables 18 shown in FIGS. 80A and 80B, respectively.

The middleman server β includes the payment ID management table 26 shown in FIG. 81A and the ISP billing particulars table 27 shown in FIG. 81B.

Each of the bill collection servers Ca through Cc includes the billing address determination table 81 shown in FIG. 82A and the billing particulars table 82 shown in FIG. 82B.

Further, each of the routers Ra through Rd includes the payment ID determination table 41 shown in FIG. 83A and the band usage particulars table 42. FIGS. 83B through 83E are diagrams showing the band usage particulars tables 42 of the routers Ra through Rd, respectively.

The IP addresses of the above-described components of the network are shown in FIG. 70B.

(2) Precondition

In the network structure of FIG. 70A, a variety of data is set in each of the following network components.

First, the content server α distributes a content A to the DTE-b at a band value of "64 Kbps" for a reserved period of 10:00 to 12:00 on 2001/9/1. Further, the content server γ distributes a content B to the DTE-c at a band value of "64 Kbps" for a reserved period of 9:00 to 12:00 on 2001/9/1.

The content servers α and γ prestores the IP address of the middleman server β under their respective contracts with the middleman β.

The content servers α and γ comply with the RSVP protocol.

Here, a description will be given of the tables set in the content servers α and γ, the middleman server β, and the bill collection servers Ca through Cc and the routers Ra through Rd of the ISP-a through ISP-c.

Thereafter, a description will be given of a connection band (a band used for the connection of the DTE-a to the ISP-a) set in the DTE-a and the setting of the object part of an RSVP message according to the present invention.

(A) The content servers α and γ include their respective payment ID storage tables 18 for storing payment IDs issued in advance to the content servers α and γ.

Here, the content servers α and γ store their respective payment IDs β1 and β2 issued by the middleman β.

(B) The middleman server β, as previously described, includes the payment ID management table 26 and the ISP billing particulars table 27. The payment ID management table 26 is used for managing the IP addresses of content servers used for billing by correlating the IP addresses with their respective payment IDs. The ISP billing particulars table 27 is used for collecting billing particulars transmitted from ISPs and charging the content servers.

(C) Each of the bill collection servers Ca through Cc of the ISP-a through ISP-c includes the billing address determination table 81 and the billing particulars table 82, and stores a list of charges.

The billing address determination table 81, as shown in FIG. 82A, is used for specifying a middleman to be charged for usage particulars collected from the subordinate router.

The billing particulars table 82, as shown in FIG. 82B, is used for collecting usage particulars from the subordinate router, and calculating and managing an amount billed to a middleman.

(D) Each of the routers Ra through Rd includes the payment ID determination table 41 and the band usage particulars table 42. All the routers Ra through Rd comply with the RSVP protocol.

The payment ID determination table 41 is used for judging an RSVP message in advance to prevent a non-subscriber from receiving a service from a content provider, and is provided in advance in each subordinate router.

Here, as shown in FIG. 83A, the payment ID determination table 41 stores the payment IDs β1 and β2 issued by the middleman β.

The band usage particulars table 42 is used for recording RSVP usage particulars in each router.

(E) Connection band set in the user (DTE-a)

A connection band is preset in a terminal. Here, the DTE-a complies with the RSVP protocol.

(F) Setting of the object part of an RSVP message according to the present invention A payment ID identifier is preset in the Class-Num part of the object part of an RSVP message and a payment ID issued by the middleman β is set in the object part of the RSVP message so that a router receiving the RSVP message can reserve or release a resource.

(3) System Operation

Figure 71:
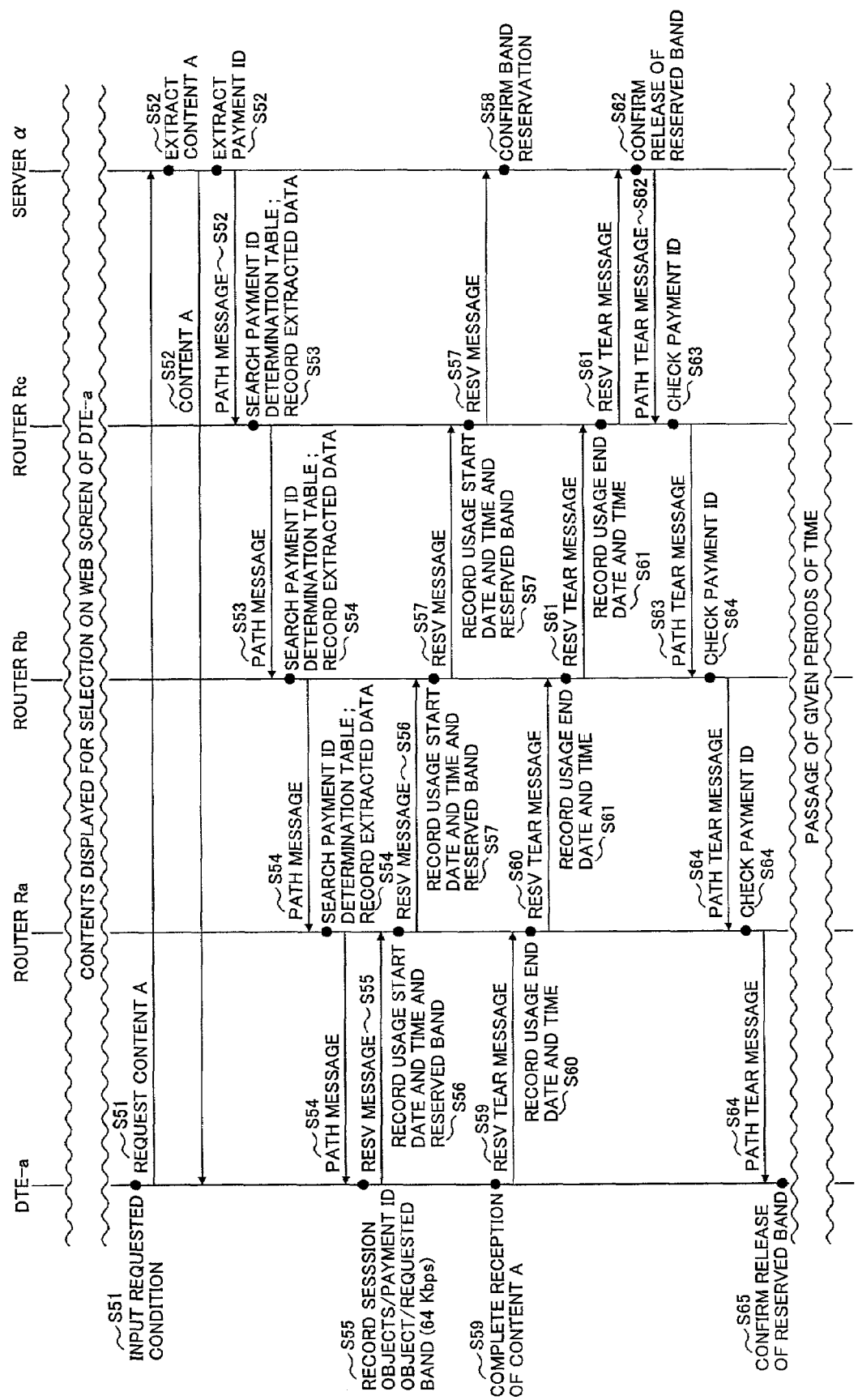
FIGS. 71 and 72 are diagrams showing a sequence of steps of a system operation according to the fifth embodiment.
Figure 72:
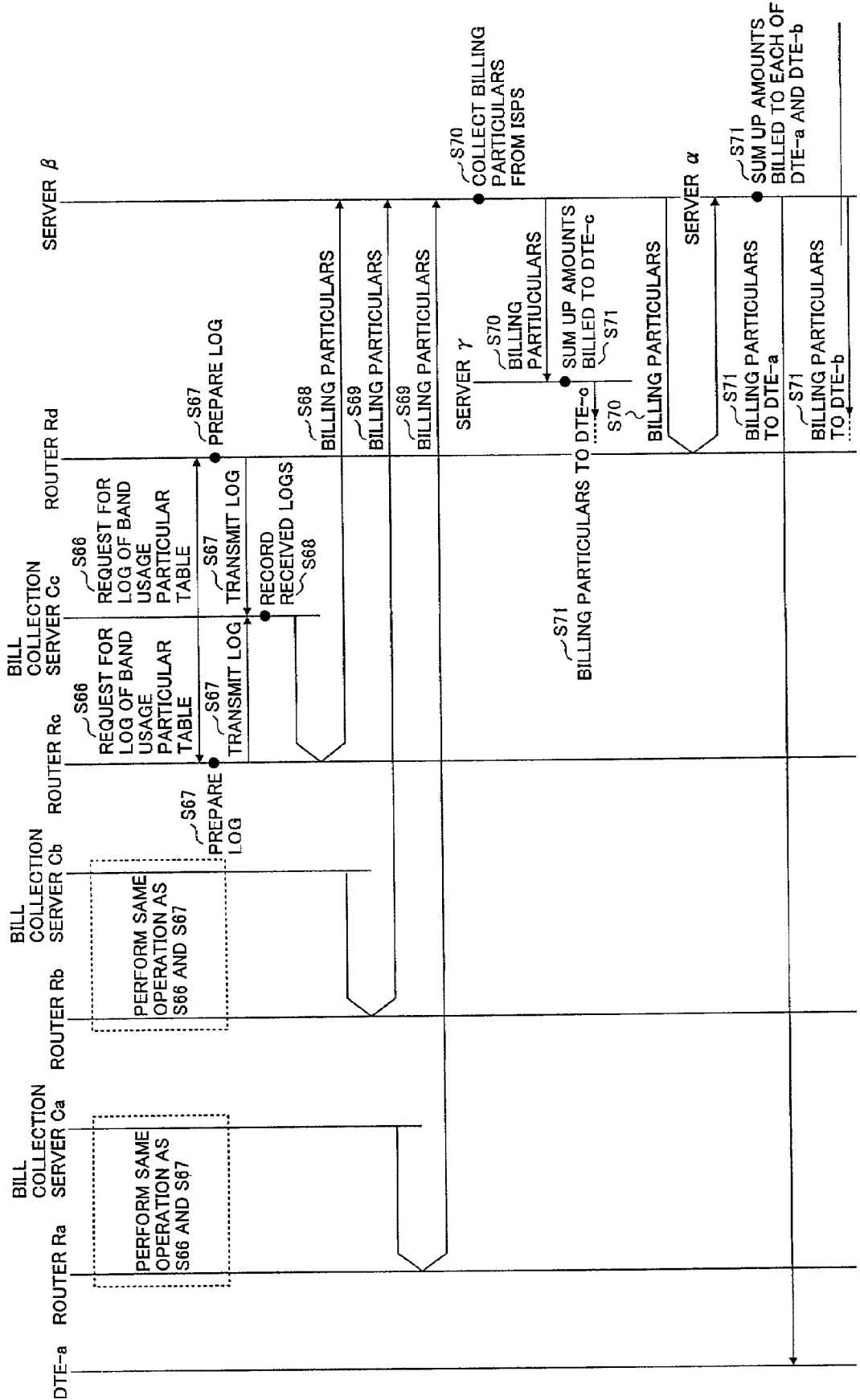
Figure 73:
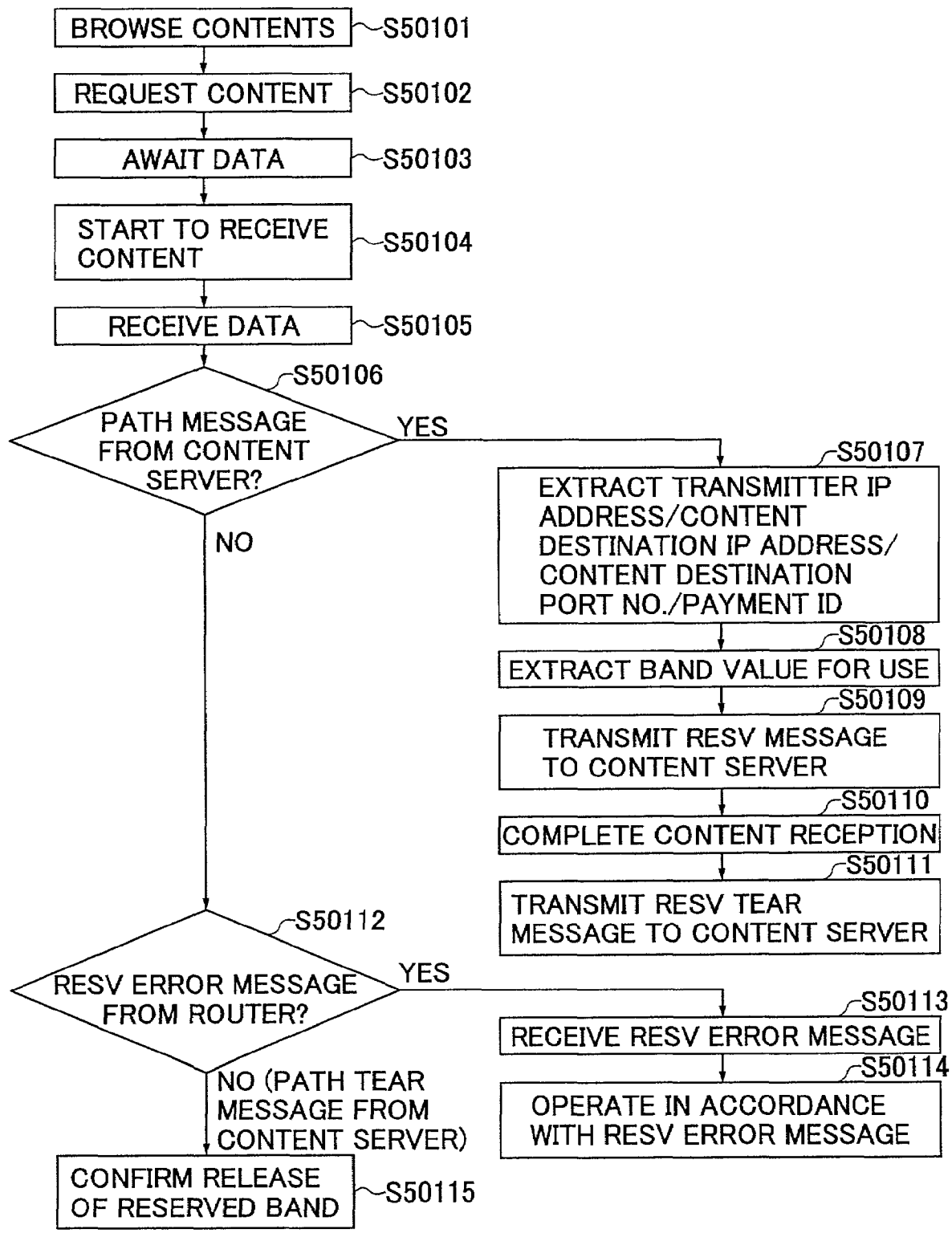
FIG. 73 is a flowchart of an operation of the user terminal according to the fifth embodiment.
Figure 74:
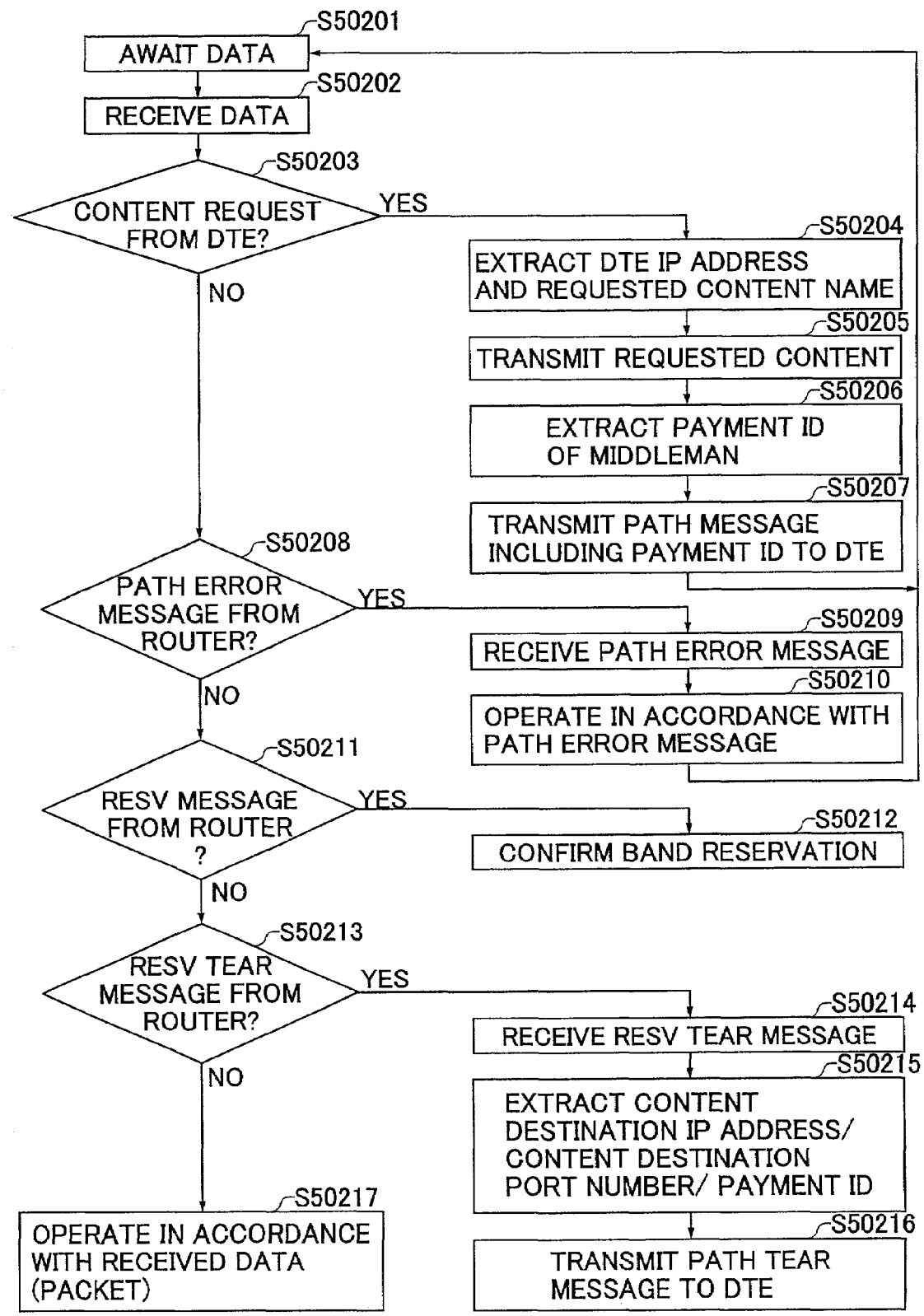
FIG. 74 is a flowchart of an operation of the content server according to the fifth embodiment.
Figure 75:
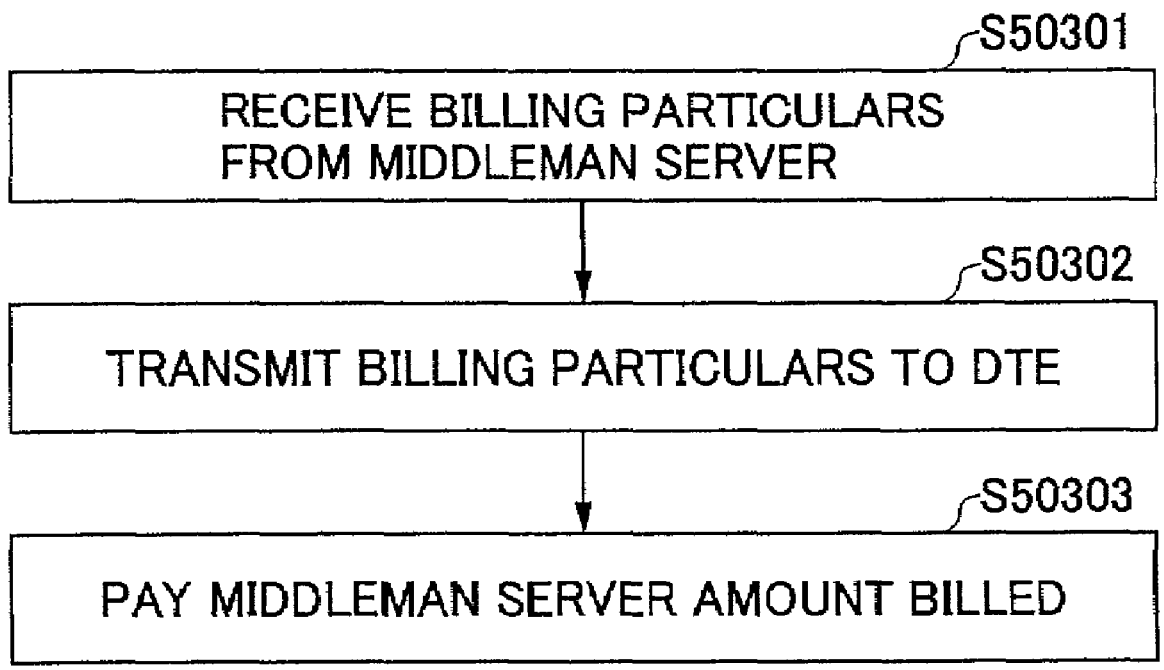
FIG. 75 is a flowchart of an operation of each content server according to the fifth embodiment.
Figure 76:
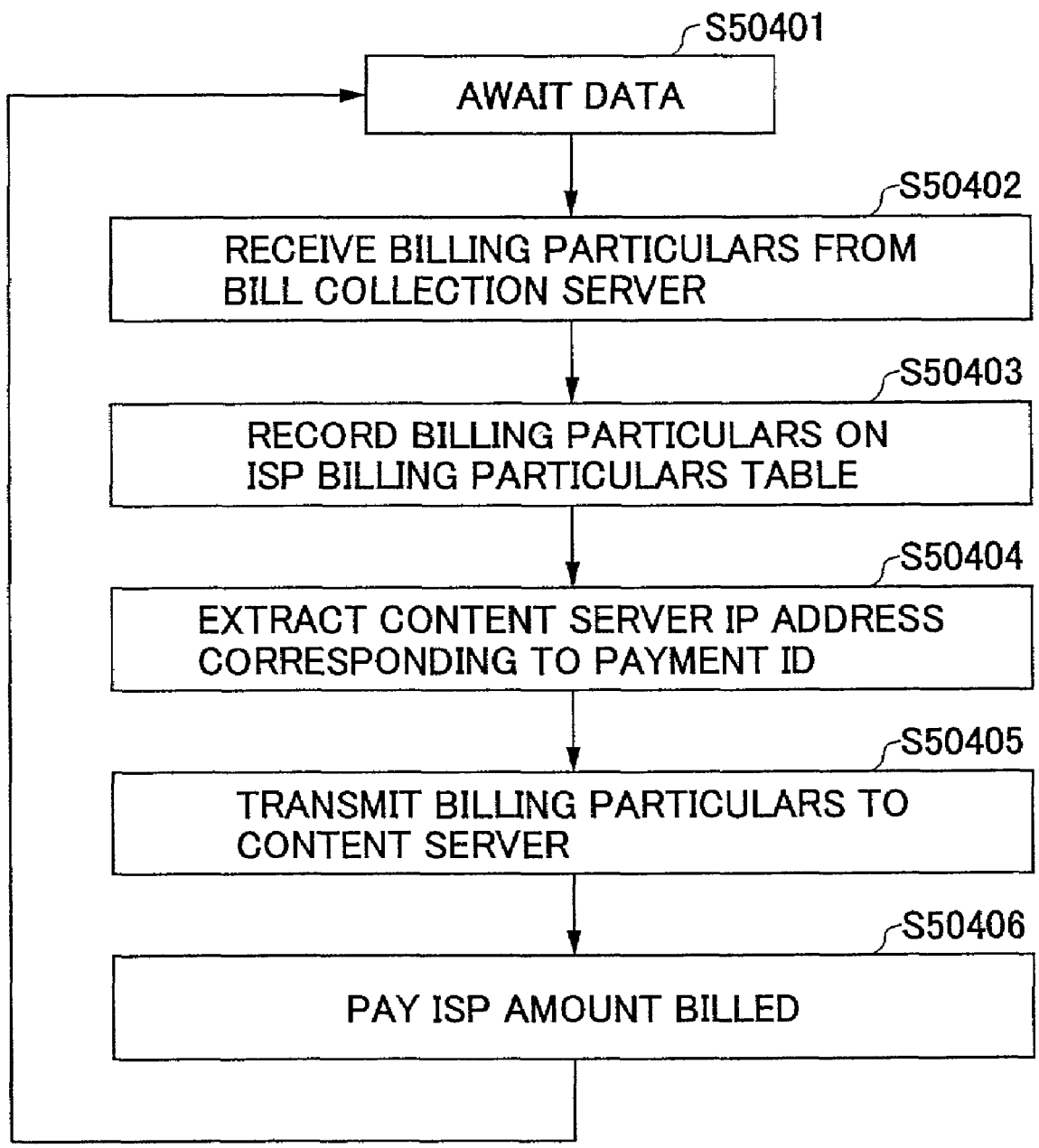
FIG. 76 is a flowchart of an operation of the middleman server according to the fifth embodiment.
Figure 77:
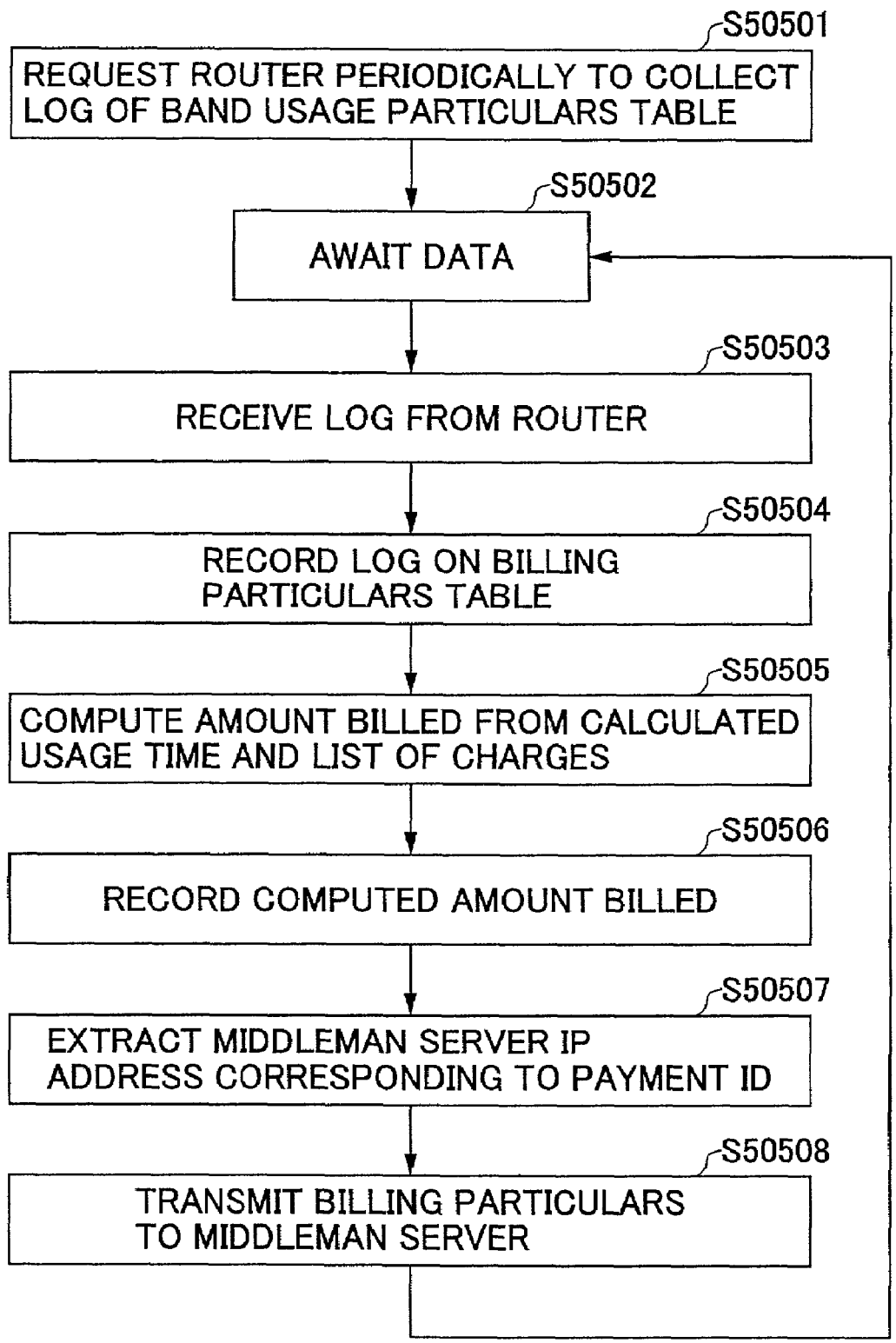
FIG. 77 is a flowchart of an operation of each bill collection server according to the fifth embodiment.
Figure 78:
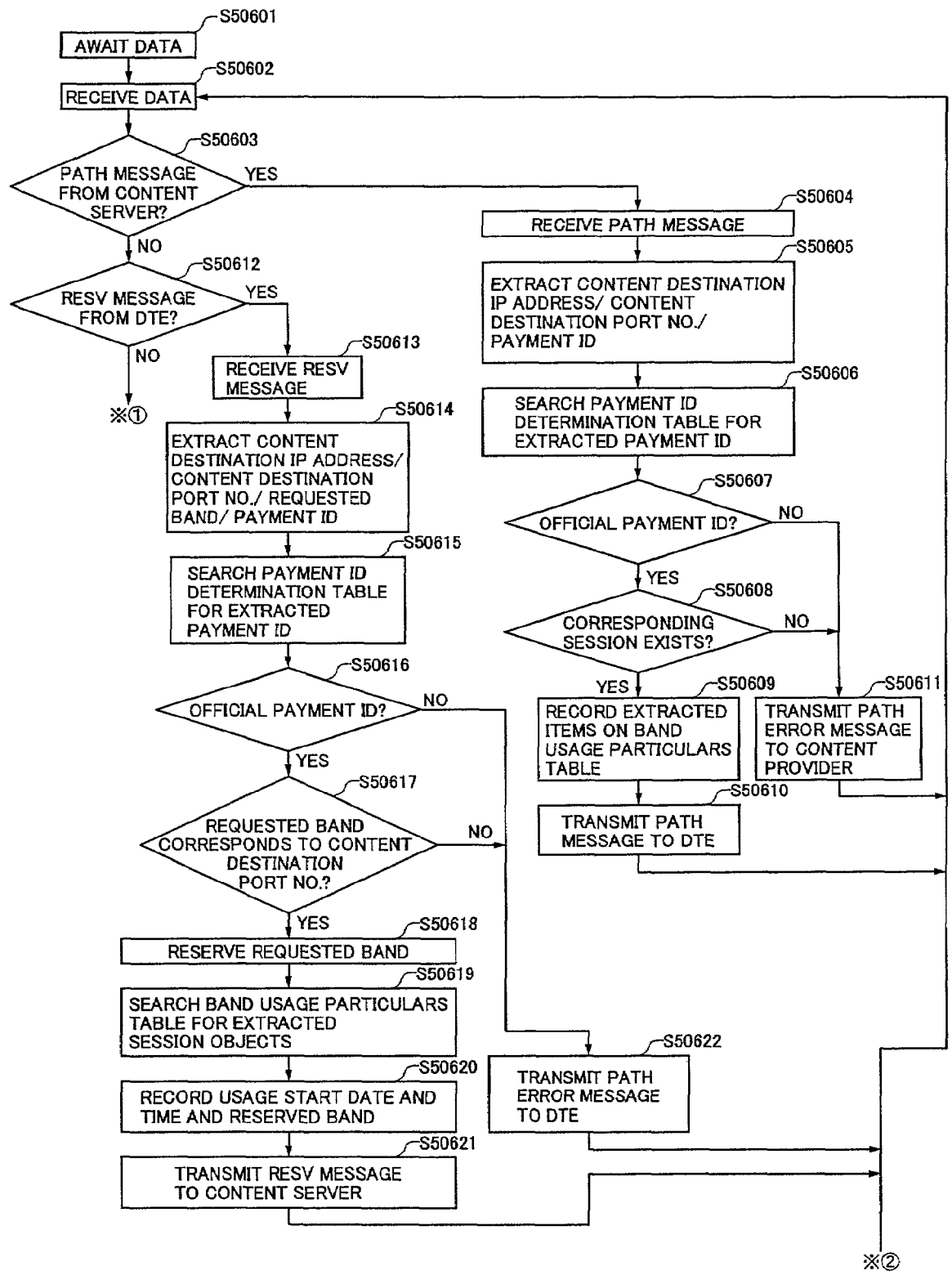
FIGS. 78 and 79 are flowcharts of an operation of each ISP router according to the fifth embodiment.
Figure 79:
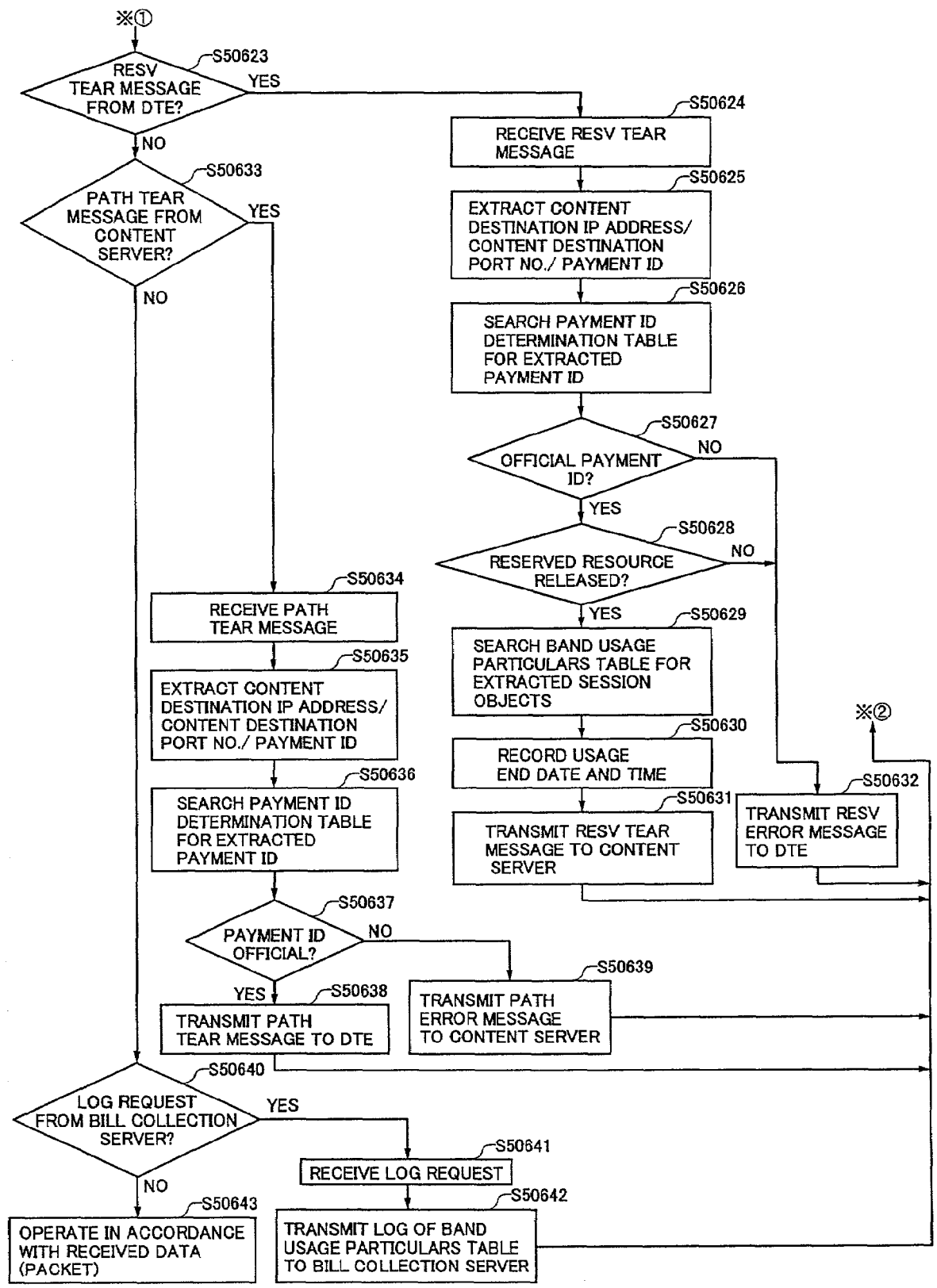

FIGS. 71 and 72 are diagrams showing a sequence of steps of a system operation according to the fifth embodiment. FIG. 73 is a flowchart of an operation of the DTE-a, FIGS. 74 and 75 are flowcharts of an operation of the content server α, FIG. 76 is a flowchart of an operation of the middleman server β, FIG. 77 is a flowchart of an operation of each of the bill collection servers Ca through Cc, and FIGS. 78 and 79 are flowcharts of an operation of each of the routers Ra through Rd.

A description will be given, with reference to FIGS. 71 through 96, of the system operation according to the fifth embodiment.

In step S51 of FIG. 71, the user, who browses contents on the web screen of the DTE-a (step S50101 of FIG. 73), selects a condition to be requested on the screen and transmits to the content server α an IP packet including a request for the condition (step S50102). FIG. 84A is a diagram showing the IP packet.

The condition requested by the DTE-a is as follows:
Content name: Content A

Thereafter, the DTE-a waits to receive the requested content A from the content server α (step S50103).

In step S52 of FIG. 71, when the content server α, which waits to receive data (step S50201 of FIG. 74), receives the IP packet (step S50202), the content server α determines whether the IP packet includes a content request from the DTE-a. If the content server α determines that the IP packet includes such a request, the content server α extracts the transmitter IP address and the requested condition (content name) from the IP packet (step S50204).

Since the DTE-a requests the content A, the content server α transmits an IP packet including the content A to the DTE-a with the transmitter IP address being set as the destination IP address of the IP packet (step S50205). FIG. 84B is a diagram showing the IP packet. The DTE-a starts to receive the content A (step S50104 of FIG. 73).

Figure 84C:
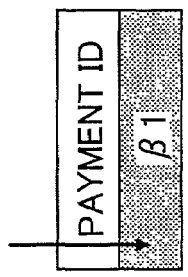
Figure 84D:
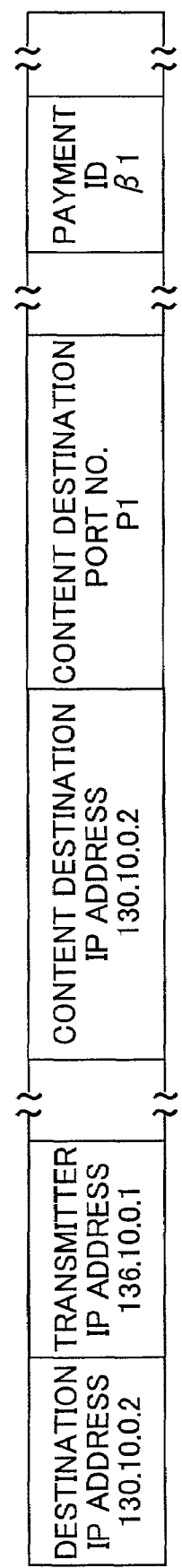

Next, as shown in FIG. 84C, the content server α extracts the payment ID β1 corresponding to the middleman β from the payment ID storage table 18 (step S50206 of FIG. 74). Then, the content server α transmits to the DTE-a a Path message including items (session objects: content destination IP address and content destination port number, and payment ID object) set in compliance with the RSVP protocol (step S50207). FIG. 84D is a diagram showing the Path message.

In step S53 of FIG. 71, when the router Rc, which waits to receive data (step S50601 of FIG. 78), receives the Path message (step S50602), it is determined that the router Rc has received the Path message from the content server α (step S50603 and S50604), and extracts the session objects (content destination IP address and content destination port number) and the payment ID object from the Path message (step S50605).

First, the router Rc searches the payment ID determination table 41 for data corresponding to the extracted payment ID β1 (step S50606) as shown in FIG. 85A to determine whether the payment ID β1 is official (step S50607).

If it is determined in step S50607 that the payment ID β1 is official, the router Rc proceeds to determine whether a corresponding session exists (step S50608).

If the existence of the corresponding session is confirmed in step S50608, the router Rc records the previously extracted items (content destination IP address, content destination port number, and payment ID object) in the columns of destination IP address, destination port number, and payment ID on the band usage particulars table 42 (step S50609). FIG. 85B is a diagram showing the band usage particulars table 42 recorded with the above-described session objects and payment ID object (indicated by hatching).

Here, the router Rc transmits to the DTE-a the Path message including the previously extracted items (session objects: content destination IP address and content destination port number, and payment ID object) set in compliance with the RSVP protocol (step S50610). FIG. 85C is a diagram showing the Path message transmitted from the router Rc to the DTE-a.

If it is determined in the negative in either step S50607 or S50608, the router Rc transmits to the content server α a Path Error message including the previously extracted items (session objects: content destination IP address and content destination port number, and payment ID object) set in compliance with the RSVP protocol (step S50611). When it is determined that the content server α has received the Path Error message from the router Rc (steps S50208 and S50209 of FIG. 74), the content server α operates in accordance with the Path Error message (step S50210).

In step S54 of FIG. 71, the routers Rb and Ra successively perform the same operation as the router Rc in step S53, and transmit the Path message to the DTE-a. FIGS. 86A and 86B are diagrams showing the Path message transmitted from the routers Rb and Ra, respectively.

In step S55 of FIG. 72, it is determined that the DTE-a has received the Path message transmitted from the router Ra (that is, from the content server α) (steps S50105 and S50106 of FIG. 73), and the DTE-a extracts the transmitter IP address, the session objects (content destination IP address and content destination port number), and the payment ID object from the Path message (step S50107).

Thereafter, first, in order to transmit an Resv message for causing the routers Ra through Rc through which the Path message has passed to reserve resources, the DTE-a extracts therefrom a prerecorded band value of 64 Kbps (step S50108). Then, with the previously extracted transmitter IP address being set as a destination IP address, the DTE-a transmits to the content server α the Resv message including an item (flow spec object: band value to be reserved (requested band)) set in compliance with the RSVP protocol in addition to the above-described items (session objects: content destination IP address and content destination port number, and payment ID object). FIG. 87 is a diagram showing the Resv message.

In step S56 of FIG. 71, when it is determined that the router Ra has received the Resv message from the DTE-a (steps S50612 and S50613 of FIG. 78), the router Ra extracts the session objects (content destination IP address and content destination port number), the flow spec object (requested band), and the payment ID object from the Resv message (step S50614).

Then, the router Ra searches the payment ID determination table 41 for data corresponding to the extracted payment ID β1 (step S50615) as shown in FIG. 88A to determine whether the payment ID β1 is official (step S50616).

If it is determined in step S50616 that the payment ID β1 is official, the router Ra proceeds to determine whether the requested band corresponds to the content destination port number (step S50617).

If it is determined in the affirmative in step S50617, the router Ra reserves the requested band that is the flow spec object of the Resv message with respect to the corresponding session (step S50618).

Then, since both of the above-described conditions of steps S50616 and S50617 are satisfied at the same time, the router Ra determines that the reservation of the requested band starts. The router Ra searches the columns of destination IP address and destination port number on the band usage particulars table 42 for data corresponding to the previously extracted session objects (content destination IP address and content destination port number) (step S50619). When the router Ra confirms the existence of the corresponding data, the router Ra records the date and time of the confirmation (10:00 a.m. on 2001/9/1) in the column of usage start date and time on the band usage particulars table 42 so that the date and time is correlated with the session objects. Further, the router Ra figures out the requested band from the extracted flow spec object in accordance with the RSVP protocol, and records the requested band in the column of reserved (requested) band on the band usage particulars table 42 in the same way as in recording the date and time of the confirmation (step S50620). FIG. 88B is a diagram showing the band usage particulars table 42 recorded with the data in the column of usage start date and time and reserved band.

The router Ra transmits to the content server α the Resv message including the above-described items (session objects: content destination IP address and content destination port number, flow spec object: requested band, and payment ID object) set in compliance with the RSVP protocol with the previously extracted transmitter IP address of the Path message being set as the destination address of the Resv message (step S50621). FIG. 88C is a diagram showing the Resv message transmitted from the router Ra to the content server α.

If it is determined in the negative in either step S50616 or S50617, the router Ra transmits to the DTE-a an Resv Error message including the above-described items (session objects: content destination IP address, content destination port number, flow spec object: requested band, and payment ID object) set in compliance with the RSVP protocol (step S50622).

When it is determined that the DTE-a has received the Resv Error message from the router Ra (steps S50112 and S50113 of FIG. 73), the DTE-a operates in accordance with the Resv Error message (step S50114).

In step S57 of FIG. 71, the routers Rb and Rc successively perform the same operation as the router Ra in step S56, and transmit the Resv message to the content server α. FIGS. 89A and 89B are diagrams showing the Resv message transmitted from the routers Rb and Rc, respectively.

In step S58 of FIG. 71, when it is determined that the content server α has received the Resv message from the router Rc (that is, from the DTE-a) (step S50211 of FIG. 74), the content server α confirms the reservation of the requested band (step S50212).

In step S59 of FIG. 71, when the distribution of the content A is completed (step S50110 of FIG. 73), in order to release the reserved paths and resources, the DTE-a transmits to the content server α an Resv Tear message including the items (session objects: content destination IP address and content destination port number, and payment ID object) set in compliance with the RSVP protocol (step S50111). FIG. 89C is a diagram showing the Resv Tear message.

In step S60 of FIG. 71, when it is determined that the router Ra has received the Resv Tear message from the DTE-a (steps S50623 and S50624), the router Ra extracts the session objects (content destination IP address and content destination port number) and the payment ID object from the Resv Tear message (step S50625).

First, the router Ra searches the payment ID determination table 41 for data corresponding to the extracted payment ID β1 (step S50626) as shown in FIG. 90A to determine whether the payment ID β1 is official (step S50627).

If it is determined in step S50627 that the payment ID β1 is official, the router Ra proceeds to determine whether the resource reserved for the corresponding session is released (step S50628).

If the release of the reserved resource is confirmed in step S50628, this means that both of the above-described conditions of steps S50627 and S50628 are satisfied at the same time. Therefore, the router Ra determines that the reservation of the requested band ends. The router Ra searches the columns of destination IP address and destination port number on the band usage particulars table 42 for data corresponding to the previously extracted session objects (content destination IP address and content destination port number) (step S50629). When the router Ra confirms the existence of the corresponding data, the router Ra records the date and time of the confirmation (12:00 a.m. on 2001/9/1) in the column of usage end date and time on the band usage particulars table 42 so that the date and time is correlated with the session objects (step S50630). FIG. 90B is a diagram showing the band usage particulars table 42 recorded with the data in the column of usage end date and time.

Here, the router Ra transmits to the content server α the Resv Tear message including the previously extracted items (session objects: content destination IP address and content destination port number, and payment ID object) set in compliance with the RSVP protocol (step S50631). FIG. 90C is a diagram showing the Resv Tear message transmitted from the router Ra to the content server α.

If it is determined in the negative in either step S50627 or S50628, the router Ra transmits to the DTE-a a Resv Error message including the previously extracted items (session objects: content destination IP address and content destination port number, and payment ID object) set in compliance with the RSVP protocol (step S50632).

In step S61 of FIG. 71, the routers Rb and Rc successively perform the same operation as the router Ra in step S60, and transmit the Resv Tear message to the content server α. FIGS. 91A and 91B are diagrams showing the Resv Tear message transmitted from the router Rb and Rc, respectively.

In step S62 of FIG. 71, when it is determined that the content server α has received the Resv Tear message from the router Rc (that is, from the DTE-a) (steps S50213 and S50214 of FIG. 74), the content server α extracts the session objects (content destination IP address and content destination port number) and the payment ID object from the Resv Tear message (step S50215).

Next, the content server α transmits to the DTE-a a Path Tear message including the previously extracted items (session objects: content destination IP address and content destination port number, and payment ID object) set in compliance with the RSVP protocol (step S50216). FIG. 91C is a diagram showing the Path Tear message.

Here, if it is determined in step S50213 that the data received by the content server α is no the Resv Tear message from the router Rc, that is, if it is determined that the data received by the content server α in step S50203 is none of the content request from the DTE-a and the Path Error message, the Resv message, and the Resv Tear message from the router Rc, the content server α operates in accordance with the received data (packet) (step S50217).

In step S63 of FIG. 71, when it is determined that the router Rc has received the Path Tear message from the content server α (steps S50633 and S50634 of FIG. 79), the router Rc extracts the session objects (content destination IP address and content destination port number) and the payment ID object from the Path Tear message (step S50635).

Figure 92A:
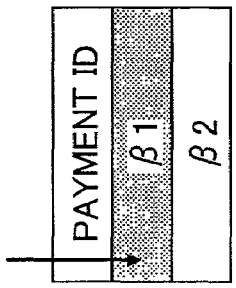

First, the router Rc searches the payment ID determination table 41 for data corresponding to the extracted payment ID β1 (step S50636) as shown in FIG. 92A to determine whether the payment ID β1 is official (step S50637).

Figure 92B:
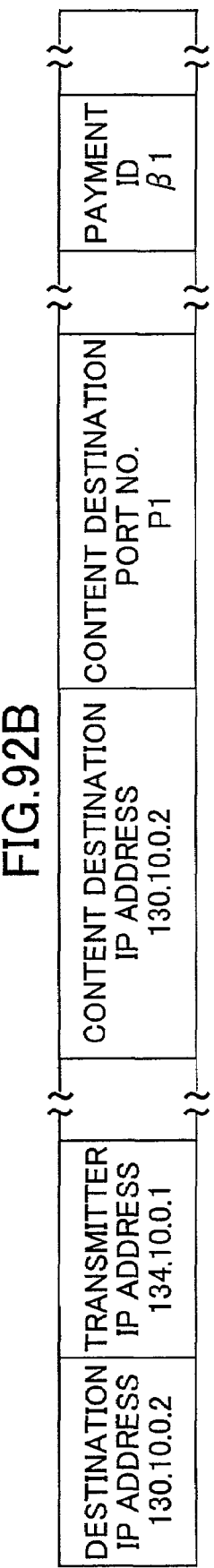

If it is determined in step S50637 that the payment ID β1 is official, the router Rc transmits to the DTE-a the Path Tear message including the previously extracted items (session objects: content destination IP address and content destination port number, and payment ID object) set in compliance with the RSVP protocol (step S50638). FIG. 92B is a diagram showing the Path Tear message transmitted from the router Rc to the DTE-a.

If it is determined in the negative in step S50637, the router Rc transmits to the content server α a Path Error message including the previously extracted items (session objects: content destination IP address and content destination port number, and payment ID object) set in compliance with the RSVP protocol (step S50639).

In step S64 of FIG. 71, the routers Rb and Ra successively perform the same operation as the router Rc in step S63, and transmit the Path Tear message to the DTE-a. FIGS. 92C and 92D are diagrams showing the Path Tear message transmitted from the routers Rb and Ra, respectively.

In step S65 of FIG. 71, when it is determined that the DTE-a has received the Path Tear message from the router Ra (that is, from the content server α), the DTE-a confirms the release of the reserved band (step S50115 of FIG. 73).

Each of the ISP-a through ISP-c collects a log of the band usage particulars table 42 from its subordinate router to charge the middleman β periodically. Here, a description will be given through an operation of the ISP-c.

In step S66 of FIG. 72, the bill collection server Cc periodically transmits to each of the routers Rc and Rc an IP packet including a request for a log of its band usage particulars table 42 (step S50501 of FIG. 77), and waits to receive data from the routers Rc and Rd (step S50502). FIGS. 93A and 93B are diagrams showing the IP packets transmitted from the bill collection server Cc to the routers Rc and Rd, respectively.

In step S67 of FIG. 72, when it is determined that the router Rc has received the IP packet from the bill collection server Cc (steps S50640 and S50641 of FIG. 79), the router Rc prepares a log (log items) (payment ID, destination IP address, destination port number, reserved (requested) band, usage start date and time, and usage end date and time) of the band usage particulars table, and transmits to the bill collection server Cc an IP packet including the prepared log (step S50642). The router Rd also performs the same operation. FIGS. 93C and 93D are diagrams showing the IP packets transmitted from the routers Rc and Rd to the bill collection server Cc.

If it is determined in step S50640 that the data received by the router Rc is not a log request from the bill collection server Cc, that is, if it is determined that the data received by the router Rc in step S50602 is none of the Path message and the Path Tear message from the content server α, and the Resv message and the Resv Tear message from the DTE-a, the router Rc operates in accordance with the received data (packet) (step S50643).

In step S68 of FIG. 72, the bill collection server Cc receives the IP packets transmitted from the routers Rc and Rd (step S50503 of FIG. 77), and records the logs (log items) collected from the routers Rc and Rd in the columns of payment ID, destination IP address, destination port number, transmitter IP address, reserved band, usage start date and time, and usage end date and time on the billing particulars table 82 (step S50504).

Further, with respect to each band used for distributing the corresponding content, the bill collection server Cc calculates a period of usage time from the usage start date and time and the usage end date and time of the band, and based on the calculated usage time, computes an amount billed by referring to the list of charges (step S50505). Then, the bill collection server Cc records the computed amount billed in the column of amount billed on the billing particulars table 82 (step S50506). FIG. 94 is a diagram showing the billing particulars table 82 recorded with the logs transmitted from the routers Rc and Rd.

Next, the billing collection server Cc searches the column of payment ID on the billing address determination table 81 for data corresponding to the payment ID β1 as shown in FIG. 94B to extract a middleman server IP address corresponding to the payment ID β1. That is, the billing collection server Cc extracts the IP address of the middleman server β (step S50507).

Then, the bill collection server Cc transmits to the middleman server β an IP packet including the contents of the billing particulars table 82 (billing particulars) with the IP address of the middleman server β being set as the destination address of the IP packet (step S50508). FIG. 94C is a diagram showing the IP packet.

In step S69 of FIG. 72, the bill collection servers Cb and Ca successively transmit IP packets including billing particulars to the middleman server β. FIGS. 94D and 94E are diagrams showing the IP packets transmitted from the bill collection servers Cb and Ca, respectively.

In step S70 of FIG. 72, when the middleman server β, which waits to receive data (step S50401 of FIG. 76), receives the IP packets from the bill collection servers Ca through Cc (step S50402), the middleman server β records the transmitter IP address and the items of the billing particulars (amount billed, payment ID, destination IP address, destination port number, reserved band, usage start date and time, and usage end date and time) of each IP packet in the column of ISP server IP address, amount billed, destination IP address, destination port number, reserved band, usage start date and time, and usage end date and time on the ISP billing particulars table 27 (step S50403). FIG. 95A is a diagram showing the ISP billing particulars table 27 recorded with the billing items (particulars) transmitted from the ISP-a through ISP-c.

Then, the middleman server β extracts the billing items (amount billed, payment ID, destination IP address, destination port number, reserved band, usage start date and time, and usage end date and time) from the ISP billing particulars table.

Thereafter, first, the middleman server β searches the column of payment ID on the payment ID management table 26 for data corresponding to the payment IDs β1 and β2 as shown in FIG. 95B, and extracts content server IP addresses corresponding to the payment IDs β1 and β2 (step S50404). That is, the middleman server β extracts the IP addresses of the content servers α and γ.

Then, the middleman server β transmits to the content servers α and γ IP packets each including the billing particulars from the ISP-a through ISP-c set separately from one another with the extracted content server IP addresses being set as the destination IP addresses of the IP packets (step S50405). FIGS. 95C and 95D are diagrams showing the IP packets transmitted from the middleman server β to the content servers α and γ, respectively.

Thereafter, the middleman server β pays the amount billed transmitted from the bill collection servers Ca through Cc to their respective ISPs, that is, the ISP-a through ISP-c (step S50406).

In step S71 of FIG. 72, when the content server α receives the IP packet (step S50301 of FIG. 75), the content server α sums up the amounts billed to each of the DTE-a and DTE-b. Then, the content server α transmits to the DTE-a and the DTE-b IP packets including the billing particulars for the DTE-a and DTE-b, respectively. Similarly, the content server γ transmits an IP packet including the billing particulars to the DTE-c (step S50302). FIGS. 96A and 96B are diagrams showing the IP packets transmitted from the content server α to the DTE-a and the DTE-b, respectively. FIG. 96C is a diagram showing the IP packet transmitted from the content server γ to the DTE-c.

Thereafter, the content servers α and γ pay the middleman server their respective amounts billed (step S50303).

According to the present invention, the best transmission band is automatically transmitted to a band allocation mechanism without a receiving terminal (receiver) explicitly indicating a required transmission band. Further, a QoS control over a plurality of ISPs can be realized with a load on the receiving terminal being minimized by adding a function of a content provider (transmitter) and a function of a network, whether the band allocation mechanism itself is transmitter-triggered or receiver-triggered.

Furthermore, it is possible to charge the transmitter or receiver for band allocations by the ISPs all at one time.

As described above, according to the present invention, the following effects can be produced.

A receiver of contents is free of specifying network parameters in requesting each content.

A receiving terminal can receive a band allocation without having a function complying with a band allocation mechanism.

A transmitter or receiver can pay for a plurality of band allocations at one time.

An ISP can accept a band allocation request after confirming an assurance of payment for a band allocation when the ISP receives the band allocation request.

The present invention is not limited to the specifically disclosed embodiments, but variations and modifications may be made without departing from the scope of the present invention.

The present application is based on Japanese priority application No. 2001-149473 filed on May 18, 2001, the entire contents of which are hereby incorporated by reference.

What is claimed is:

1. A method of reserving a transmission band of a transmission line for transmitting data via a plurality of Internet service providers on the Internet between a content server and a terminal, the method comprising the steps of:
   (a) the content server requesting an intermediary server to reserve the transmission band by transmitting a user policy that includes an ordering number, a requested band, a reservation start date and time, and a reservation end date and time; and
   (b) the intermediary server reserving the transmission band for the content server and the terminal,
   wherein the reserving step further includes the steps of:
      receiving the user policy;
      storing the received user policy;
      searching for IP addresses of policy servers of the plurality of Internet service providers;
      transmitting the user policy to each policy server corresponding to each of the plurality of Internet service providers, said each policy server storing the transmitted user policy;
      receiving a band reservation result from each corresponding policy server;
      determining whether the requested band reservation is confirmed by the band reservation results; and
      transmitting the band reservation results to the content server, and
   wherein charging data, for charging one or more of a transmitter and a receiver of said data for transmission quality assurance per said plurality of Internet service providers, is constructed at one or more of said content server, said intermediary server, and said policy server.

2. The method as claimed in claim 1, wherein the content server transmits IP addresses of the content server and the terminal, IP addresses of each of a plurality of routers on the transmission line between the content server and the terminal, and the requested band to the intermediary server.

3. The method as claimed in claim 2, wherein the intermediary server identifies a band reservation setting server for each of the plurality of routers from the IP addresses thereof, each of the band reservation setting servers causing its respective router to reserve the transmission band.

4. The method as claimed in claim 3, wherein the intermediary server identifies the band reservation setting servers by referring to a table on which IP addresses of each of the band reservations servers is recorded so as to be correlated with an IP address of its respective router.

5. The method as claimed in claim 3, wherein each of the band reservation setting servers causes its respective router to reserve the transmission band in accordance with band setting requests transmitted from the intermediary server.

6. The method as claimed in claim 3, further comprising the steps of:
   (c) the content server requesting the intermediary server to release the reserved transmission band; and
   (d) the intermediary server releasing the reserved transmission band.

7. The method as claimed in claim 6, wherein the intermediary server instructs the band reservation setting servers to release the reserved transmission band.

8. The method as claimed in claim 7, wherein each of the band reservation setting servers causes its respective router to release the reserved transmission band in accordance with a band release request transmitted from the intermediary server.

9. The method as claimed in claim 2, wherein the intermediary server, instead of the requested band, utilizes an ID of one of the Internet service providers to which the terminal is connected and IP addresses of communication devices connected to the one of the Internet service providers, the ID and the IP addresses being transmitted from the one of the Internet service providers.

10. The method as claimed in claim 9, wherein the requested band is a transmission rate at which the terminal is connected to the one of the Internet service providers.

11. The method as claimed in claim 10, wherein the intermediary server transmits an inquiry about the transmission rate to the one of the Internet service providers.

12. The method as claimed in claim 11, wherein the one of the Internet service providers responds to the inquiry from the intermediary server.

13. The method as claimed in claim 1, wherein the content server transmits IP addresses of the content server and the terminal, and IP addresses of routers on the transmission line to the intermediary server.

14. The method as claimed in claim 1, wherein the requested band is a transmission rate at which the terminal is connected to a corresponding one of the Internet service providers.

15. The method as claimed in claim 14, wherein the intermediary server transmits an inquiry about the transmission rate to the corresponding one of the Internet service providers.

16. The method as claimed in claim 15, wherein the corresponding one of the Internet service providers responds to the inquiry from the intermediary server.

17. The method as claimed in claim 1, wherein:
   the terminal is connected to one of the Internet service providers which one includes a copy server having a copy of a content distributed by the content server; and
   the content server, based on a request of the terminal for the content, informs the copy server that the content is distributed from the copy server to the terminal by reserving a transmission band between the content server and the terminal.

18. The method as claimed in claim 17, wherein the copy server transmits an IP address thereof, an IP address of the terminal, the requested band, and IP addresses of all routers between the copy server and the terminal to the intermediary server.

19. A device for reserving a transmission band of a transmission line for transmitting data via a plurality of Internet service providers (ISPs) on the Internet between a content server and a terminal,
   wherein the transmission band is reserved at a request of the content server to reserve the transmission band by transmitting a user policy that includes an ordering number, a requested band, a reservation start date and time, and a reservation end date and time,
   wherein the device is operable to perform the steps of:
      storing IP addresses of policy servers of the ISPs,
      storing a request of the content server to reserve the transmission band, including user policy;

communicating the user policy over the Internet to each policy server corresponding to each of said plurality of ISPs to request reservation of the transmission band, said each policy server storing the user policy; and storing results of reservations of the transmission band, the results being returned from the each policy server in response to the reservation requested by the device, and wherein charging data, for charging one or more of a transmitter and a receiver of said data for transmission quality assurance per said plurality of ISPs, is constructed at one or more of said content server, said policy server, and said device.

20. A device for reserving a transmission band of a transmission line for transmitting data via a plurality of Internet service providers (ISPs) on the Internet between a content server and a terminal, the device comprising:

a first part storing IP addresses of policy servers of the Internet service providers;

a second part storing a request of the content server to reserve the transmission band, the request including a user policy that includes an ordering number, a requested band, a reservation start date and time, and a reservation end date and time;

a third part for communicating the user policy over the Internet to each policy server corresponding to each of said plurality of ISPs to request reservation of the transmission band, said each policy server storing the user policy; and a fourth part storing results of reservations of the transmission band, the results being returned by the each policy server in response to the reservation request made via the third part, wherein the device, upon receiving the request of the content server, refers to the first and second parts to instruct the each policy server via the third part to reserve the transmission band, recording the results of the reservations returned from the each policy server in the fourth part, and informing the content server whether a reservation of the transmission band is confirmed by analyzing the results stored in the fourth part, and wherein charging data, for charging one or more of a transmitter and a receiver of said data for transmission quality assurance per said plurality of ISPs, is constructed at one or more of said content server, said policy server, and said device.

* * * * *